(12) United States Patent
McLeod

(10) Patent No.: US 7,149,833 B2
(45) Date of Patent: Dec. 12, 2006

(54) METHOD AND APPARATUS FOR EXTENDING THE RANGE OF THE UNIVERSAL SERIAL BUS PROTOCOL

(75) Inventor: John Alexander McLeod, Surrey (CA)

(73) Assignee: Icron Technologies Corporation, Burnaby (CA)

( * ) Notice: Subject to any disclaimer, the term of this patent is extended or adjusted under 35 U.S.C. 154(b) by 325 days.

(21) Appl. No.: 10/475,092

(22) PCT Filed: Apr. 24, 2002

(86) PCT No.: PCT/CA02/00634

§ 371 (c)(1),
(2), (4) Date: Oct. 27, 2003

(87) PCT Pub. No.: WO02/088975

PCT Pub. Date: Nov. 7, 2002

(65) Prior Publication Data

US 2004/0177197 A1  Sep. 9, 2004

(30) Foreign Application Priority Data

Apr. 27, 2001  (CA)  ................. 2345596

(51) Int. Cl.
*G06F 13/38* (2006.01)
*G06F 13/40* (2006.01)
*G06F 13/42* (2006.01)
*G06F 13/20* (2006.01)

(52) U.S. Cl. .............. 710/300; 710/62; 710/105; 710/310; 710/313

(58) Field of Classification Search ............ None
See application file for complete search history.

(56) References Cited

U.S. PATENT DOCUMENTS

| | | |
|---|---|---|
| 5,588,140 A | 12/1996 | Misukanis et al. |
| 5,781,747 A | 7/1998 | Smith et al. |
| 5,784,581 A | 7/1998 | Hannah |
| 5,797,028 A | 8/1998 | Gulick et al. |
| 5,799,041 A | 8/1998 | Szkopek et al. |

(Continued)

FOREIGN PATENT DOCUMENTS

GB  2325997  12/1998

(Continued)

OTHER PUBLICATIONS

Compaq et al.; "Universal Serial Bus Specification"; Apr. 27, 2000; Revision 2.0; pp. 58 and 297-298.*

(Continued)

*Primary Examiner*—Paul R. Myers
*Assistant Examiner*—Ryan Stiglic
(74) *Attorney, Agent, or Firm*—Gowan Intellectual Property

(57) ABSTRACT

The present invention provides a method and apparatus to be used to extend the range of standard USB devices, and in particular, USB devices operating in accordance with Revision 2.0 of the USB Specification. An extended range hub is provided which comprises a Local Expander (LEX) and a Remote Expander (REX) which can be separated by up to, for example 100 meters. The LEX and REX operate in accordance with an enhanced high-speed USB Extended Range Protocol (USB-ERP) which permits USB devices to be more conveniently located and used, and is in compliance with Revision 2.0 of the USB Specification.

12 Claims, 22 Drawing Sheets

U.S. PATENT DOCUMENTS

| | | | |
|---|---|---|---|
| 5,878,221 A | 3/1999 | Szkopek et al. | |
| 5,890,015 A | 3/1999 | Garney et al. | |
| 5,983,073 A | 11/1999 | Ditzik | |
| 6,308,215 B1 | 10/2001 | Kolbet et al. | |
| 6,381,666 B1 | 4/2002 | Kejser et al. | |
| 6,389,029 B1 | 5/2002 | McAlear | |
| 6,526,468 B1* | 2/2003 | Larochelle et al. | 710/305 |
| 6,571,305 B1* | 5/2003 | Engler | 710/100 |
| 6,584,519 B1* | 6/2003 | Russell | 710/62 |
| 6,603,744 B1* | 8/2003 | Mizutani et al. | 370/310 |
| 6,697,372 B1 | 2/2004 | McAlear | |
| 6,708,247 B1* | 3/2004 | Barret et al. | 710/313 |
| 6,721,332 B1 | 4/2004 | McAlear | |
| 6,754,720 B1* | 6/2004 | Packer | 710/3 |
| 6,886,062 B1* | 4/2005 | Garney | 710/106 |
| 6,965,614 B1 | 11/2005 | Osterhout et al. | |
| 7,028,133 B1* | 4/2006 | Jackson | 710/313 |
| 2002/0010821 A1* | 1/2002 | Yu er al. | 710/100 |
| 2002/0144042 A1* | 10/2002 | Garney | 710/300 |
| 2004/0205276 A1* | 10/2004 | Ferguson | 710/305 |

FOREIGN PATENT DOCUMENTS

| | | |
|---|---|---|
| WO | WO 00 49507 A | 8/2000 |
| WO | WO 00 67103 A | 11/2000 |

OTHER PUBLICATIONS

Patent Abstracts of Japan; vol. 2000, No. 09, Oct. 13, 2000; & JP 2000-183920 A (Matsushita Electric Ind Co Ltd), Jun. 30, 2000.

Universal Serial Bus Specification, Rev. 2.0, Apr. 27, 2000, Compaq Computer Corp. et al., Section 8.4.5. Selected pages.

* cited by examiner

| | |
|---|---|
| LEX: | for (each IN from HOST)<br>{<br>    send IN to REX-FPGA<br><br>    switch (result from memory)<br>    {<br>        case (DATA0):<br>        case (DATA1):<br>            send result to HOST<br>            break<br>        default:<br>            break<br>    }<br>}<br><br>for (each result from REX-FPGA)<br>{<br>    save result in memory<br>} |
| REX-FPGA: | for (each IN from LEX)<br>{<br>    send IN to REX-HUB<br>}<br><br>for (each result from REX-HUB)<br>{<br>    send result to LEX<br>} |

*Figure 9*

| | |
|---|---|
| LEX: | for (each OUT/DATA0 from HOST)<br>{<br>    send OUT/DATA0 to REX-FPGA<br>} |
| REX-FPGA: | for (each OUT/DATA0 from LEX)<br>{<br>    send OUT/DATA0 to REX-HUB<br>} |

*Figure 10*

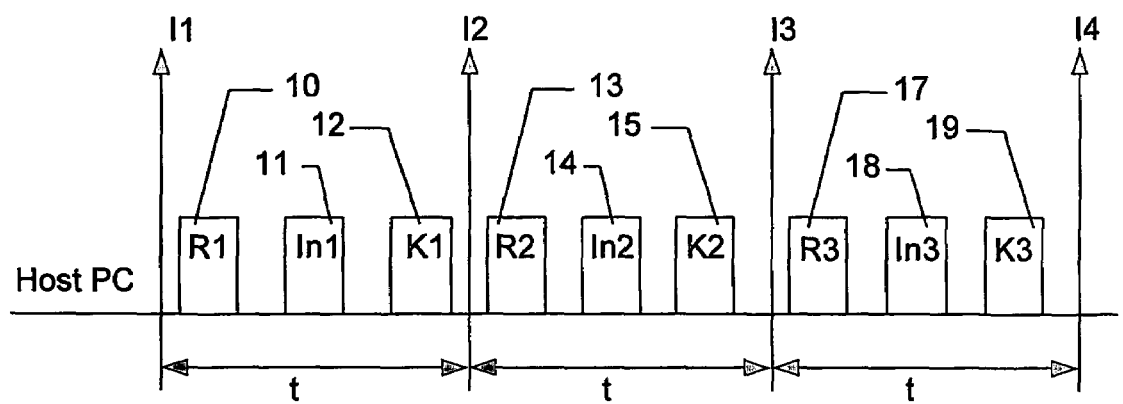
*Figure 17*
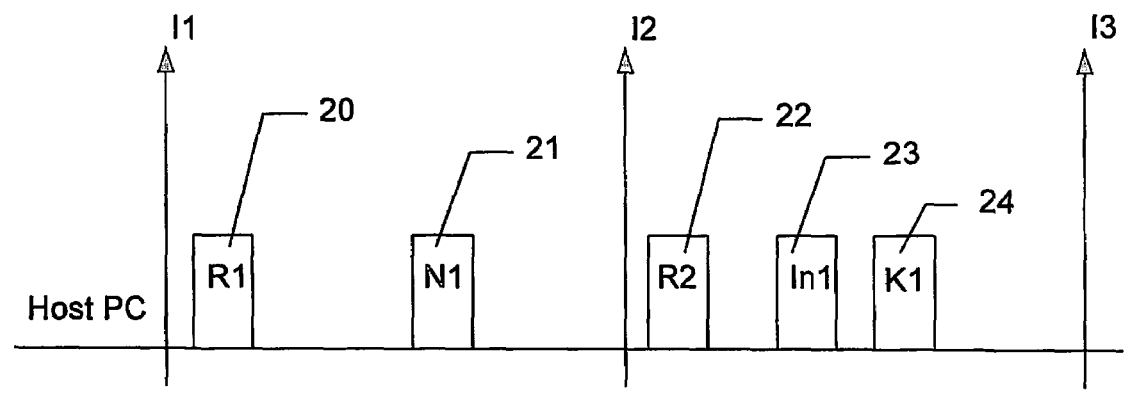
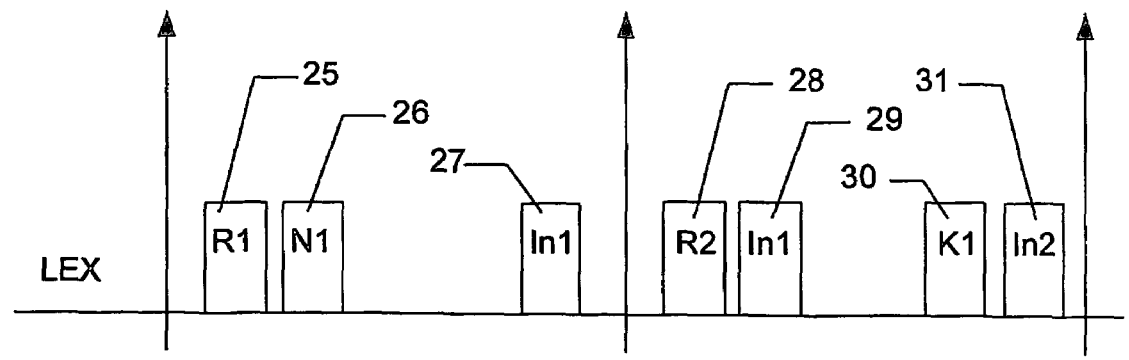
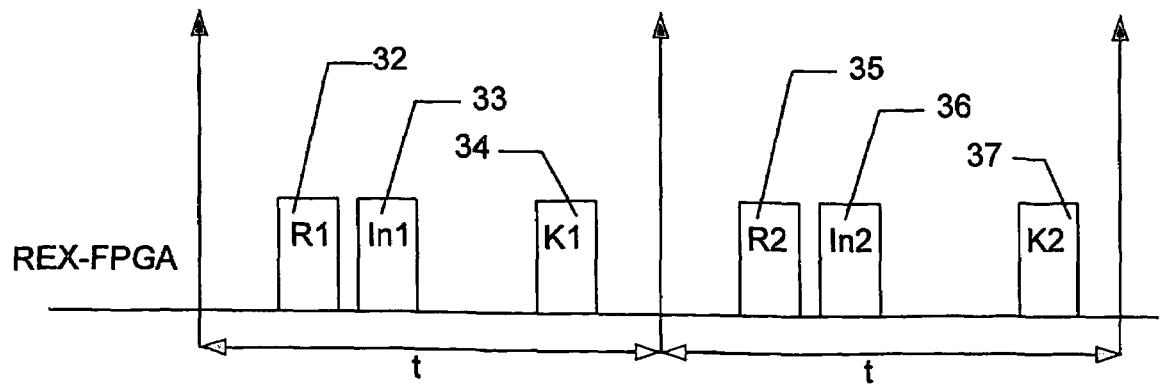
*Figure 18*

METHOD AND APPARATUS FOR EXTENDING THE RANGE OF THE UNIVERSAL SERIAL BUS PROTOCOL

FIELD OF THE INVENTION

This method and apparatus relates to transmitting signals between devices using Universal Serial Bus ports, and in particular, to allowing communications between devices using such ports over an extended range.

DESCRIPTION OF THE RELATED ART

Universal Serial Bus (USB) is a peripheral interface for attaching personal computers to a wide variety of devices, such as, for example, digital telephone lines, monitors, modems, mice, printers, scanners, game controllers, keyboards, and the like. The creation of USB is a collaborative effort of seven of the largest companies in the computer and communication industry: namely Intel, Compaq, Microsoft, NorTel, NEC, Digital and IBM. The specifications defining USB (e.g. Intel et al., Universal Serial Bus Specification, Revision 1.0, January 1996; and updated as Revision 1.1 in September 1998, and further updated as Revision 2.0 in April 2000, and subsequent updates and modifications— hereinafter collectively referred to as the "USB Specification", which term can include future modifications and revisions) are non-proprietary and are managed by an open industry organization known as the USB Forum. The USB Specification establishes the basic criteria that must be met in order to comply with USB standards. The USB Specification also defines a number of terms and their definitions. These terms and definitions are to be used for the purposes of this specification, unless otherwise stated.

As an example, it is a requirement of Revision 1.0 of the USB Specification that a single USB domain shall support up to 127 devices operating over a shared medium providing a maximum bandwidth of 12 Mbps. Revision 2.0 increases the maximum bandwidth to 480 Mbps while maintaining compatibility with devices manufactured under the criteria of Revision 1.1;—thus demonstrating ongoing modification of the USB Specification. Under the USB Specification, a Host Controller that supports only a maximum signalling rate of 12 Mbps is referred to as a full-speed host and the transmission of signals from such a host controller is restricted to a full-speed bus. A Host Controller that supports a signalling rate of 480 Mbps is referred to as a high-speed host and said host controller transmits its signals on a high-speed bus. A full-speed Host Controller under the USB Specifications supports two classes of devices, namely, low-speed and full-speed devices. A high-speed Host Controller conforming to the USB Specifications supports three classes of devices, namely, low-speed, full-speed, and high speed devices. Low-speed devices have a maximum signalling rate of 1.5 Mbps, full-speed devices have a maximum signalling rate of 12 Mbps, and high-speed devices have a maximum signalling rate of 480 Mbps.

Under the current USB Specifications, including Revision 2.0, the distance that a device can be separated from its host PC is limited to 5 meters. By using a series of USB Hubs—devices that are intended to support increased populations rather than increased distances—this distance limitation can be increased, in theory, to 30 meters. Using five hubs and six 5-meter cables, placed between the hubs, to support a single device at a range of 30 meters is an expensive and clumsy solution since hubs are currently priced at about $50 US each and at least two of the five hubs must be provided with electrical power under this extension method. In addition, using standard 5-meter cables between hubs would mean that some hubs might have to be placed in insecure and inconvenient locations.

There is therefore a need for methods and apparatus to allow USB devices to be positioned at greater distances from the host PC. For example, an uninterrupted distance of at least 100 meters is required for compatibility with the standards governing the cabling of commercial buildings (see, for example, TIA-568-A, Commercial Building Telecommunication Cabling Standard, Telecommunications Industry Association, October 1995). Providing for an extended range capability would also create new applications for USB devices as well as facilitating existing ones. For example, a simple residential or SOHO (small office, home office) surveillance system could be constructed by connecting consumer quality cameras to a central PC. An overhead mounted monitor could be monitored from any office in a commercial building. Many other applications are possible.

Currently, the USB Specifications do not permit the use of extended ranges.

It also is a further requirement of the USB Specification that the access of each device to the shared communications bus is controlled by a single Host Controller. It is also specified that when a full-speed Host Controller instructs a particular device to place its information on to the shared bus, the requested information must be received by the Host Controller within 16 full-speed bit-times of said Host Controller issuing said instruction. Similarly, when a high-speed Host Controller instructs a particular device to place its information on to the shared bus, the requested Information must be received by the Host Controller within 736 high-speed bit-times of said Host Controller issuing said instruction. Restriction on the response time ensures that the USB Specification provides for a high efficiency of bandwidth utilization by limiting the period during which no information is being transmitted. However, these requirements also limit the physical range of USB devices since one bit-time at 12 Mbps, which is one full-speed bit-time, is equivalent to the time taken for an electronic signal to traverse approximately 17 meters of copper cable. One bit-time at 480 Mbps, which is one high-speed bit-time, is equivalent to the time taken for an electronic signal to traverse approximately 440 millimeters of cable.

Further, although the USB device must respond to a request from the full-speed Host Controller within 16 full-speed bit-times, 7.5 full-speed bit-times is allocated for delay within a full or low-speed USB device and its associated 5 meter cable. This allocation retains only 8.5 full-speed bit-times at 12 Mbps for additional cable delay. The time represented by 8.5 full-speed bit-times is equivalent to the delay incurred by electronic signals in traversing approximately 144 meters of cable. The distance travelled within the allowed time span for full-speed is insufficient to satisfy the round trip cable length of 200 meters required by the premise cabling specification.

For the high-speed Host Controller, a device must respond to the Host Controller within 736 high-speed bit-times and 217 high-speed bit-times of the restricted response time of 736 high-speed bit-times is allocated for delay within a high-speed USB device and its 5 meter cable. This allocation, thus, retains 519 full-speed bit-times at 480 Mbps for additional cable delay. The time represented by 519 high-speed bit-times represents a distance of 227 meters of cable. However, according to the USB Specifications, a high-speed host must also support full and low-speed devices which operate under the full-speed bus. The time allocated for delay within a full or low-speed USB device and its associated 5 meter cable is 7.5 full-speed bit-times which is equivalent to 300 high-speed bit-times. Therefore, in the case where data is transferred between a high-speed host and a full or low-speed USB device, only 436 bit-times is retained for additional cable delay. The time represented by 436 bit-times at 480 Mbps is equivalent to a cable distance of 190 meters. In order to maintain compatibility with full and low-speed devices, the maximum cable length for high speed is then restricted to 190 meters which does not meet the specified round trip cable length of 200 meters.

It is a further feature of the USB Specification that the USB Specification (or protocol) partitions access to the shared bus into discrete units known as "frames", for a full-speed host, and "microframes", for a high-speed host. The duration of a frame is 1 ms while that of a microframe is 125 $_\mu$s. Eight microframes are equivalent to one frame.

Further, the USB Specification also requires that at least four separate types of data streams or "traffic" are recognized, namely isochronous transfers, control transfers, interrupt transfers, and bulk transfers.

Isochronous data transfer is characterized as being a data transfer wherein data flows essentially continuously, and at a steady rate, in close timing with the ability of the receiving mechanism to receive and use the incoming data. Thus, isochronous transfers are considered to be "time-relevant".

This type of data transfer is distinguished from asynchronous data transfer, which pertains to processes that proceed independently of each other until a dependent process has to "interrupt" the other process, and synchronous data transfer, which pertains to processes in which one process has to wait on the completion of an event in another process before continuing. These data transfer methods are said to be non-time-relevant. Instead, a correct response to any request is required.

In our co-pending PCT patent application No. PCT/CA00/00157 (published as WO00/49507 on Aug. 24, 2000), herein incorporated by reference, a system for extending the range of the USB protocol is described which allows for cable distances of over 100 meters to be achieved for connecting USB devices.

For the purposes of the present invention, this previous method will hereinafter be referred to, in general, as the "USB Extended Range Protocol". This USB Extended Range Protocol (USB-ERP) provides a method for extending the distance between USB devices to distances over 100 m, and which is in compliance with all sections of Revision 1.0 of the USB Specifications, and any earlier versions, with the exception of distances between devices.

Using this method, in one feature, the data stream was an isochronous data stream, and in more general terms, was a time relevant data stream, wherein the first or the subsequent original, outgoing digital signal was a request for time-relevant data, and preferably, for an isochronous data stream.

Also, it was stated that the digital signal is stored. This storage period, and any other storage period referred to in the present specification, may be a very short time period. For example, in the case where the reply signal is received in time to respond to the original digital, the reply signal may be immediately forwarded with minimal storage time.

Further, it was stated that the digital signals might be converted to signals which are more suitable for transmission, and the transmission signals can be converted back to digital signals, on both the outgoing and incoming signals. This optional conversion step is only necessary if the digital signals are converted, for some reason, for transmission purposes. Otherwise, the digital signals can be sent in their original form. For the purposes of the present specification, it should be understood, however, that the digital signals may be converted for transmission purposes, but they will preferably be converted back to the same, or a similar digital signal, when required.

Devices operating using the USB-ERP have met with commercial success. However, while the methods and devices described according to the USB-ERP have been useful, modifications to the USB Specification have made enhancement of the USB-ERP desirable. Thus, the improved or modified features of the current USB Specifications, namely USB 2.0, require some enhancement of the previously described system in order to achieve optimum performance. In view of these modifications, the system previously described in PCT application No. PCT/CA00/00157, while providing acceptable performance, could benefit from providing additional enhancements to improve performance when high-speed devices are being used.

For example, in the current USB Specifications, the host controller may inquire about the availability of space at a high-speed device endpoint using a PING special token. This mechanism allows the host to wait until there is enough space at the device endpoint before transmitting subsequent data packets. The PING protocol reduces the amount of wasted bandwidth that is associated with downstream transfers of control and bulk data when the endpoint is not capable of accepting data. The PING protocol is only valid for bulk and control data transfers between a high-speed host and a high-speed device wherein data flows from the host to the device. PING special tokens are transmitted in the same manner as a normal token packet. Also, the current revision of the USB Specification requires compatibility between hosts and devices which were manufactured in accordance with the different USB Specification Revisions. For example, a high speed host must still be able to operate when using a full speed or low speed device.

Thus, it would still be desirable to provide further improvements to the technology by providing a method and apparatus for enabling data transmission equipment, and in particular, time relevant or non-time-relevant data transmission equipment utilizing the USB Specification, to be used over an extended range. Accordingly, the current invention therefore again uses the fundamental characteristics of isochronous and asynchronous data transfer, and more generally any time relevant or non-time-relevant data transmission, and the existence of regular protocol frames and microframes in order to provide methods and apparatus to enable data transmission over extended distances.

It is, therefore, an object of the present invention to provide methods and apparatus to enable devices, hubs and controllers and other devices that conform to the USB Specification to communicate over distances greater than that currently permitted under said USB Specification.

It is a further object of the present invention that the extended range be achieved without the need for intermediate hubs, repeaters or other methods of electronic signal regeneration.

It is a further object of the present invention that no hardware or software changes need to be made to the existing devices, hubs, and controllers supported by the system, and in particular, to either the isochronous or asynchronous systems operating under the USB Specification. The invention, thereby, may be incorporated into networks composed of both conventional range and extended range devices.

It is a further object of the present invention that the apparatus be very cost effective, consistent with the broadest population of devices targeted by the USB industry.

These and other objects of the invention, which will become apparent herein, are fully, or at least partially attained by the present invention as described hereinbelow.

SUMMARY OF THE INVENTION

Enhancement of the USB-ERP, previously disclosed is therefore desired. Accordingly, the present invention provides an enhanced high-speed method for transmitting a data stream between a host controller and a peripheral device over an extended distance in accordance with the USB Extended Range Protocol (hereinafter the "USB-ERP"), wherein said method additionally comprises modifications to allow for compliance with Revision 2.0 of the USB Specifications. Preferably, these enhancements include, in general: providing range extension between high speed devices, while maintaining compatibility between High-Speed devices and Full Speed or Low Speed devices; providing improved ability to handle interrupt, control, bulk and isochronous transfers according to Revision 2.0; and/or providing the ability to handle PING protocols.

Accordingly, the present invention provides an enhanced high-speed method of transmitting a data stream, with modifications to allow for compliance with Revision 2.0 of the USB Specification, wherein said enhanced high-speed USB-ERP comprises:
a. feeding a first original, outgoing digital signal from a host controller to a local expander unit;
b. optionally converting said outgoing digital signal into a converted outgoing signal having a format suitable for transmission over extended distances;
c. transmitting either said outgoing digital signal or said converted outgoing signal, as an outgoing transmission signal, over a signal distribution system;
d. receiving said outgoing transmission signal at a remote expander unit,
e. optionally converting said outgoing transmission signal to said first original outgoing digital signal;
f. delivering said first original outgoing digital signal from said remote expander to at least one peripheral device;
e. receiving, at said remote expander, a reply digital signal from said peripheral device;
h. optionally converting said reply digital signal Into a converted reply signal having a format suitable for transmission over extended distances,
i. transmitting said reply digital signal or said converted reply signal as a reply transmission signal over said signal distribution system;
j. receiving said reply transmission signal at said local expander;
k. optionally converting said reply transmission signal to said original reply digital signal;
l. storing said reply digital signal as a stored reply digital signal until the receipt of a subsequent original, outgoing digital signal from said host controller, which subsequent signal is the same as, or similar to, said first original outgoing digital signal; and
m. forwarding said stored reply digital signal to said host controller in response to said subsequent original outgoing digital signal.

The phrase "enhanced high-speed" is preferably to be used to state that the USB-ERP operates in accordance with Revision 2.0 of the USB Specification (other than for separation distances between devices). This method can, therefore, allow for the speed advantages of high speed host controllers and/or high speed devices to be utilized.

With respect to isochronous transfers, or more generally, time relevant data streams, the enhanced high-speed USB-ERP method of the present invention allows for the transfer of isochronous data from both hosts and devices at the higher transfer rates allowed under Revision 2.0, and thus permits the high transfer rates of high speed devices and host controllers to be utilized.

Thus, the present invention also provides an enhanced high-speed method as described hereinabove, which method provides for the transmission of isochronous data according to Revision 2.0 of the USB Specification wherein isochronous data is transmitted from a peripheral device and is received by a host controller, said method comprising:
a. transmitting a request for isochronous data from a host controller to a local expander,
b. forwarding said request for isochronous data from said local expander to a remote expander over a signal distribution system;
c. delivering said forwarded request for isochronous data to at least one peripheral device;
d. transmitting the requested isochronous data from said peripheral device to said remote expander,
e. forwarding said requested Isochronous data from said remote expander to said local expander over said signal distribution system;
f. storing said requested isochronous data in a packet buffer at said local expander;
g. transmitting a subsequent request for isochronous data from said host controller to aid local expander;
h. receiving said subsequent request for isochronous data at said local expander; and
I. retrieving the stored isochronous data from said local expander;
II. delivering said stored isochronous data to said host controller;
III. forwarding said subsequent request for isochronous data from said local expander to aid remote expander over said signal distribution system; and
IV. repeating steps (c) through (h) for said subsequent request and any further subsequent requests for isochronous data.

Additionally, the method of the present invention also provide a method as described hereinabove, wherein said method provides a method for transmission of isochronous data according to the USB Specification wherein isochronous data is transmitted from a host controller and is received by a peripheral device, said method comprising:
a) receiving, at a local expander, an original notification of isochronous a host controller;
b) forwarding said original notification of isochronous data from said local expander to a remote expander over signal distribution system;
c) receiving, at a remote expander, said forwarded original notification of isochronous data;
d) delivering said forwarded notification of asynchronous data to at least one peripheral device;
e) receiving, at a local expander, an original isochronous data packet from a host controller;
f) forwarding said original isochronous data packet from said local expander to a remote expander over a signal distribution system;
g) receiving, at a remote expander, said forwarded original isochronous data packet; and
h) delivering said forwarded original isochronous data packet to at least one peripheral device.

Yet still further, the present invention also provides a method as described hereinabove wherein additionally comprising the following steps after step (b), namely:
  i. Determining whether said local expander already possesses said requested isochronous data;
  ii. Generating a synthetic data packet if no such requested isochronous data is present; and
  iii. Delivering said synthetic isochronous data to said host controller.

Also, the method of the present invention provides a method as described hereinabove additionally comprising the following steps after step (b), uniquely for data transfers conforming to the USB Specifications wherein data is transmitted from a high-speed host and is received by a full-speed device, namely:
  i) Determining whether said local expander already possesses said requested isochronous data;
  ii) Generating a synthetic not-yet packet if no such requested isochronous data is present; and
  iii) Delivering said not-yet packet to said host controller.

With respect to non-time-relevant data streams, and in particular, asynchronous data streams, the present invention provides an enhanced high-speed method for transmission of asynchronous data according to the USB Specification wherein asynchronous data is transmitted from a peripheral device and is received by a host controller, said method comprising:
  a) receiving, at a local expander, an original request for asynchronous data from a host controller;
  b) forwarding said original request for asynchronous data from said local expander to a remote expander over a signal distribution system;
  c) receiving, at a remote expander, said forwarded original request for asynchronous data;
  d) delivering said forwarded original request for asynchronous data from said peripheral device;
  e) receiving; at said remote expander, the requested asynchronous, data from said peripheral device;
  f) forwarding said requested asynchronous data from said remote expander to said local expander over said signal distribution system;
  g) storing, in a packet buffer at said local expander, said requested asynchronous data;
  h) receiving, at said local expander, a subsequent request for asynchronous data from said host controller; and
  i) retrieving the stored asynchronous data from said packet buffer;
  ii) delivering said retrieved asynchronous data to said host controller;
  i) receiving, at said local expander, an outgoing acknowledgment signal from said host controller,
  j) absorbing, at said local expander, said outgoing acknowledgement signal.

Further, the present invention also provides a method as described hereinabove additionally comprising the following steps after step (b), namely:
  i) Determining whether said local expander already possesses said requested asynchronous data;
  ii) Generating a negative acknowledgement packet if no such requested asynchronous data is present; and
  iii) Delivering said negative acknowledgement packet to said host controller.

Still further, the present invention provides a method as described hereinabove additionally comprising the following steps after step (b), generally for high bandwidth data transfers conforming to the USB Specifications wherein data is transmitted from a high-speed host and is received by a high-speed device, namely:
  a. Determining whether said local expander already possesses said requested asynchronous data;
  b. Generating a synthetic data packet if no such requested asynchronous data is present; and
  c. Delivering said synthetic asynchronous data to said host controller.

When data is transmitted from a high-speed host, and is received by a low-speed or full-speed device, the method of the present invention also provides the following steps after step (b), uniquely for data transfers conforming to the USB Specifications wherein data is transmitted from a high-speed host and is received by a low-speed or full-speed device, namely:
  a. Determining whether said local expander already possesses said requested asynchronous data;
  b. Generating a synthetic not-yet packet if no such requested asynchronous data is present; and
  c. Delivering said synthetic not-yet packet to said host controller.

Further, the method can also comprise the following steps after step (e), namely:
  i) generating an acknowledgement packet at said remote expander; and
  ii) delivering said acknowledgement packet to said peripheral device.

Interrupt transfers, control transfers, and bulk transfers are all categorized by the USB Specifications as types of asynchronous data transfer, and are all non-time-relevant data streams However, the main characteristic that distinguishes interrupt transfers from control transfers and bulk transfers is periodicity. For example, in accordance with the USB Specification, Revision 2.0, interrupt transfers have guaranteed bandwidth on the shared bus and therefore can occur at regular time intervals. However, control transfers and bulk transfers can occur any time and can take place when the shared bus has unoccupied bandwidth. Control transfers have very little guaranteed bandwidth on the shared bus. Bulk transfers have no guaranteed bandwidth. Therefore, bulk transfers have the lowest priority on the shared bus and only take place when there is available bandwidth after the bandwidth required by all the other transfers has been accounted for.

Control transfers are characterized by having three transfer phases for transmitting each set of inbound or outbound data and said transfer phases are: the set-up phase, the data phase, and the status phase.

With respect to control and bulk transfers, which are treated as two special cases of asynchronous transfers wherein data requests from the host controller are generated non-periodically or on an as-needed basis, the invention provides a enhanced high-speed USB-ERP additionally comprising the following step after determining whether the local expander already possesses said requested asynchronous data, namely:
  a. Absorbing at said local expander said subsequent request for asynchronous data.

For the purposes of the present invention, the term "absorbing" is used to describe a process wherein the software recognizes that the information stored is not essential, or is no longer essential, and therefore simply removes the information from storage without passing it on to any further devices.

For interrupt transfers, which are a special case of asynchronous transfers wherein data requests from the host controller are generated periodically, the present invention also provides a method according to an enhanced high-speed USB-ERP additionally comprising the following steps after step (h) above, uniquely for interrupt data transfers wherein asynchronous data is transmitted from a peripheral device and is received by a host controller, namely, a. Forwarding said subsequent request for asynchronous data from said local expander to a remote expander over a signal distribution system;

b. Delivering said forwarded subsequent request for asynchronous data from said remote expander to said peripheral device; and c. Receiving, at said remote expander, the requested asynchronous data from said peripheral device.

In a preferred embodiment, the present invention also provides a method as described hereinabove with respect to the present invention, which provides an enhanced high-speed USB-ERP method for transmission of asynchronous data according to the USB Specification, wherein asynchronous data is transmitted from a host controller and is received by a peripheral device, said method comprising:

a) receiving, at a local expander, an original notification of asynchronous data from a host-controller, b) forwarding said original notification of asynchronous data from said local expander to a remote expander over a signal distribution system;

c) receiving, at a remote expander, said forwarded original notification of asynchronous data;

d) delivering said forwarded notification of asynchronous data to at least one peripheral device;

e) receiving, at a local expander, an original asynchronous data packet from a host controller;

f) forwarding said original asynchronous data packet from said local expander to a remote expander over a signal distribution system;

g) receiving, at a remote expander, said forwarded original asynchronous data packet, h) delivering said forwarded original asynchronous data packet to at least one peripheral device;

i) receiving, at said remote expander, an inbound acknowledgment packet from said peripheral device;

j) forwarding said inbound acknowledgment packet from said remote expander to said local expander over said signal distribution system;

k) storing, in a packet buffer at said local expander, said inbound acknowledgment packet;

l) receiving, at said local expander, a subsequent notification of asynchronous data from said host controller;

m) receiving, at said local expander, a subsequent asynchronous data packet from said host controller; and i) retrieving said stored inbound acknowledgment packet from said packet buffer; and ii) delivering said retrieved inbound acknowledgment packet to said host controller.

In a further preferred embodiment, the method described hereinabove additionally comprises the following steps, namely:

i) Determining whether said local expander already possesses said inbound acknowledgment packet;

ii) Generating a negative acknowledgment packet if no such inbound acknowledgment packet is present; and iii) Delivering said negative acknowledgment packet to said host controller.

For interrupt transfers, the invention provides the following steps after steps l) and m) described hereinabove, namely:

a. Forwarding said subsequent notification of asynchronous data and asynchronous data packet from said local expander to a remote expander over a signal distribution system;

b. Delivering said forwarded subsequent notification of asynchronous data and asynchronous data packet to said peripheral device;

c. Receiving, at said remote expander, the inbound acknowledgement packet from said peripheral device;

d. Repeating steps (j) through (m) for said subsequent notification and data packet and any further subsequent notifications of asynchronous data and asynchronous data packets.

For control and bulk transfers, the invention provides the following steps after steps l) and m) described hereinabove, namely:

a. Absorbing at said local expander said subsequent notification of asynchronous data and said subsequent asynchronous data packet.

With respect to both time-relevant and non-time relevant data streams, a guard time can be imposed after a data packet is transmitted from a remote expander to a USB device, which guard time is set to a value that is dependent upon the transfer type of said transmitted data packet, said method comprising:

(a) Receiving, at a remote expander, an outbound data packet, (b) Determining, at a remote expander, the transfer type of said outbound data packet, (c) Forwarding said outbound data packet from said remote expander to a USB device, (d) Setting the value of a transmission guard timer to a value that is dependent upon said determined transfer type; and (e) Inhibiting further outbound transmissions until said guard timer has expired.

In an additional feature, the present invention also provides a method as described hereinabove with respect to the present invention, wherein said method provides an enhanced high-speed USB-ERP method for handling the PING flow control protocol, which is used uniquely for control and bulk data transfers wherein asynchronous data is transmitted from a high-speed host to a high-speed device, said method comprising:

a) receiving, at a local expander, a PING flow control probe from a host controller;

b) forwarding said flow control probe from said local expander to a remote expander over a signal distribution system;

c) receiving, at a remote expander, said forwarded flow control probe;

d) delivering said forwarded flow control probe to at least one high-speed peripheral device;

e) receiving, at remote expander, the requested reply from said peripheral device;

f) receiving, at local expander, said requested reply;

g) storing, in a packet buffer at said local expander, said requested reply;

h) receiving, at said local expander, a subsequent PING flow control probe from said host controller; and i) retrieving said stored reply from said packet buffer;

ii) delivering said retrieved reply to host controller, i) absorbing, at said local expander, said subsequent flow control probe.

In a preferred feature, the method also provides the following additional steps after step (b) described hereinabove, namely:

i) Determining whether said local expander already possesses said requested reply;

ii) Generating a negative acknowledgement packet if no such requested reply is present;

iii) Delivering said negative acknowledgement packet to said host controller.

Additionally, the present invention provides apparatus which are capable of providing the processing logic described hereinabove.

DESCRIPTION OF THE PREFERRED EMBODIMENTS

Although a number of signal distribution systems may be used, as described hereinabove, preferably the signals are transmitted over a signal distribution system that utilizes fibre optic cabling. Using this method of device connection provides a low cost and effective means for data transmission. However, in another embodiment of the system, signals can be transmitted over coaxial cable, Unshielded Twisted Pair (UTP) cable or wire, shielded cable, or wireless transmission methods.

While the methods and apparatus of the present invention have general utility in a variety of applications, it is of primary importance that the data transmission methods and apparatus of the present invention allow for compliance with the USB Specification (with the exception of the distance requirements). In one embodiment, the original signal from the host controller is a request for data from a peripheral device. The peripheral devices can include devices selected from cameras, keyboards, mice, monitors, speakers, and the like.

For time relevant (isochronous) data streams, and in particular, during operations utilizing the methods and apparatus of the present invention in applications involving extended range transmissions, it is preferred that the apparatus be capable of recognizing isochronous transfers, when they are received. The data contained within the isochronous transfer is then stored within the system for a period of time. Preferably, the data that is received during a particular time period may be stored and then transmitted in a following time period. Additionally, a further preferred embodiment of the present invention is that isochronous transfers originating from a plurality of sources may be stored, and retransmitted.

In the operation of a preferred embodiment of the current invention, a host controller (which preferably is a PC) may issue a request to a device for the transfer of isochronous data. The request is received by the apparatus of the present invention, and retransmitted to the target device. When the requested isochronous transfer response is received by the apparatus from the target device, the isochronous data is stored within the internal memory of the apparatus. During a subsequent time period, the host controller will again issue a request to the target device for the transfer of isochronous data. The apparatus will again retransmit this request to the target device. In addition, however, the apparatus recognizes that it currently has isochronous data from the target device stored in its internal memory. The apparatus sends this data to the host controller within the 16 full-speed bit-time margin in the case of a full-speed bus (or within the 736 high-speed bit-time margin in the case of a high-speed bus) relevant to the current request within the time period. In this manner, the apparatus uses data collected in a previous time period to satisfy the response time requirement of a current time period.

For time relevant data streams, the term "time period" preferably refers to a single "frame" (1 ms) in the case of a full-speed bus or "microframe" (125 $\mu$s) in the case of a high-speed bus, as defined in the USB Specification.

When a packet is received from the target device, and no further request for data is received from the host controller, the last data packet or packets received and stored (hereinafter the "vestigial" packets) are preferably removed from the system so that they are not transmitted when and if a further request is received from the host controller. Preferably, this is achieved by modification of the method described hereinabove by additionally comprising the following stages, namely:

i) Detecting when a new time period has begun;

ii) Examining the properties of each packet buffer;

iii) Determining whether the data packet contained in said examined packet buffer has been stored for at least the duration of one complete time period;

iv) Discarding said contained data packet if said contained data packet has been stored for the duration of at least one complete time period; and v) Repeating steps i) through iv) for each packet buffer in the system.

In an alternative embodiment of the invention, the apparatus handles the first request for the inbound transfer of isochronous data in a unique manner. This unique manner requires the apparatus to generate its own synthetic inbound data packet.

It is possible that packets sent from the Remote Expander may not arrive at the Local Expander In the order expected by the Local Expander. In order to avoid difficulties that might be caused by this occurrence, the method of the present invention also preferably comprises the following stages, namely:

1) Storing the address of the requested peripheral device at said remote expander after the local expander has delivered the forwarded request for isochronous data; and further comprising the following steps after transmitting the requested isochronous data from the peripheral device to the remote expander, namely:

a) Retrieving the address of said requested peripheral device at said remote expander unit; and b) Adding said retrieved address to said requested isochronous data.

With respect to non-time relevant data streams, and in particular, asynchronous data signals, streams or transfers, it is preferred, during practice of the method, or during use of the apparatus of the present invention, that the system be preferably capable of recognizing asynchronous transfers, when they are received. The data contained within the asynchronous transfer is then stored within the system for a period of time. Accordingly, the data that is received during a particular time period may be stored and then transmitted in a following time period. Additionally, a further preferred embodiment of the present invention is that asynchronous transfers originating from a plurality of sources may be stored, and retransmitted.

In the operation of a preferred embodiment of the current invention with respect to a non-time relevant data stream, and an asynchronous data stream in particular, a host controller may issue a request to a device for the transfer of asynchronous data. The host controller must receive a response to corresponding to the issued request within 16 full-speed bit-times in the case of a full-speed bus (or 736 high-speed bit-times in the case of a high-speed bus) according to the USB Specification. The request is received by the apparatus of the present invention, and retransmitted to the target device. On receipt of an initial request, the apparatus generates and transmits a synthetic data packet to the host in order to satisfy the response time restriction. When the requested asynchronous transfer response is received by the apparatus from the target device, the asynchronous data is stored within the internal memory of the apparatus. In the case where data flows from the device to the host, the apparatus generates and transmits a synthetic acknowledgment to the device on receipt of the response from the device. During a subsequent time period, the host controller will again issue a request to the target device for the transfer of asynchronous data. In addition, however, the apparatus recognizes that it currently has asynchronous data from the target device stored in its internal memory. The apparatus sends this data to the host controller within the amount of time specified by the USB Specification relevant to the current request within the current time period. In the case where data flows from the device to the host, the host generates an acknowledgment on receipt of the requested data and the acknowledgment is absorbed by the apparatus. In this manner, the apparatus uses data collected in a previous time period to satisfy the response time requirement of a current time period.

For interrupt data streams or transfers, a special case of asynchronous data streams or transfers, the term "time period" preferably refers to a single "frame" (1 ms) in the case of a full-speed bus or "microframe" (125 $\mu$s) in the case of a high-speed bus, as defined in the USB Specification. However, the term "time period" may also apply to a portion of a frame or microframe, or a plurality of frames or microframes.

Furthermore, for interrupt data streams or transfers, subsequent requests for the transfer of data generated by the host are retransmitted to the device by the apparatus.

For bulk or control data streams or transfers, two special cases of asynchronous data streams or transfers, the term "time period" can refer to a portion of a frame or microframe, a single frame or microframe, a plurality of frames or microframes, or the like. Said frame and microframe are as defined in the USB Specification.

Furthermore, for bulk or control data streams or transfers, subsequent requests for the transfer of data generated by the host are absorbed by the apparatus.

In the operation of a preferred embodiment of the current invention, a high-speed host controller may issue a PING control flow probe to a high-speed device, with control or bulk endpoints, inquiring about the availability of space within the device for asynchronous data. The control flow probe is received by the apparatus of the present invention, and retransmitted to the target device. When the requested response is received by the apparatus from the target device, the response is stored within the internal memory of the apparatus. During a subsequent time period, the host controller will again issue a PING to the target device inquiring about the availability of space for asynchronous data. The apparatus will again retransmit this flow control probe to the target device. In addition, however, the apparatus recognizes that it currently has a response from the target device stored in its internal memory. The apparatus sends this response to the host controller within the 736 high-speed bit-time margin relevant to the current request within the time period. In this manner, the apparatus uses data collected in a previous time period to satisfy the response time requirement of a current time period.

In a preferred embodiment of either a time relevant or non-time relevant data transmission, the extended distance exceeds 5 meters, more preferably, exceeds 30 meters, and still more preferably, equals or exceeds 100 meters. In particular, the distance between the local expander and the remote expander exceeds 5 meters, more preferably, exceeds 30 meters, and still more preferably, equals or exceeds 100 meters.

As with the prior art, the method of the present invention can be used in a system wherein said host controller is a PC, and said peripheral device is, for example, a camera, a mouse, a keyboard, a monitor or a speaker or speakers. The "host controller" is preferably a PC, as has been previously stated. However, the host controller may also be part of a computer system, and in particular, part of a networked computer system.

By utilizing the method and apparatus of the present invention, it is possible to have transfer of time relevant data or non-time relevant data, and isochronous data or asynchronous data in particular, over extended distances, and in particular over distances greater than specified in the USB Specification.

However, other features of the present invention, as well as other objects and advantages attendant thereto, are set forth in the following description and the accompanying drawings in which like reference numerals depict like elements.

BRIEF DESCRIPTION OF THE DRAWINGS

The invention, and various aspects thereof, will be described by reference to the attached drawings wherein:

FIG. 9 is an algorithm for implementing isochronous input transfers between a full-speed host and a full-speed device, at the Local Expander and Remote Expander, according to the invention;

FIG. 10 is an algorithm for implementing isochronous output transfers between a full-speed host and a full-speed device, at the Local Expander and Remote Expander, according to the invention;

FIG. 17 is a timing diagram showing interrupt transfers according to the USB protocol;

FIG. 18 is a timing diagram showing interrupt transfers according to the current invention;

DESCRIPTION OF THE DRAWINGS

Figure 1:
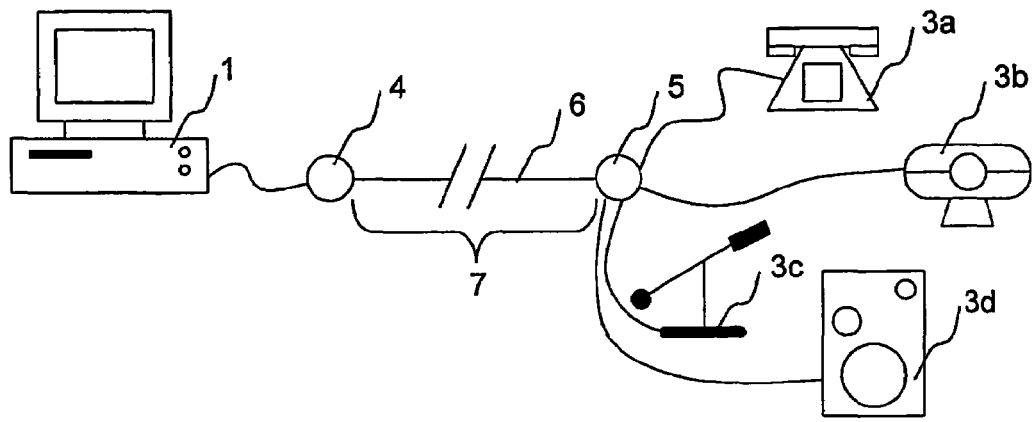
FIG. 1 is a visual representation of a PC equipped with Extended Range Hub and USB Devices.

In the drawings, FIG. 1 shows a PC (1) connected to four standard USB Devices (3a, 3b, 3c & 3d). While the length of cable between the two hubs cannot normally exceed 5 meters according to the current USB Specification, the PC (1) is also equipped with an apparatus according to the present invention, which is termed as an "Extended Range Hub" (7). The Extended Range Hub (7) is composed of two separate units, a "Local Expander" (4) or (LEX) and a "Remote Expander" (5) (or REX) which are connected by cable (6). In one embodiment of the invention, units 4 and 5 are separated by, for example, 200 meters of fibre optic cable (6) (although Category 5 UTP wiring or wireless transmission could also be used). This arrangement of devices is identical to the arrangement described earlier in PCT application No. PCT/CA00/00157.

Figure 2:
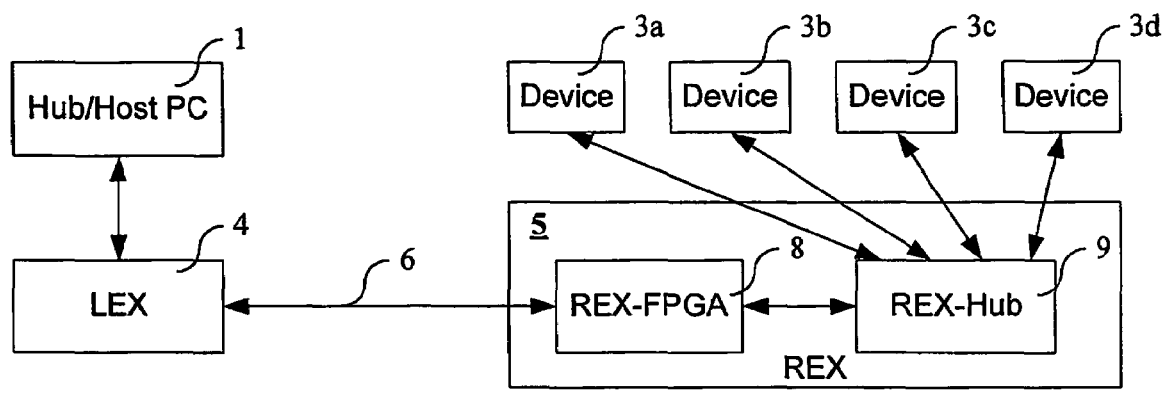
FIG. 2 is a schematic drawing of an embodiment of the invention designed to operate using fibre optic cabling as a signal distribution system.

FIG. 2 illustrates a more schematic diagram of the arrangement described in FIG. 1. The functions normally provided by a standard USB 2.0 Hub are provided by two separate units (4 & 5) connected by a length of fibre optic cable (6). In this representation, the REX unit (5) consists of two main components—the REX-FPGA (8) and a standard USB 2.0 Hub (9). The REX-FPGA (8) component represents a Field Programmable Gate Array (FPGA) as well as other hardware components. The standard USB 2.0 Hub is hereinafter referred to as the REX-Hub(9). The REX-FPGA (8) is connected to the LEX by a fibre optic cable (6), but might also be connected by UTP (Unshielded Twisted Pair) cable or wiring. The REX-Hub (9) is connected to the REX-FPGA (8) within the REX unit (5) and said REX-Hub (9) would operate in the same manner whether connected to the REX-FPGA (8) or directly to the Host PC (1) (which might also be a standard USB hub). The REX-Hub (9) is connected to a plurality of USB devices. In this embodiment said plurality is chosen to be four, but it will be clear to those skilled in the art that other choices may be made within the scope of the invention.

Operation over extended distances is preferably achieved by placing said LEX unit (4) close to said host PC (1), placing said REX unit (5) close to said plurality of USB (3a, 3b, 3c and/or 3d) devices, and connecting LEX unit (4) and REX unit (5) by the required extended length of fibre optic cabling (6).

Figure 3:
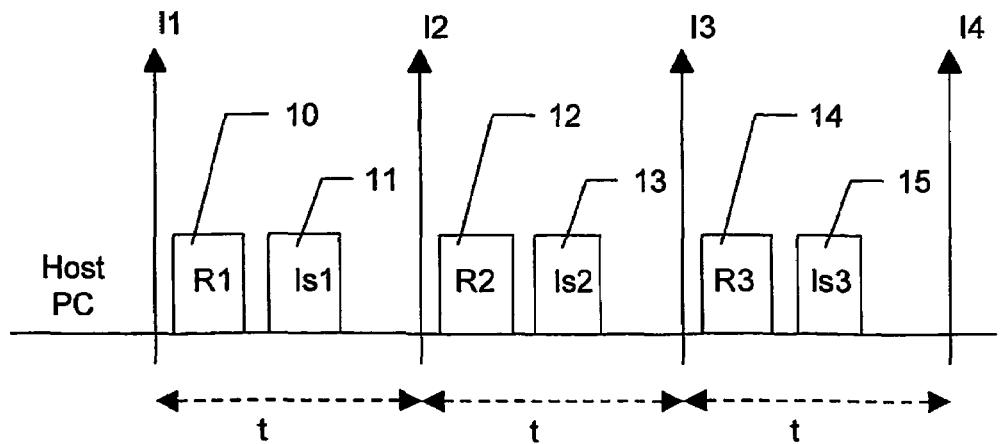
FIG. 3 is a timing diagram showing isochronous transfers according to the USB protocol.

FIG. 3 provides a prior art timing diagram showing isochronous transfers according to the USB protocol. The diagram is constructed from the point of view of a USB Host Controller (1), normally included on a PC motherboard (Host PC). The USB protocol divides time allocation on the shared bus into regular intervals. The duration in time of each interval is represented by "t" in FIG. 3 and the duration of each interval will be represented by "t" hereinafter. The start of each transaction interval is identified on the diagram as I1, I2, I3, I4. For a full-speed host, the time allotted for each interval is 1 ms and such intervals are hereinafter referred to as frames. For a high-speed host, the time allotted for each interval is 125 $_\mu$s and such intervals are hereinafter referred to as microframes. Eight microframes are equivalent to one frame.

When a Host Controller (1) is engaged upon an isochronous transfer with a device (3), the Host Controller (1) issues regular requests for data transfer to said device (3). These requests are identified as packets R1, R2, and R3 (10, 12, & 14). Under the USB protocol, a USB device (3) must respond to the request from a full-speed host within 16 full-speed bit-times. In response to requests from a high-speed host, a USB device must respond within 736 high-speed bit-times. The responses are shown in the diagram as packets Is1, Is2, and Is3 (11, 13, & 15). It is commonly expected that transfer Is1 (11) will be delivered in response to request R1 (10) within the same interval, transfer Is2 (13) will be delivered in response to request R2 (12) within the same interval, and so on until the requests are terminated.

Figure 4:
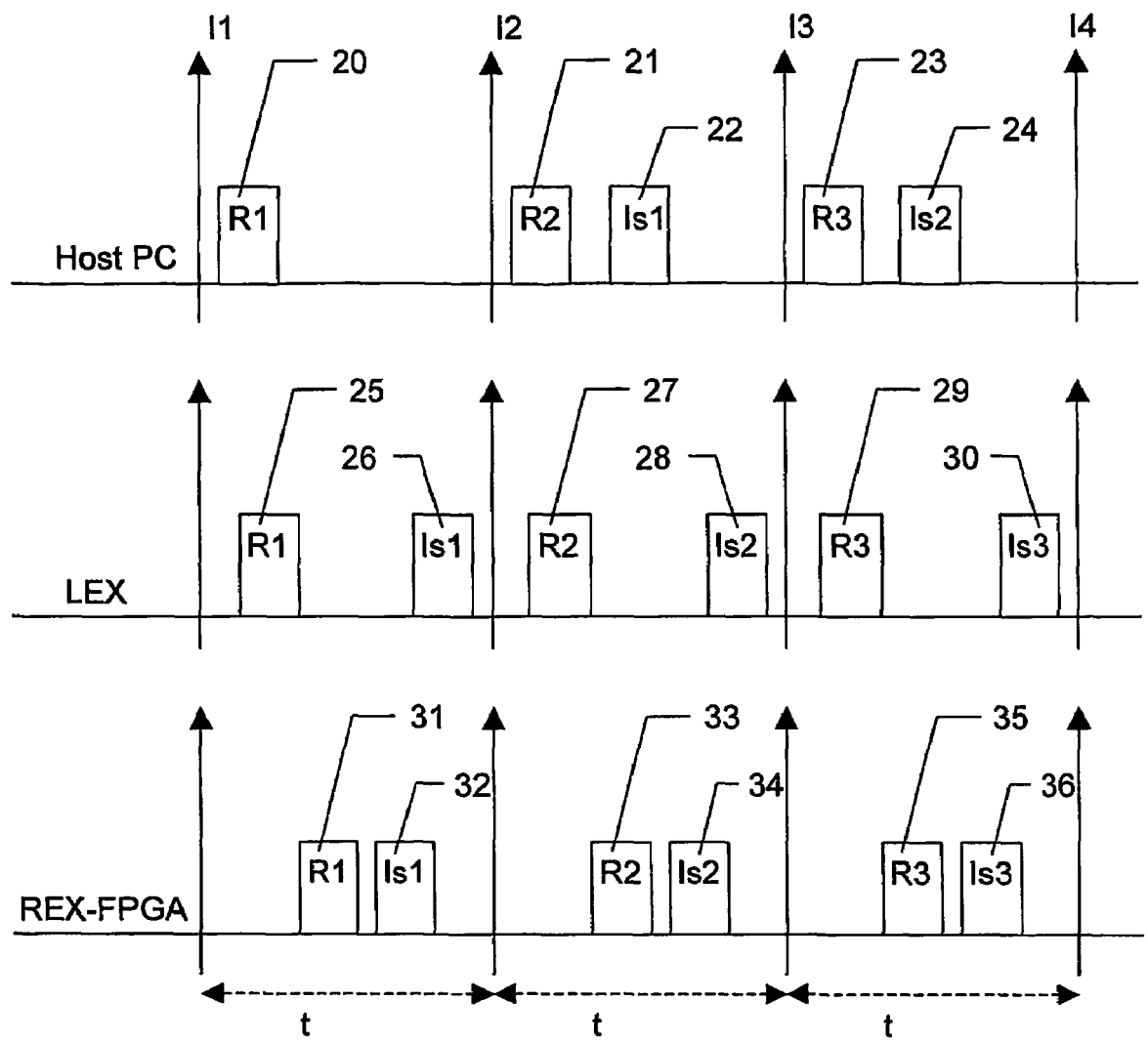
FIG. 4 is a timing diagram showing isochronous transfers according to the current invention.

FIG. 4 provides a timing diagram showing isochronous transfers according to the present invention, which is, however, essentially identical to the isochronous transfer described in PCT/CA00/00157 for full-speed transfers. The diagram shows the progression of packets through the various subsystems comprising the invention. Timelines are presented for the Host PC (1), Local Expander (4) and Remote Expander FPGA (8) components that are shown in FIG. 1.

An isochronous transfer is initiated from a Host.PC (1) by emitting a request for input data R1 (20) to a particular USB address and end-point. Said request R1 (20) is received by the LEX (4) and retransmitted as R1 (25) over the external cabling to the REX-FPGA (8). Said retransmitted packet R1 (31) is received by the REX-FPGA and forwarded to the REX-Hub (9).

The target device generates an input data packet Is1 (32). According to the USB protocol for low-speed and full-speed isochronous transfers, a device with a detachable cable must generate a response within 6.5 bit-times of the end of the corresponding request. For high-speed isochronous transfers, a device must generate a response within 192 high-speed bit times. Said input data packet Is1 (32) is received by the REX-Hub (9) and the REX-FPGA subsystem (8) and retransmitted as Is1 (26), over the external wiring, to the LEX. Said retransmitted response Is1 (26) is not immediately forwarded to the Host PC, but is stored within the memory of the LEX subsystem.

The Host PC (1) notices that it did not receive a response to its input data request R1 (20) and retries the transaction by generating a further request R2 (21) to the same USB address and end-point. Upon receiving request R2 (21), the LEX subsystem retrieves response Is1 (26) from its memory buffers and forwards it to the Host PC as response Is1 (22).

Said second request R2 (21) is repeated as R2 (27) through the LEX and forwarded as R2 (33) to the device. The target device generates a second response Is2 (34) which is retransmitted as Is2 (28) by the REX-FPGA to the LEX. Response Is2 (28) is again stored within the memory of the LEX subsystem, from where it is sent to the Host PC (1) as response Is2 (24) to a third request R3 (23). The process is repeated as necessary with request R3 (23), R3 (29) and R3 (35) and response Is3 (36) and Is3 (30).

Figure 5:
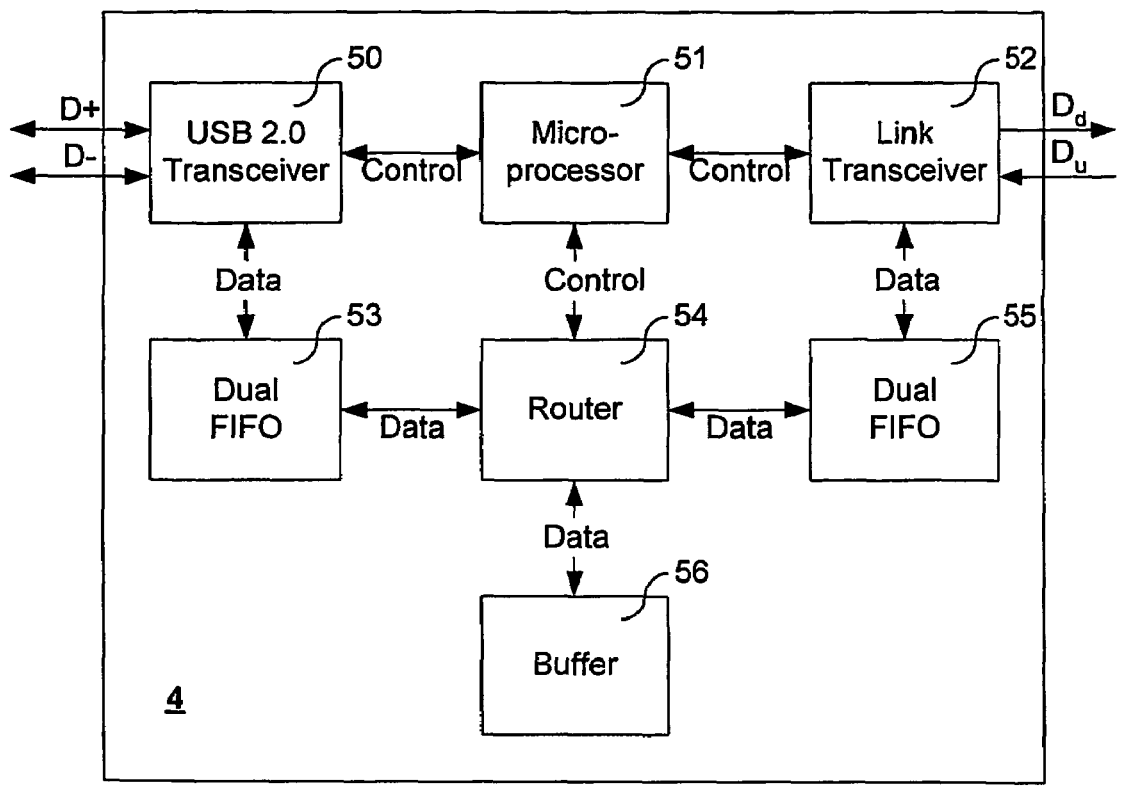
FIG. 5 is a schematic drawing of one embodiment of a Local Expander according to the invention.

FIG. 5 is a block diagram of an embodiment of a LEX (Local Expander) (4) according to the invention. In this embodiment, the USB 2.0 Transceiver (50) is connected to a USB host by conventional means, signified by the standard USB signals D+ and D−.

Data signals from the USB host are received by Link Transceiver (50) and stored in the Dual FIFO (53). The Microprocessor (51) is alerted through the control channel from the transceiver that new data has arrived and is available in the FIFO. The Microprocessor (51) instructs the Router (54) to route the data according to predefined routing tables. The Router then copies the data from the Dual FIFO (53) to the appropriate destination, either Dual FIFO (55) or Buffer (56). In the situation where the data is required to be absorbed, then the Router removes the data from dual FIFO (53) and discards said data. When data is copied to Dual FIFO (55), said data is transmitted over the extended range link by Link Transceiver (52) as $D_d$ and $D_u$.

If the treatment of the received data is not already defined by the routing tables, the Router (54) passes said received data to the Microprocessor (51) for analysis. After inspecting said data, the Microprocessor (51) updates the routing tables and returns control to the Router (54).

A similar process occurs in the reverse direction when data is received from the extended range link by Link Transceiver (52). Said received data is automatically copied to Dual FIFO (55) from where it is transferred to Buffer (56) or Dual FIFO (53) by Router (54) under the control of Microprocessor (51). Data so transferred to Dual FIFO (53) is transmitted to the USB host by USB 2.0 Transceiver (50).

Figure 6:
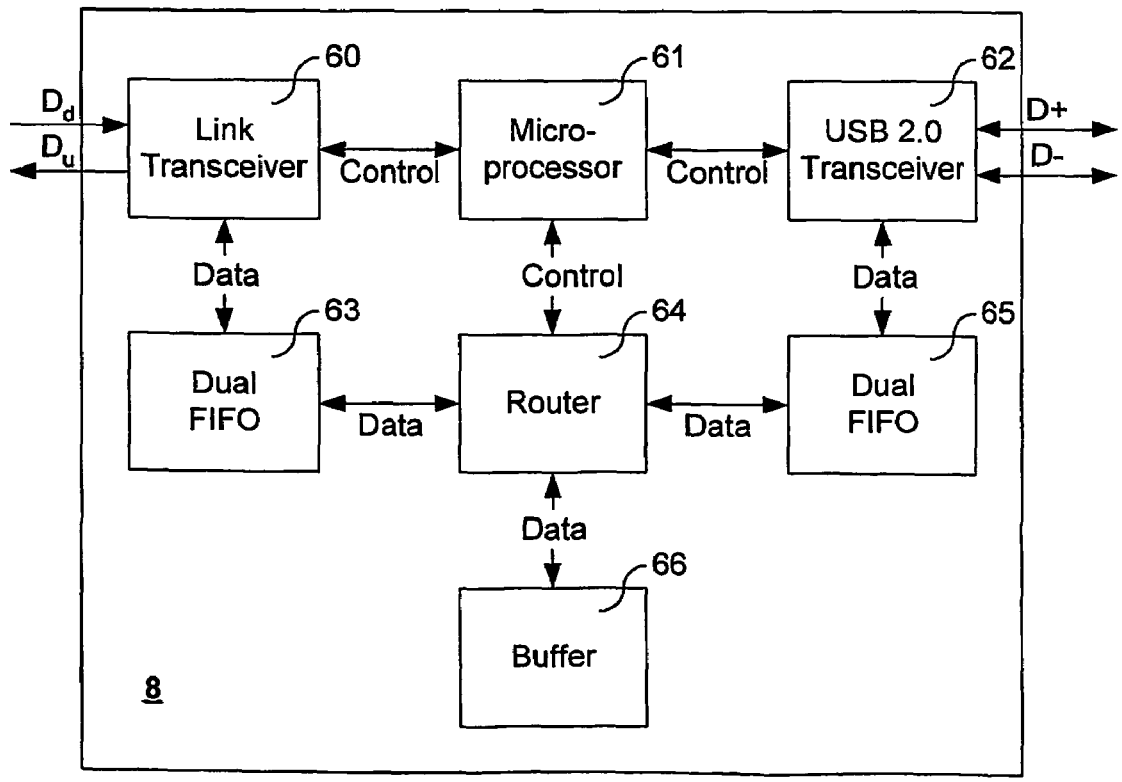
FIG. 6 is a schematic drawing of one embodiment of a REX-FPGA according to the invention.

FIG. 6 is a block diagram of an embodiment of a REX-FPGA according to the invention. The REX-FPGA (8) is connected to the extended range link (6) by Link Transceiver (60). The REX-FPGA is connected to REX-Hub (9) by USB 2.0 Transceiver (62) using conventional USB signals D+ and D−.

Data signals as $D_d$ and $D_u$, are received from extended range link (6) by Link Transceiver (60) and stored in Dual FIFO (63). The Microprocessor (61) is alerted through the control channel from the transceiver that new data has arrived and is available in the FIFO. The Microprocessor instructs the Router (64) to route the data according to predefined routing tables. The Router then copies the data from the Dual FIFO (63) to the appropriate destination, either Dual FIFO (65) or Buffer (66). If the data is required to be absorbed, then the Router removes the data from Dual FIFO (63) and discards said data. When data is copied to Dual FIFO (65), said data is transmitted to the Rex-Hub by USB 2.0 Transceiver (62)

If the treatment of the received data is not already defined by the routing tables, the Router passes said received data to the Microprocessor for analysis. After inspecting said data, the Microprocessor updates the routing tables and returns control to the Router.

A similar process occurs in the reverse direction when data is received from the Rex-Hub by USB 2.0 Transceiver (62). Said received data is automatically copied to Dual FIFO (65) from where it is transferred to Buffer (66) or Dual FIFO (63) by Router (64) under the control of Microprocessor (61). Data so transferred to Dual FIFO (63) is transmitted to the extended range link by Link Transceiver (60).

Figure 7:
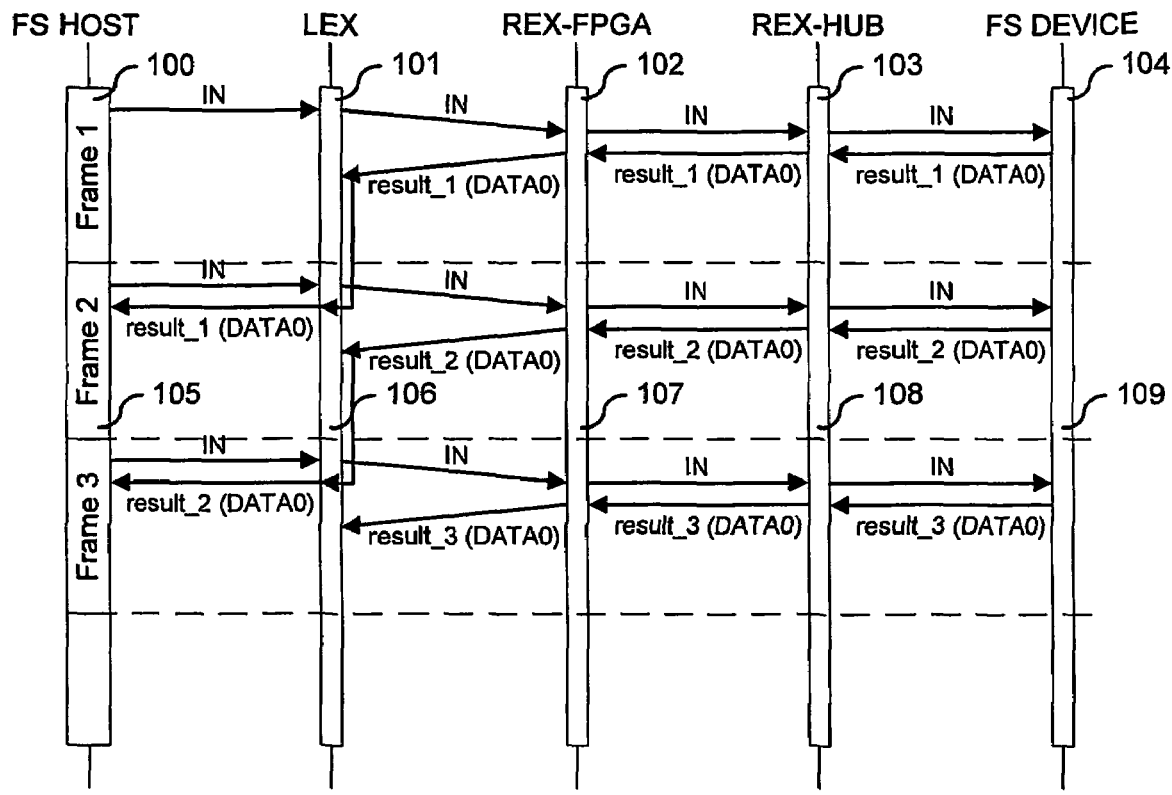
FIG. 7 is a sequence diagram showing an isochronous input transfer between a full-speed host and a full-speed device according to the invention.

FIG. 7 provides a sequence diagram showing an isochronous input transfer, between a full-speed host and a full-speed device. In Frame 1, a request for input data is transmitted from the Host control logic (100) and said request is received by the LEX subsystem as an IN packet. The control logic (101) within the LEX subsystem forwards the IN packet to the REX-FPGA subsystem. The control logic (102) within the REX-FPGA subsystem forwards the IN packet to the REX-Hub. The control logic (103) within the REX-Hub forwards the IN packet to the Device.

The control logic (104) within the device assembles the requested isochronous data and transmits said data as a Result packet to the REX-Hub. The control logic (103) within the REX-Hub forwards the Result packet to the REX-FPGA subsystem. The control logic (102) within the REX-FPGA subsystem forwards the Result packet to the LEX subsystem. The control logic (101) in the LEX subsystem stores the Result packet in its buffer memory.

In Frame 2, the control logic (105) within the Host recognizes that it has not received a response to its previous request for input data and it automatically retries the transaction by generating a further request addressed to the same USB function as in Frame 1. Said further request is transmitted to the LEX subsystem as a second IN packet. On receipt of the second IN packet, the control logic (106) within the LEX subsystem recognizes that it has a Result packet stored in memory from the same function identified by the further IN packet and transmits said Result packet to the host Said control logic (106) also forwards the further IN packet to the REX-FPGA subsystem. The control logic (107) within the REX-FPGA subsystem forwards said IN packet to the REX-Hub. The control logic (108) within the REX-Hub forwards the IN packet to the Device.

The control logic (109) within the device assembles the requested isochronous data and transmits it as a Result packet to the REX-Hub. The control logic (108) within the REX-Hub forwards the Result packet to the REX-FPGA subsystem. The control logic (107) within the REX-FPGA subsystem forwards said Result packet to the LEX subsystem. The control logic (106) in the LEX subsystem stores the Result packet in its buffer memory.

The above-described process is repeated for subsequent frames by the distributed control logic (e.g. 105, 106, 107, 108, 109).

Figure 8:
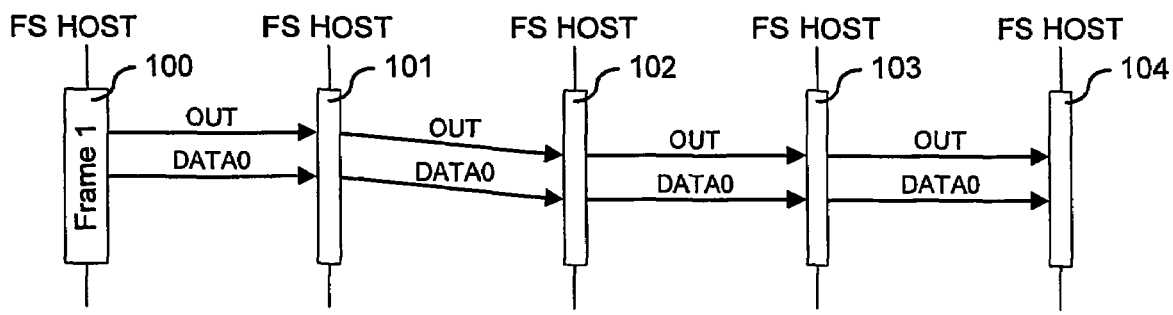
FIG. 8 is a sequence diagram showing an isochronous output transfer between a full-speed host and a full-speed device according to the invention.

FIG. 8 provides a sequence diagram showing an isochronous output transfer, between a full-speed host and a full-speed device. In Frame 1, the control logic (100) within the Host generates a notification of output data, addressed to a particular USB function. Said notification is transmitted to the LEX subsystem as an OUT packet. The control logic (101) within the LEX subsystem forwards said OUT packet to the REX-FPGA subsystem. The control logic (102) within the REX-FPGA subsystem forwards said OUT packet to the REX-Hub. The control logic (103) within the REX-Hub forwards said OUT packet to the Device. The information is received by the control logic within the device.

The control logic (100) within the Host assembles the notified isochronous data and transmits it as a Data0 packet to the LEX subsystem. The control logic (101) within the LEX subsystem forwards the Data0 packet to the REX-FPGA subsystem. The control logic (102) within the REX-FPGA subsystem forwards said Data0 packet to the REX-Hub. The control logic (103) within the REX-Hub forwards said Data0 packet to the device. The information is received by the control logic (104) within the device.

The above-described process is repeated for subsequent frames by the distributed control logic (e.g. 100, 101, 102, 103, 104).

FIG. 9 provides an algorithm for implementing isochronous input transfers, between a full-speed host and a full-speed device, at the Local Expander and Remote Expander. Said algorithm is implemented in hardware by the LEX and REX-FPGA Controllers. According to the invention, the algorithm of LEX controller is required to implement the processing functions represented by processing blocks (101) and (106) of FIG. 7. The algorithm of REX controller is required to implement the processing functions represented by processing blocks (102) and (107) of FIG. 7.

According to said algorithm programmed in the LEX controller, if the received packet is of type IN then an identical packet is transmitted to the REX-FPGA controller. The LEX controller then examines its buffer memory to determine whether a stored Result packet from the device addressed by the IN request is already present in memory. If no such stored Result packet is present in memory, the system then becomes idle. If said stored Result packet is present in memory, the system retrieves said stored packet from memory and sends said packet to the host as a packet of type Result. If the received packet is of type Result then the packet is stored in the buffer memory.

According to said algorithm programmed in the REX-FPGA controller, if the received packet is of type IN then an identical packet is forwarded to the REX hub. If the received packet is of type Result, then the packet is transmitted to the LEX controller.

FIG. 10 provides an algorithm for implementing isochronous output transfers, between a full-speed host and a full-speed device, at the Local Expander and the Remote Expander. According to the invention, the algorithm of the LEX controller is required to implement the processing functions represented by processing block (101) of FIG. 8. The algorithm of the REX-FPGA controller is required to implement the processing functions represented by the processing block (102) of FIG. 8.

According to the said algorithm, if the received packet at the LEX controller is of type OUT or DATA0, then said packet is forwarded to the REX-FPGA controller. If the received packet at the REX-FPGA controller is of type OUT or DATA0 then said packet is transmitted to the REX hub.

The production of the algorithms shown In FIGS. 9 and 10 are considered to be easily prepared by the skilled artisan once the sequence diagram is understood. Accordingly, the algorithms for the remaining sequence drawings will not be produced.

Figure 11:
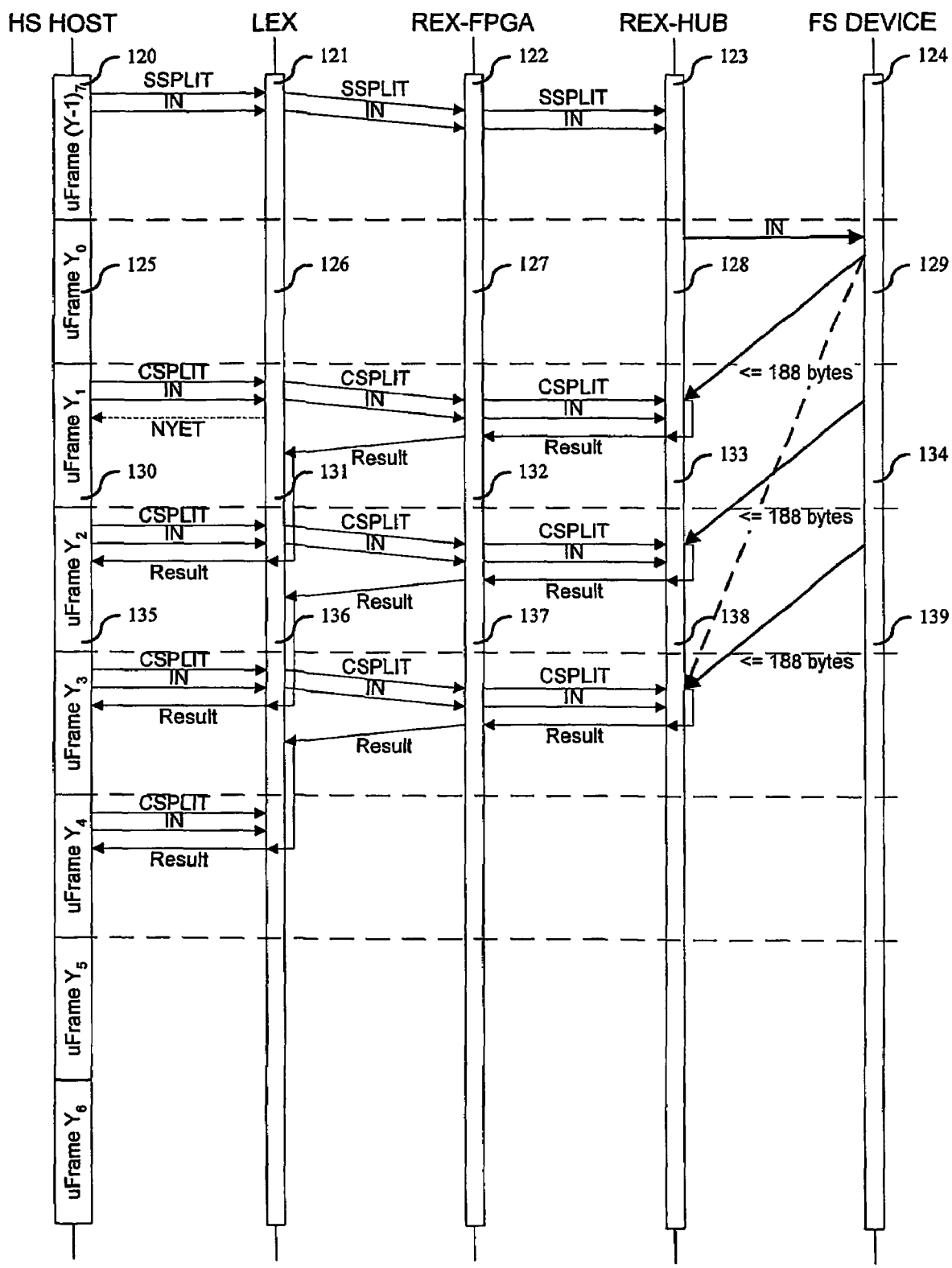
FIG. 11 is a sequence diagram showing an isochronous input transfer between a high-speed host and a full-speed device according to the invention.

FIG. 11 provides a sequence diagram showing an isochronous input transfer, between a high-speed host and a full-speed device. In the last microframe of the previous frame, $(Y-1)_7$, a start split-transaction and a request for input data are transmitted from the Host control logic (120). Said start split-transaction and the request for input data are received by the LEX subsystem as a SSPLIT packet and an IN packet (SSPLIT/IN packets). The control logic (121) within the LEX subsystem forwards the SSPLIT/IN packets to the REX-FPGA subsystem. The control logic (122) within the REX-FPGA subsystem forwards said SSPLIT/IN packets to the REX-Hub.

In the first microframe of the current frame, $Y_0$, the control logic (128) within the REX-Hub absorbs said SSPLIT packet and forwards said IN packet to the Device. The control logic (129) within the device assembles the requested isochronous data packet and transmits the same to the REX-Hub as a continuous stream of data. The size of said isochronous data packet may range from 0 to 1023 bytes, as defined by the USB Specification. The control logic (133) within the REX-Hub stores up to the first 188 bytes of data as a Result packet in its buffer memory.

In the next microframe, $Y_1$, the control logic (131) within the LEX subsystem receives the complete split-transaction and the request for input data from the Host control logic (130) as a CSPLIT packet and an IN packet. With no Result packet stored in its buffer memory, the control logic (131) within the LEX subsystem then generates a synthetic data packet and transmits it as a NYET packet to the Host PC in response to the request for input data. The control logic (131) within the LEX subsystem forwards said CSPLIT/IN packets to the REX-FPGA subsystem. The control logic (132) within the REX-FPGA subsystem forwards said CSPLIT/IN packets to the REX-Hub. On receipt of said CSPLIT/IN packets, the control logic (133) within the REX-Hub recognizes that it contains in its buffer memory the first portion of the data packet from the device. Said control logic retrieves said stored packet and forwards the same to the REX-FPGA as a Result packet. Said control logic (133) also absorbs said CSPLIT/IN packets. The control logic (132) within the REX-FPGA subsystem forwards the Result packet to the LEX subsystem. The control logic (131) in the LEX subsystem stores the Result packet in its buffer memory.

The control logic (138) within the REX-Hub stores up to the next 188 bytes of the remaining data from the device as a Result packet in its buffer memory.

In the subsequent microframe, $Y_2$, the control logic (136) within the LEX subsystem receives the subsequent CSPLIT/IN packets from the control logic (135) within the Host. The control logic (136) within the LEX subsystem forwards the stored Result packet, received in the previous microframe, to the Host and forwards said CSPLIT/IN packets to the REX-FPGA subsystem. The control logic (137) within the REX-FPGA subsystem forwards the CSPLIT/IN packets to the REX-Hub. On receipt of said CSPLIT/IN packets, the control logic (138) within the REX-Hub recognizes that it contains the second portion of the data packet from the device stored in its buffer memory. Said control logic retrieves said stored packet and forwards the same to the REX-FPGA as a Result packet. Said control logic (138) also recognizes that said CSPLIT/IN packets are merely a repetition of the previous CSPLIT/IN packet and absorbs said packets. The control logic (138) within the REX-Hub forwards the Result packet to the REX-FPGA subsystem. The control logic (137) within the REX-FPGA subsystem forwards the Result packet to the LEX subsystem. The control logic (136) in the LEX subsystems stores the Result packet in its buffer memory.

The above-described process is repeated until all the data generated by the device is transmitted to the host by the distributed control logic (e.g. 135, 136, 137, 138, 139). The process described by the distributed control logic (120) to (139) is also repeated for subsequent frames.

In FIG. 11, a dotted line is also shown between the device and the REX-Hub. This dotted line is used to represent the total data flow from the device to the REX-Hub, even though in this case, the REX-Hub interprets the receipt of data as being three data transmissions. In subsequent figures, this dotted line will be used to represent the total data transmission even though the various devices or hubs may treat the transmission as a series of data transmissions.

Figure 12:
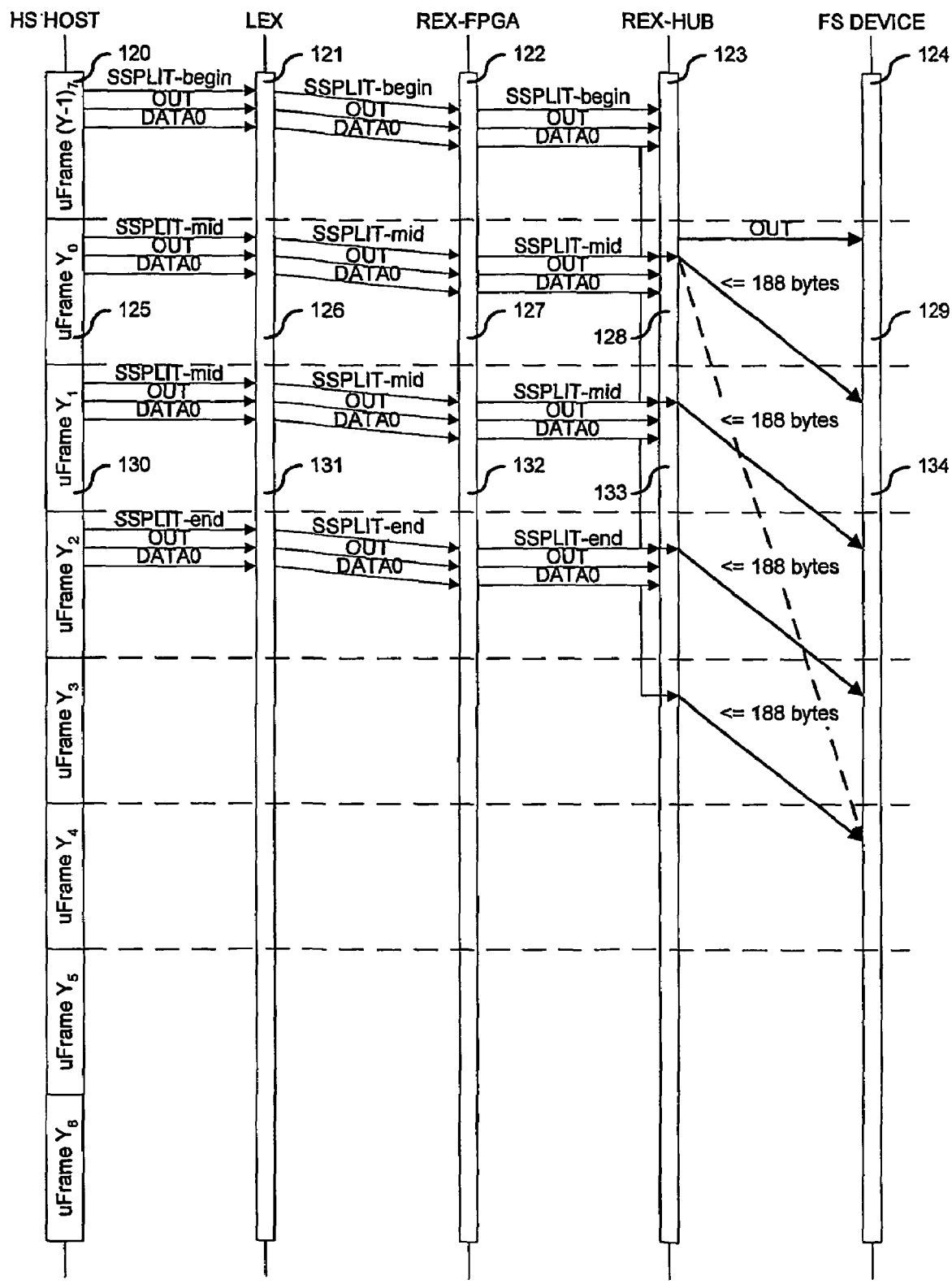
FIG. 12 is a sequence diagram showing an isochronous output transfer between a high-speed host and a full-speed device according to the invention.

FIG. 12 provides a sequence diagram showing an isochronous output transfer, between a high-speed host and a full-speed device. In the last microframe of the previous frame, Microframe $(Y-1)_7$, the control logic (120) within the Host generates a start split-transaction (begin), a notification of output data, and a data packet to the LEX subsystem. Said data packet may contain a maximum of 188 bytes of data. Said start split-transaction, notification of output data, and data packet are transmitted to the LEX subsystem as an SSPLIT-begin packet, an OUT packet, and a DATA0 packet, respectively. The control logic (121) within the LEX subsystem forwards said SSPLIT-begin/OUT/DATA0 packets to the REX-FGPA subsystem. The control logic (122) within the REX-FPGA subsystem forwards said SSPLIT-begin/OUT/DATA0 packets to the REX-Hub. On receipt of said SSPLIT-begin/OUT/DATA0 packets, the control logic (123) within the REX-Hub absorbs said SSPLIT-begin/OUT packets and stores said DATA0 packet in its buffer memory.

In the first microframe of the current frame, Microframe $Y_0$, the control logic (128) within the REX-Hub generates a notification of output data and forwards the same to the Device as an OUT packet. At the same time, the control logic (125) within the host generates a start split-transaction (mid), a notification of output data, and a data packet and transmits the same to the LEX subsystem as SSPLIT-mid/OUT/DATA0 packets. Said data packet may contain a maximum of 188 bytes of data. The control logic (126) within the LEX subsystem forwards said SSPLIT-mid/OUT/DATA0 packets to the REX-FPGA subsystem. The control logic (127) within the REX-FPGA subsystem forwards said SSPLIT-mid/OUT/DATA0 packets to the REX-Hub. On receipt of said SSPLIT-mid/OUT/DATA0 packets, the control logic (128) within the REX-Hub begins forwarding the stored data packet received in the previous microframe to the device. Said control logic also absorbs said SSPLIT-mid/OUT packets and stores the further data packet in its buffer memory.

In the subsequent microframe, Microframe $Y_1$, the control logic (130) within the host generates a start split-transaction, a notification of output data, and a data packet and transmits the same to the LEX subsystem as SSPLIT-mid/OUT/DATA0 packets. Said data packet may contain a maximum of 188 bytes of data. The control logic (131) within the LEX subsystem forwards said SSPLIT-mid/OUT/DATA0 packets to the REX-FPGA subsystem. The control logic (132) within the REX-FPGA subsystem forwards said SSPLIT-mid/OUT/DATA0 packets to the REX-Hub. On receipt of said SSPLIT-mid/OUT/DATA0 packets, the control logic (133) within the REX-Hub begins forwarding the stored data packet received in the previous microframe to the device. The control logic (134) within the device receives the first byte of said stored data packet immediately after receiving the last byte of the data packet sent from the previous frame. The control logic within the REX-Hub transmits data packets to the device in such a manner that the device receives a continuous data stream. The control logic (133) within the REX-Hub also absorbs said SSPLIT-mid/OUT packets and stores said further data packet.

The above-described process is repeated until the host controller transmits the last output data packet by the distributed control logic (e.g. 130, 131,132, 133, 134). The process described by the distributed control logic (120) to (134) is also repeated for subsequent frames.

Figure 13:
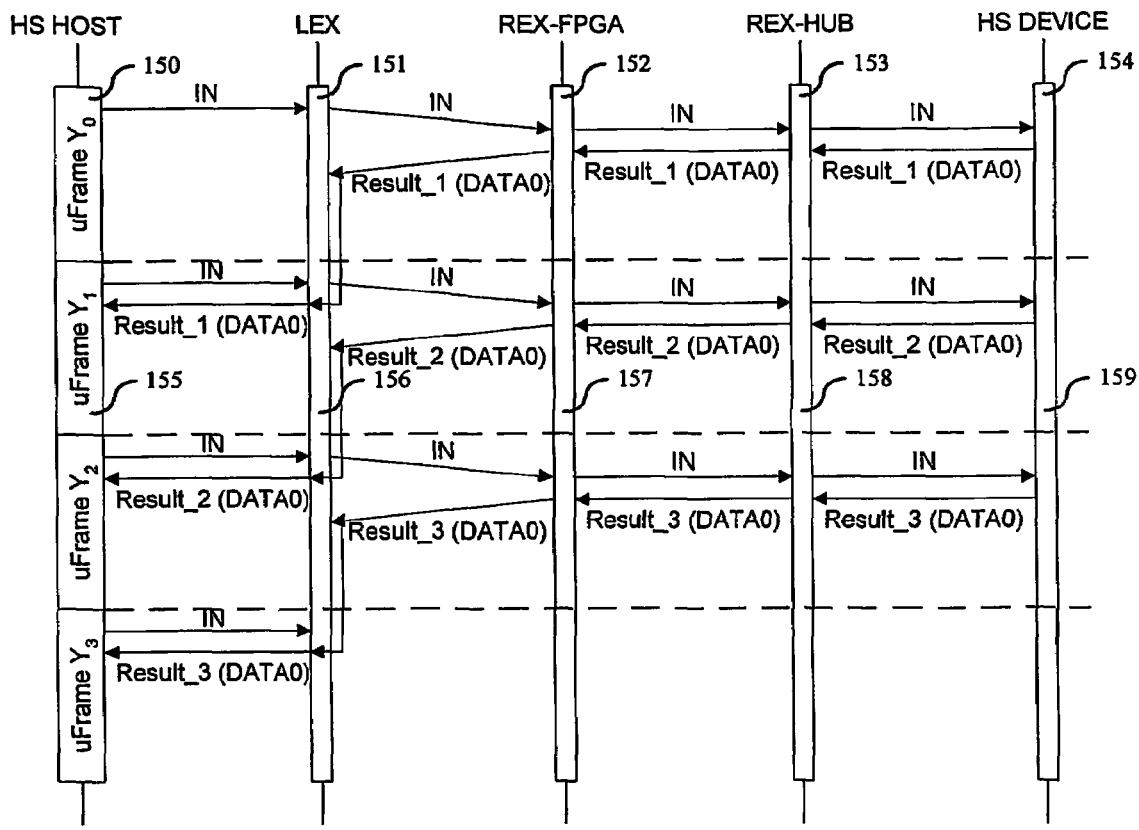
FIG. 13 is a sequence diagram showing an isochronous input transfer between a high-speed host and a high-speed device according to the invention.

FIG. 13 provides a sequence diagram showing an isochronous input transfer, between a high-speed host and a high-speed device. In Microframe $Y_0$, a request for input data is transmitted from the Host control logic (150) and said request is received by the LEX subsystem as an IN packet. The control logic (151) within the LEX subsystem forwards the IN packet to the REX-FPGA subsystem. The control logic (152) within the REX-FPGA subsystem forwards said IN packet to the REX-Hub. The control logic (153) within the REX-Hub forwards said IN packet to the Device.

The control logic (154) within the device assembles the requested isochronous data and transmits it as a Result packet to the REX-Hub. The control logic (153) within the REX-Hub forwards the Result packet to the REX-FPGA subsystem. The control logic (152) within the REX-FPGA subsystem forwards the Result packet to the LEX subsystem. The control logic (151) in the LEX subsystem stores the Result packet in its buffer memory.

In Microframe $Y_1$, the control logic (155) within the Host recognizes that it has not received a response to its previous request for input data and it automatically retries the transaction by generating a further request addressed to the same USB function as in Microframe $Y_0$. Said further request is transmitted to the LEX subsystem as a second IN packet. On receipt of the second IN packet, the control logic (156) within the LEX subsystem recognizes that it has a Result packet stored in memory from the same function identified by the further IN packet and transmits said packet to the host. Said control logic (156) also forwards the further IN packet to the REX-FPGA subsystem. The control logic (157) within the REX-FPGA subsystem forwards said IN packet to the REX-Hub. The control logic (158) within the REX-Hub forwards said IN packet to the Device.

The control logic (159) within the device assembles the requested isochronous data and transmits it as a Result packet to the REX-Hub. The control logic (158) within the REX-Hub forwards said Result packet to the REX-FPGA subsystem. The control logic (157) within the REX-FPGA subsystem forwards said Result packet to the LEX subsystem. The control logic (156) in the LEX subsystem stores said Result packet in its buffer memory.

The above-described process is repeated for subsequent microframes by the distributed control logic (e.g. 155, 156, 157, 158, 159).

Figure 14:
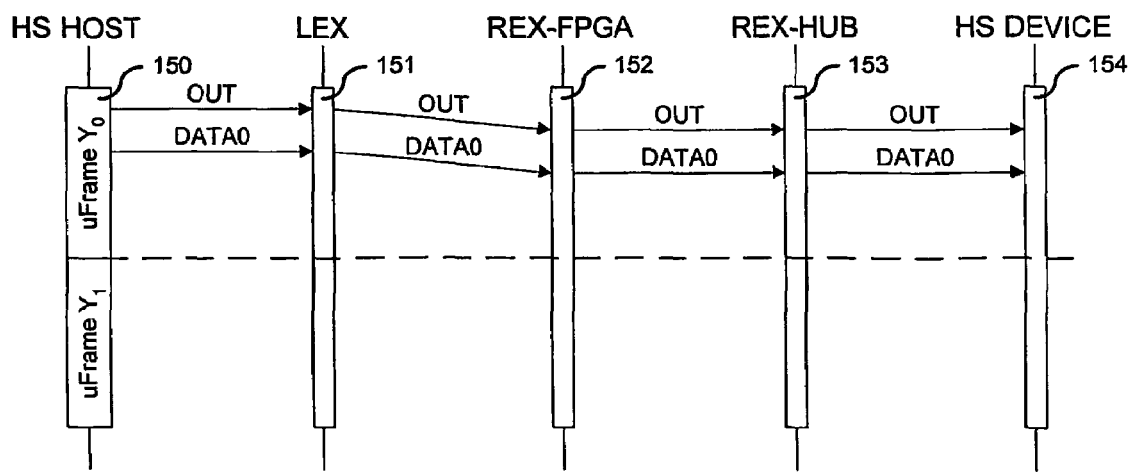
FIG. 14 is a sequence diagram showing an isochronous output transfer between a high-speed host and a high-speed device according to the invention.

FIG. 14 provides a sequence diagram showing an isochronous output transfer, between a high-speed host and a high-speed device. In Microframe $Y_0$, the control logic (150) within the Host generates a notification of output data, addressed to a particular USB function. Said notification is transmitted to the LEX subsystem as an OUT packet. The control logic (151) within the LEX subsystem forwards said OUT packet to the REX-FPGA subsystem. The control logic (152) within the REX-FPGA subsystem forwards said OUT packet to the REX-Hub. The control logic (153) within the REX-Hub forwards said OUT packet to the Device. The information is received by the control logic within the device.

The control logic (150) within the Host assembles the notified isochronous data and transmits it as a DATA0 packet to the LEX subsystem. The control logic (151) within the LEX subsystem forwards said DATA0 packet to the REX-FPGA subsystem. The control logic (152) within the REX-FPGA subsystem forwards said DATA0 packet to the REX-Hub. The control logic (153) within the REX-Hub forwards said DATA0 packet to the device. The information is received by the control logic (154) within the device.

The above-described process is repeated for subsequent microframes by the distributed control logic (e.g. 150, 151, 152, 153, 154).

Figure 15:
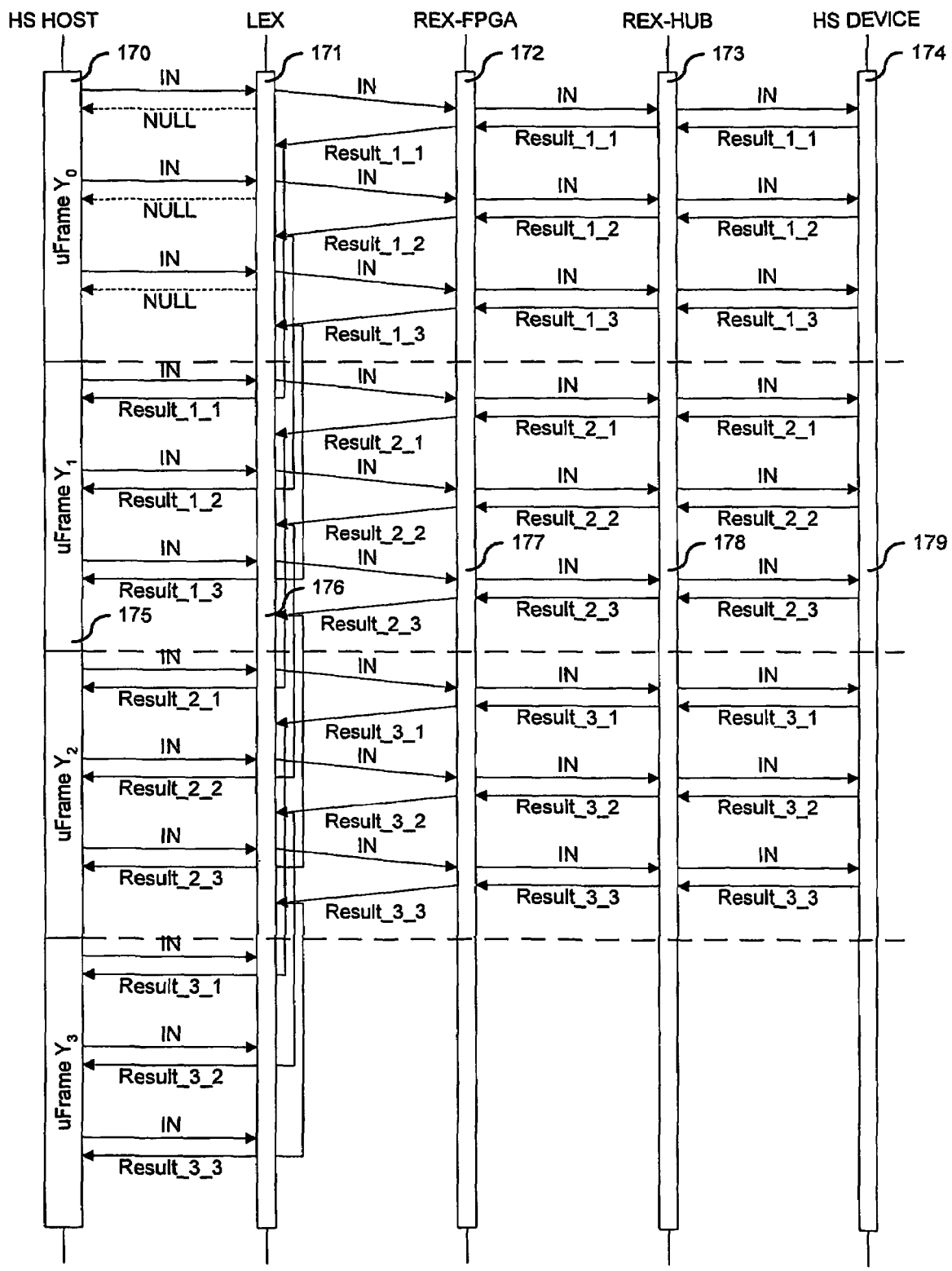
FIG. 15 is a sequence diagram showing a high bandwidth isochronous input transfer between a high-speed host and a high-speed device according to the invention.

FIG. 15 provides a sequence diagram showing a high-bandwidth isochronous input transfer, between a high-speed host and a high-speed device. In Microframe $Y_0$, the control logic (170) in the Host PC generates a request for input data. Said request for input data is transmitted to the LEX subsystem as an IN packet. The control logic (171) within the LEX subsystem generates a synthetic data packet and transmits it as a NULL packet to the Host in response to the input data request. The control logic (171) within the LEX subsystem forwards the IN packet to the REX-FPGA subsystem. The control logic (172) within the REX-FPGA subsystem forwards said IN packet to the REX-Hub. The control logic (173) within the REX-Hub forwards said IN packet to the Device.

The control logic (174) within the device assembles the requested isochronous data and transmits it as a Result_1_1 packet to the REX-Hub. The control logic (173) within the REX-Hub forwards the Result_1_1 packet to the REX-FPGA subsystem. The control logic (172) within the REX-FPGA subsystem forwards the Result_1_1 packet to the LEX subsystem. The control logic (171) in the LEX subsystem stores the Result_1_1 packet in its buffer memory.

On receipt of the first NULL packet generated by the LEX subsystem, the control logic (170) within the Host generates a second request for input data within the same microframe, $Y_0$. Said request for input data is transmitted to the LEX subsystem as an IN packet. The control logic (171) within the LEX subsystem generates a second synthetic data packet and transmits it as a NULL packet to the Host. The second IN packet is forwarded to the device in the same manner as the first IN packet.

On receipt of the second IN packet, the control logic (174) within the device assembles the requested isochronous data and transmits it as a Result_1_2 packet to the REX-Hub. The Result_1_2 packet is transmitted to the LEX subsystem in the same manner as the Result_1_1 packet and it is also stored in the buffer memory of the LEX subsystem.

On receipt of the second NULL packet generated by the LEX subsystem, the control logic (170) within the Host generates a third request for input data within the same microframe, $Y_0$. Said request for input data is transmitted to the LEX subsystem as an IN packet. The control logic (171) within the LEX subsystem generates a third synthetic data packet and transmits it as a NULL packet to the Host. The third IN packet is forwarded to the device in the same manner as the first and second IN packet.

On receipt of the third IN packet, the control logic (174) within the device assembles the requested isochronous data and transmits it as a Result_1_3 packet to the REX-Hub. The Result_1_3 packet is transmitted to the LEX subsystem in the same manner as the Result_1_1 and Result_1_2 packets and it is also stored in the buffer memory of the LEX subsystem.

In Microframe $Y_1$, the control logic (175) within the Host generates a request for input data and transmits said request as an IN packet to the LEX subsystem. The control logic (176) within the LEX subsystem forwards the first stored result packet, Result_1_1, to the Host in response to the input data request. The control logic (176) within the LEX subsystem forwards said IN packet to the REX-FPGA subsystem. The control logic (177) within the REX-FPGA subsystem forwards said IN packet to the REX-Hub. The control logic (178) within the REX-Hub forwards said IN packet to the Device.

On receipt of said IN packet, the control logic (179) within the device assembles the requested isochronous data and transmits it as a Result_2_1 packet to the REX-Hub. The control logic (178) within the REX-Hub forwards the Result_2_1 packet to the REX-FPGA subsystem. The control logic (177) within the REX-FPGA subsystem forwards the Result_2_1 packet to the LEX subsystem. The control logic (176) within the LEX subsystem stores the Result_2_1 packet in its buffer memory.

Within the same microframe, $Y_1$, the control logic (175) within the Host generates a second request for input data and transmits said request as an IN packet to the LEX subsystem. The control logic (176) within the LEX subsystem forwards the second stored result packet, Result_1_2, to the Host In response to the input data request. Said IN packet is forwarded to the device in the same manner as the previous IN packet.

On receipt of the second IN packet, the control logic (179) within the device assembles the requested isochronous data and transmits it as a Result_2_2 packet to the REX-Hub. The Result_2_2 packet is transmitted to the LEX subsystem in the same manner as the Result_2_1 packet and it is stored in the buffer memory of the LEX subsystem.

Within the same microframe, $Y_1$, the control logic (175) within the Host generates a third request for input data and transmits said request as an IN packet to the LEX subsystem. The control logic (176) within the LEX subsystem forwards the third stored result packet, Result_1_3, to the Host in response to the input data request. Said IN packet is forwarded to the device in the same manner as the previous IN packet.

On receipt of the third IN packet, the control logic (179) within the device assembles the requested isochronous data and transmits it as a Result_2_3 packet to the REX-Hub. The Result_2_3 packet is transmitted to the LEX subsystem in the same manner as the Result_2_1 and Result_2_2 and it is stored in the buffer memory of the LEX subsystem.

The above-described process is repeated for subsequent microframes by the distributed control logic (e.g. 175, 176, 177, 178, 179).

Figure 16:
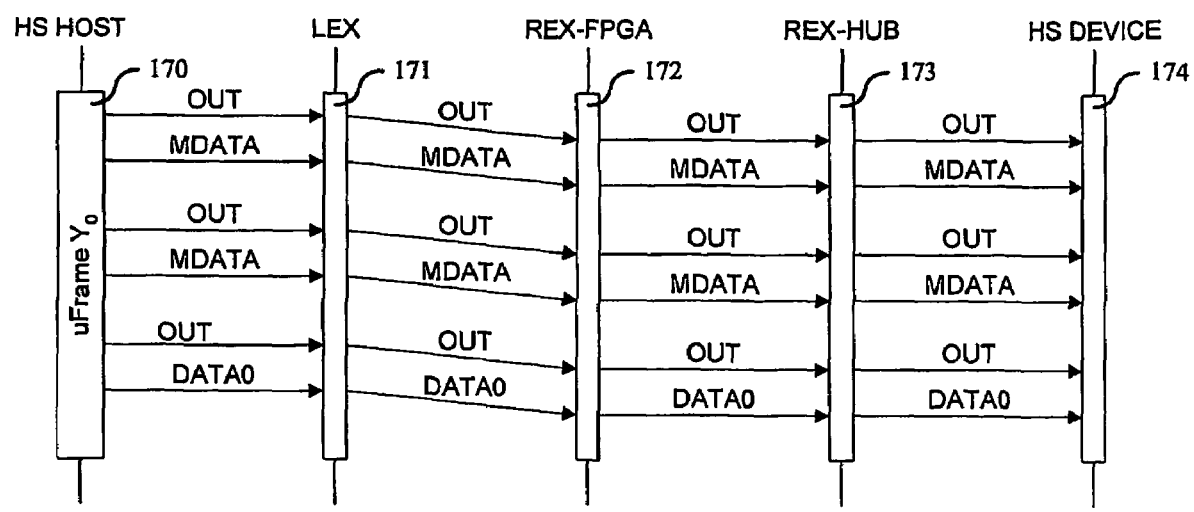
FIG. 16 is a sequence diagram showing a high bandwidth isochronous output transfer between a high-speed host and a high-speed device according to the invention.

FIG. 16 provides a sequence diagram showing a high-bandwidth isochronous output transfer, between a high-speed host and a high-speed device. In Microframe $Y_0$, the control logic (170) within the Host generates a notification of output data addressed to a particular USB function. Said notification is transmitted to the LEX subsystem as an OUT packet. The control logic (171) within the LEX subsystem forwards said OUT packet to the REX-FPGA subsystem. The control logic (172) within the REX-FPGA subsystem forwards said OUT packet to the REX-Hub. The control logic (173) within the REX-Hub forwards said OUT packet to the Device. The information is received by the control logic within the device.

The control logic (170) within the Host assembles the notified isochronous data and transmits it as an MData packet to the LEX subsystem. The control logic (171) within the LEX subsystem forwards said MData packet to the REX-FPGA subsystem. The control logic (172) within the REX-FPGA subsystem forwards said MDATA packet to the REX-Hub. The control logic (173) within the REX-Hub forwards said MDATA packet to the device. The information is received by the control logic (174) within the device.

Within the same microframe, $Y_0$, the control logic (170) within the Host generates a second notification of output data. Said notification is transmitted to the LEX subsystem as an OUT packet and is transmitted to the device in the same manner as the previous OUT packet. The control logic (170) within the Host then assembles the notified isochronous data and transmits it as a second MDATA packet to the LEX subsystem. Said MDATA packet is transmitted to the device in the same manner as the previous MDATA packet.

In the same microframe, $Y_0$, the control logic (170) within the Host generates a third notification of output data. Said notification is transmitted to the LEX subsystem as an OUT packet and is transmitted to the device in the same manner as the previous OUT packet. The control logic (170) within the Host then assembles the notified isochronous data and transmits the same as a DATA0 packet to the LEX subsystem. The control logic (171) within the LEX subsystem forwards said DATA0 packet to the REX-FPGA subsystem. The control logic (172) within the REX-FPGA subsystem forwards said DATA0 packet to the REX-Hub. The control logic (173) within the REX-Hub forwards said DATA0 packet to the device. The information is received by the control logic (174) within the device.

FIG. 17 provides a simplified timing diagram showing interrupt transfers, a special case of asynchronous transfers, according to the prior art USB protocol. The diagram is constructed from the point of view of a USB Host Controller, normally included on a PC motherboard (Host PC). The USB protocol divides time allocation on the shared bus into regular intervals. The start of each interval is again identified on the diagram as I1, I2, I3, I4. For a full-speed host, each interval is 1 ms in duration and Is again referred to as a frame. For a high-speed host, each interval is 125 $\mu$s in duration and is referred to as a microframe.

When a Host Controller is engaged upon an interrupt transfer with a device, the Host Controller issues regular requests for data transfer to said device. These requests are identified as packets R1, R2, and R3 (10, 13, & 17). Under the USB protocol, a USB device must respond to the request from a full-speed host within 16 full-speed bit-times. In response to requests from a high-speed host, a USB device must respond within 736 high-speed bit-times. The responses are shown in the diagram as packets In1, In2, and In3 (11, 14, & 18). On receipt of a response packet, the Host Controller also emits an acknowledgement and these acknowledgements are identified as packets K1, K2, K3 (12, 15, & 19). It is commonly expected that transfer In1 (11) will be delivered in response to request R1 (10) and acknowledgement K1 (12) will be emitted on receipt of In1 (11) within the same interval, transfer In2 (14) will be delivered in response to request R2 (13) and acknowledgement K2 (15) will be emitted on receipt of In2 (14) within the same interval, and so on until the requests are terminated.

FIG. 18 provides a simplified timing diagram showing interrupt transfers, a special case of asynchronous transfers, which is essentially identical to the system described in PCT/CA00/00157, for full-speed hosts and/or devices. The diagram shows the progression of packets through the various subsystems comprising the invention. Time lines are presented for the Host PC (1), Local Expander (4) and Remote Expander FPGA (8) subsystems as shown in FIG. 2.

An interrupt transfer is initiated from a Host PC (1) by emitting a request for input data R1 (20) to a particular USB address and end-point. Said request R1 (20) is received by the LEX and retransmitted as R1 (25) over the external cabling to the REX-FPGA (8). Said retransmitted packet R1 (25) is received by the REX-FPGA and forwarded as R1 (32) to the REX-Hub (9). A synthetic negative acknowledgement packet is generated by the LEX (4) and transmitted as N1 (26) to the host.

The target device generates an input data packet In1 (33). According to the USB protocol for low-speed and full-speed isochronous transfers, a device with a detachable cable must generate a response within 6.5 full-speed bit-times of the end of the corresponding request. For high-speed isochronous transfers, a device must generate a response within 192 high-speed bit times. Said input data packet In1 (33) is received by the REX-Hub (9) and the REX-FPGA (8) subsystem and retransmitted as In1 (27) over the external wiring to the LEX (4). Said retransmitted response In1 (27) is not immediately forwarded to the Host PC (1), but is stored within the memory of the LEX subsystem (4). A synthetic acknowledgement packet K1 (34) is generated by the REX-FGPA subsystem (8) and transmitted as K1 (34) to the REX-Hub (9).

The Host PC (1) notices that it did not receive data in response to its request R1 (20), and retries the transaction by generating a further request R2 (22) to the same USB address and end-point. Upon receiving request R2 (28), the LEX subsystem retrieves response In1 (27) from its memory buffers and forwards it to the Host PC (1) as response In1 (29). Said response is received by the Host as response In1 (23). Upon receiving said response In1 (23), the Host generates an acknowledgement packet and transmits the packet as packet K1 (24) to the LEX subsystem (4). Said acknowledgement packet K1 (30) is received and absorbed by LEX.

Said second request R2 (22) is repeated as R2 (28) through the LEX and forwarded as R2 (35) to the device. The target device generates a second response In2 (36) which is transmitted as In2 (31) to the LEX. Said retransmitted response In2 (31) is stored in the memory of the LEX subsystem. A synthetic acknowledgement packet is generated by the REX-FPGA subsystem and transmitted to the REX-Hub. The protocol sequence is repeated as necessary.

Figure 19:
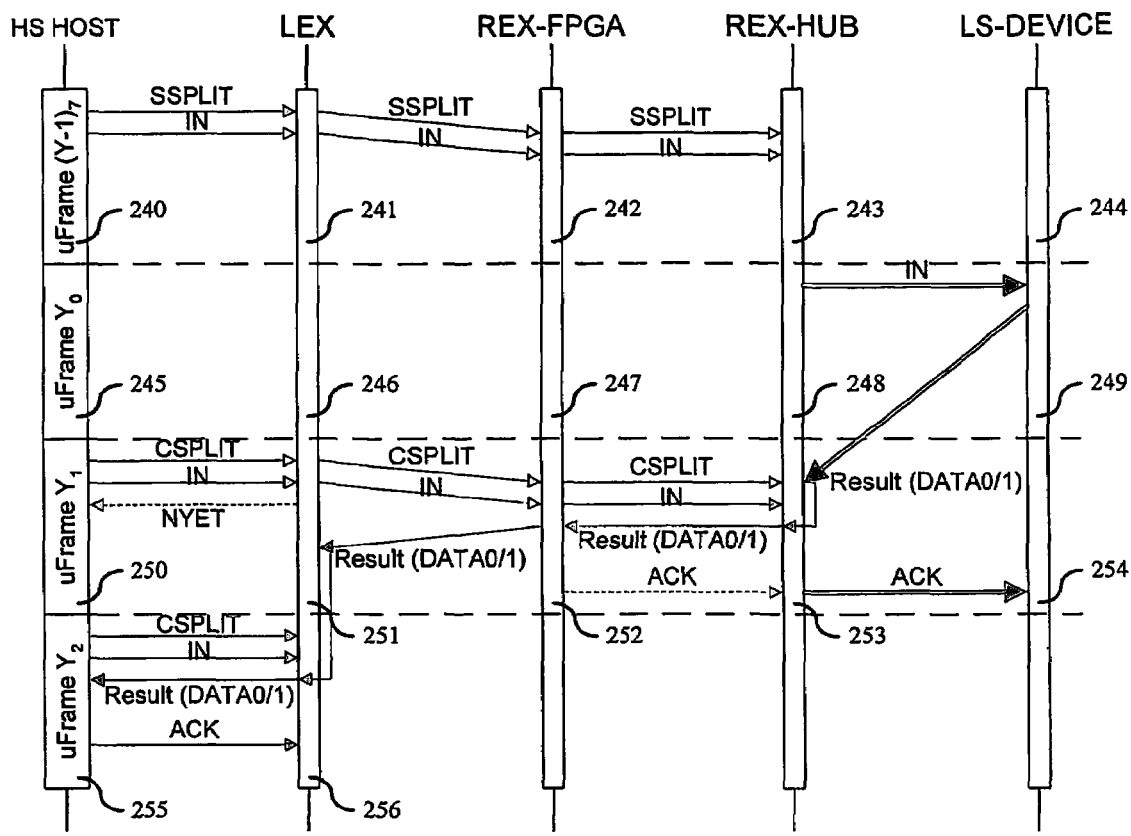
FIG. 19 is a sequence diagram showing an interrupt input transfer between a high-speed host and a low-speed device according to the invention.

FIG. 19 provides a sequence diagram showing an interrupt input transfer, between a high-speed host and a full-speed or low-speed device. In the microframe before the current frame, Microframe $(Y-1)_7$, the control logic (240) within the Host generates a start split-transaction followed by a request for input data, addressed to a particular USB function. Said split-transaction and request are transmitted to the LEX subsystem as an SSPLIT packet and an IN packet (SSPLIT/IN packets). The control logic (241) within the LEX subsystem forwards the SSPLIT/IN packets to the REX-FPGA subsystem. The control logic (242) within the REX-FPGA subsystem forwards said SSPLIT/IN packets to the REX-Hub. The control logic (243) within the REX-Hub absorbs said SSPLIT packet. In the first microframe of the current frame, Microframe $Y_0$, the control logic (248) within the REX-Hub forwards said IN packet to the Device. The control logic (249) within the device assembles the requested interrupt data and transmits the same as a Result packet to the REX-Hub.

In the next microframe, Microframe $Y_1$, the control logic (250) in the Host recognizes that it has not received a response to its previous request for input data. Said control logic automatically retries the transaction by generating a complete split-transaction followed by a further request addressed to the same USB function as in Microframe $(Y-1)_7$. Said split-transaction and further request are transmitted to the LEX subsystem as a CSPLIT packet and an IN packet (CSPLIT/IN packets). On receipt of said CSPLIT/IN packets, the control logic (251) within the LEX subsystem recognizes the lack of data that corresponds to the Input request in its buffer memory. Said control logic (251) then generates a NYET packet to the Host. Said NYET packet warns the Host that the LEX subsystem has not yet received a response from the device and enables said Host to progress to the next transaction. Said control logic (251) also forwards the CSPLIT/IN packets to the REX-FPGA subsystem. The control logic (252) within the REX-FPGA subsystem forwards said CSPLIT/IN packets to the REX-Hub.

The control logic (253) within the REX-Hub receives the Result packet from the device and forwards said Result packet to the REX-FPGA subsystem. On receipt of said Result packet, the control logic (252) within the REX-FPGA subsystem generates a synthetic acknowledgement packet which is transmitted as an ACK packet to the REX-Hub. The control logic (253) within the REX-Hub forwards said ACK packet to the Device. The control logic (252) within the REX-FPGA subsystem forwards said Result packet to the LEX subsystem and the control logic (251) within the LEX subsystem stores said result packet in its buffer memory.

In the next microframe, Microframe $Y_2$, the control logic (255) in the Host recognizes that it has not received the requested data and automatically retries the transaction by generating a further complete split-transaction and a further request addressed to the same USB function as in Microframe $Y_1$. The complete split-transaction and request for input data are transmitted to the LEX subsystem as CSPLIT/IN packets. On receipt of the CSPLIT/IN packets, the control logic (256) within the LEX subsystem recognizes that it has a Result packet stored in memory from the same function identified by the further CSPLIT/IN packets. Said control logic retrieves said stored Result packet from memory and transmits said stored packet to the Host. Said control logic also recognizes that said CSPLIT/IN packets are merely a repetition of the previous CSPLIT/IN packets and absorbs said packets. When the control logic (255) of the Host receives the requested Result packet from the LEX, said control logic generates an ACK packet to acknowledge a successful transmission. Upon receipt of the ACK packet from the host, the control logic (256) within the LEX subsystem absorbs said ACK packet.

Figure 20:
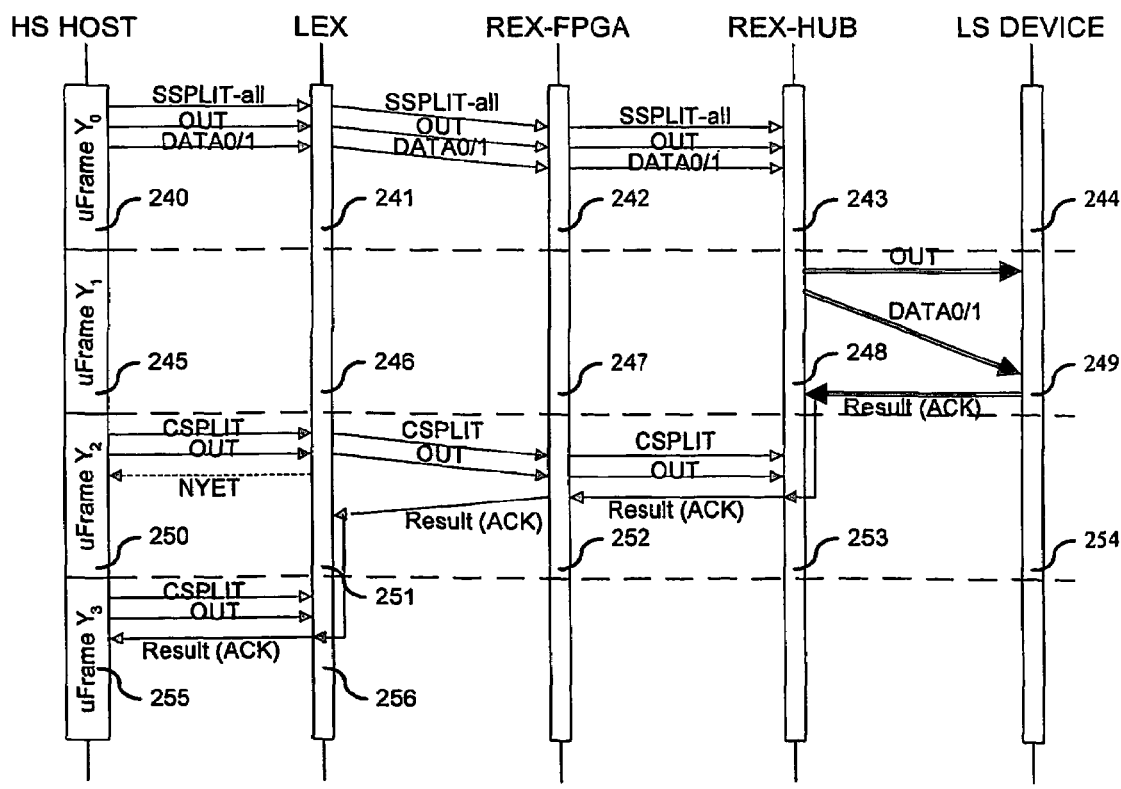
FIG. 20 is a sequence diagram showing an interrupt output transfer between a high-speed host and a low-speed device according to the invention.

FIG. 20 provides a sequence diagram showing an interrupt output transfer, between a high-speed host and a full speed or low-speed device. In Microframe $Y_0$, the control logic (240) generates a start split-transaction, a notification of output data, and output data, addressed to a particular USB function. Said start split-transaction, notification of output data, and output data are transmitted to the LEX subsystem as an SSPLIT packet, an OUT packet, and a DATAX packet, respectively. Said DATAX packet represents either a DATA0 packet or a DATA1 packet. The control logic (241) within the LEX subsystem forwards said SSPLIT/OUT/DATAX packets to the REX-FPGA subsystem. The control logic (242) within the REX-FPGA subsystem forwards said SSPLIT/OUT/DATAX packets to the REX-Hub.

In Microframe $Y_1$, the control logic (248) within the REX-Hub forwards the OUT packet and DATAX packet to the device. The information is received by the control logic (249) within the device. On receipt of said DATAX packet, the control logic (249) within the device generates an acknowledgement and transmits the same to the REX-Hub as a Result packet. The control logic (248) within the REX-Hub stores said Result packet in its buffer memory.

In Microframe $Y_2$, the control logic (250) within the Host generates a complete split-transaction followed by a notification of output data, addressed to the same USB function as in Microframe $Y_0$. Said complete split transaction and notification of output data are transmitted to the LEX subsystem as a CSPLIT packet and an OUT packet (CSPLIT/OUT packets). On receipt of said CSPLIT/OUT packets, the control logic (251) within the LEX subsystem recognizes the lack of data that corresponds to the CSPLIT/OUT packets in its buffer memory. Said control logic (251) then generates a NYET packet to the Host. Said NYET packet warns the Host that the LEX subsystem has not yet received a response from the device and enables said Host to progress to the next transaction. The control logic (251) within the LEX subsystem forwards said CSPLIT/OUT packets to the REX-FPGA subsystem. The control logic (252) within the REX-FPGA subsystem forwards said CSPLIT/OUT packets to the REX-Hub.

On receipt of the CSPLIT/OUT packets, the control logic (253) within the REX-Hub recognizes that it has a Result packet stored in memory from the function identified by the SSPLIT/OUT/DATAX packets from Microframe $Y_0$. Said control logic retrieves said stored Result packet from memory and transmits the same to the REX-FPGA subsystem. The control logic (252) within the REX-FPGA subsystem forwards said Result packet to the LEX subsystem. The control logic (251) within the LEX subsystem stores said Result packet in its buffer memory.

In Microframe $Y_3$, the control logic (255) within the host recognizes that it has not yet received an acknowledgement from the device. Said control logic generates a further complete split-transaction and a further notification of output data, addressed to the same USB function as in the previous microframe. Said complete split-transaction and notification of output data are transmitted to the LEX subsystem as further CSPLIT/OUT packets. On receipt of the CSPLIT/OUT packets, the control logic (256) within the LEX subsystem recognizes that it has a Result packet stored in the memory from the function identified by the further CSPLIT/OUT packets. Said control logic retrieves said stored Result packet from memory and transmits the same to the Host. Said control logic also recognizes that said CSPLIT/OUT packets are merely a repetition of the previous CSPLIT/OUT packets and absorbs said packets.

Figure 21:
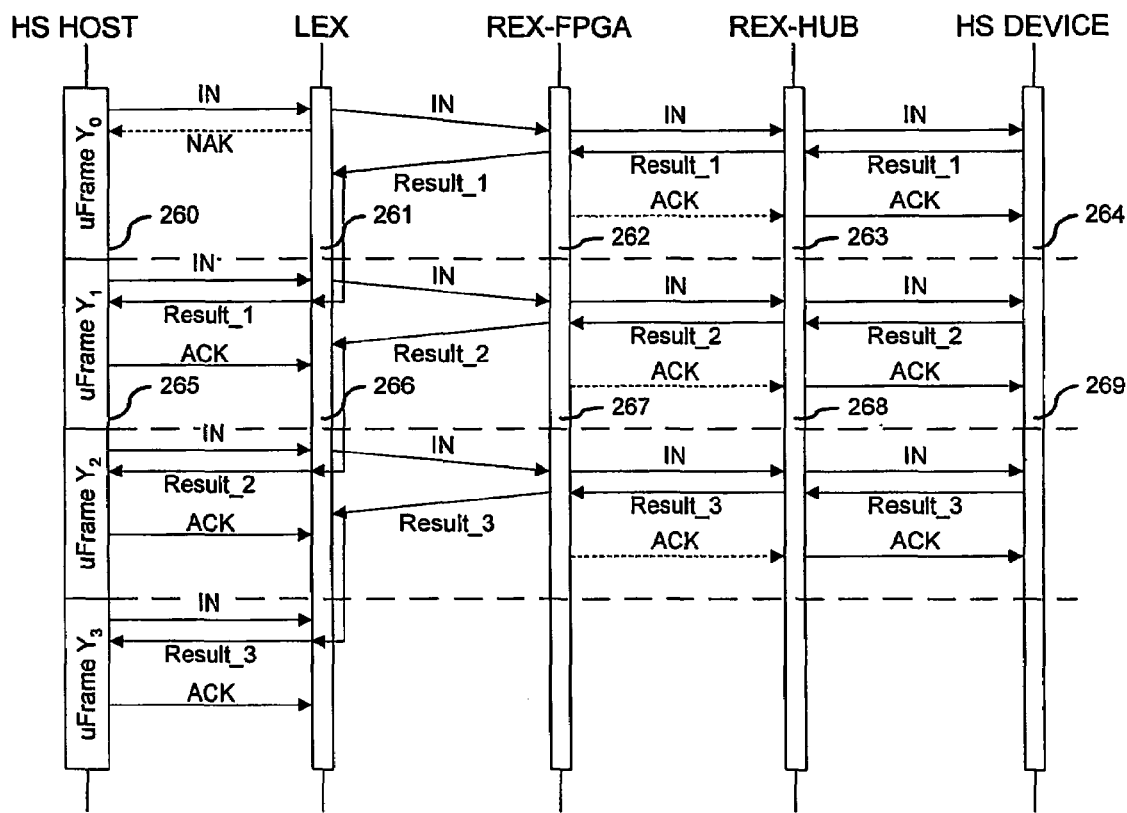
FIG. 21 is a sequence diagram showing an interrupt input transfer between a high-speed host and a high-speed device according to the invention.

FIG. 21 provides a sequence diagram showing an interrupt input transfer, between a high-speed host and a high-speed device. In Microframe $Y_0$, the control logic (260) within the Host generates a request for input data, addressed to a particular USB function. Said request is transmitted to the LEX subsystem as an IN packet. On receipt of said IN packet, the control logic (261) within the LEX subsystem recognizes the lack of data that corresponds to the input request in its buffer memory. Said control logic (261) then generates a synthetic negative acknowledgement packet and transmits the same as a NAK packet to the Host. Said NAK packet warns the Host that it will not receive a response to its request and enables said Host to progress to the next transaction. The control logic (261) within the LEX subsystem forwards the IN packet to the REX-FPGA subsystem. The control logic (262) within the REX-FPGA subsystem forwards said IN packet to the REX-Hub. The control logic (263) within the REX-Hub forwards said request for input data as an IN packet to the Device. The control logic (264) within the device assembles the requested interrupt data and transmits the same as a Result packet to the REX-Hub. The control logic (263) within the REX-Hub forwards the Result packet to the REX-FPGA subsystem. On receipt of said Result packet, the control logic (262) within the REX-FPGA subsystem generates a synthetic acknowledgement packet that is transmitted as an ACK packet to the REX-Hub.

The control logic (263) within the REX-Hub forwards said ACK packet to the Device. The control logic (262) within the REX-FPGA subsystem forwards said Result packet to the LEX subsystem and the control logic (261) within the LEX subsystem stores said result packet in its buffer memory.

In Microframe $Y_1$, the control logic (265) within the Host recognizes that it has not received the requested data and automatically retries the transaction by generating a further request addressed to the same USB function as in Microframe $Y_0$. Said further request is transmitted to the LEX subsystem as a second IN packet. On receipt of the second IN packet, the control logic (266) within the LEX subsystem recognizes that it has a Result packet stored in memory from the same function identified by the further IN packet. Said control logic retrieves said stored Result packet from memory and transmits the same packet to the Host When the control logic (265) of the Host receives the requested Result packet from the LEX, said control logic generates an ACK packet to acknowledge a successful transmission. Upon receipt of the ACK packet from the host, the control logic (266) within the LEX subsystem absorbs said packet. Said control logic (266) forwards the further IN packet to the REX-FPGA subsystem. The control logic (267) within the REX-FPGA forwards said IN packet to the REX-Hub. The control logic (268) within the REX-Hub forwards said request for input data as an IN packet to the Device.

The control logic (269) within the device assembles the requested interrupt data and transmits the same as a Result packet to the REX-Hub. The control logic (268) within the REX-Hub forwards the Result packet to the FPGA subsystem. On receipt of said Result packet, the control logic (267) within the REX-FPGA subsystem generates a synthetic acknowledgement packet that is transmitted as an ACK packet to the REX-Hub. The control logic (268) within the REX-Hub forwards said ACK packet to the Device. The control logic (267) within the REX-FPGA subsystem forwards said Result packet to the LEX subsystem and the control logic (266) within the LEX subsystem stores said result packet in its buffer memory.

The above-described process is repeated for subsequent input data requests from the Host by the distributed control logic (e.g. 265, 266, 267, 268, 269).

Figure 22:
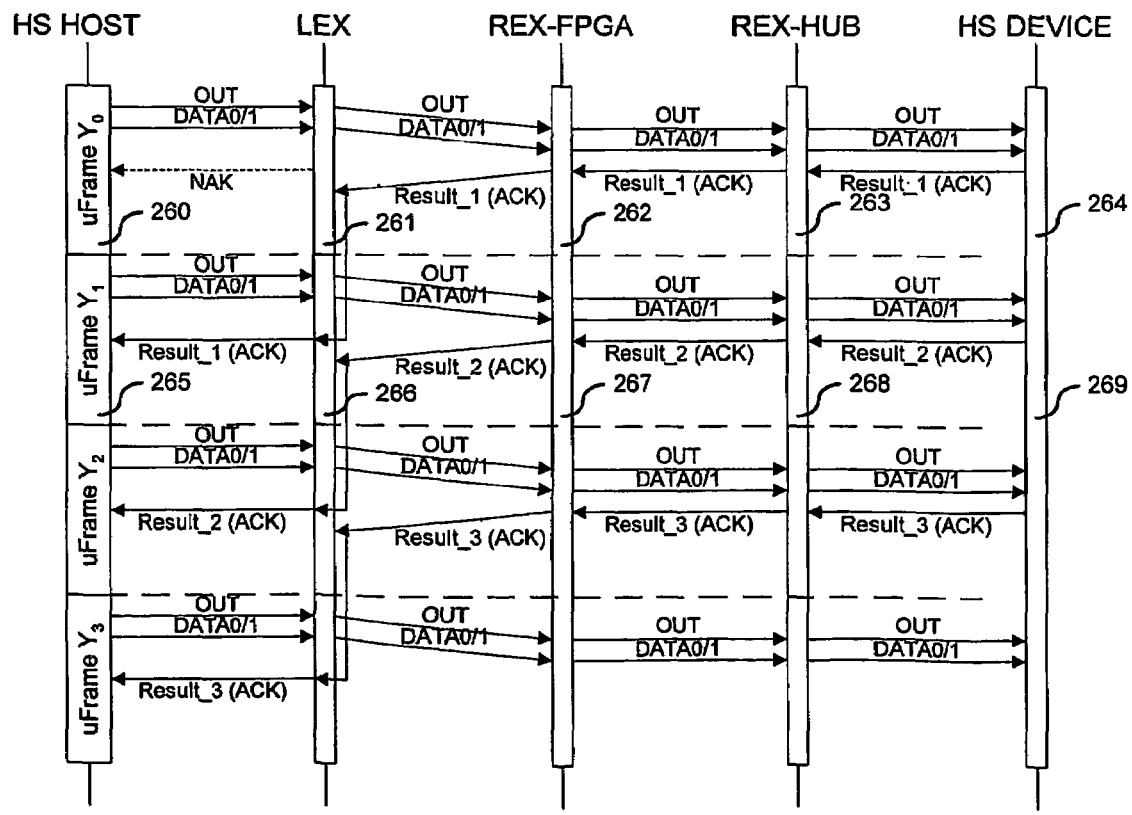
FIG. 22 is a sequence diagram showing an interrupt output transfer between a high-speed host and a high-speed device according to the invention.

FIG. 22 provides a sequence diagram showing an interrupt output transfer, between a high-speed host and a high-speed device. In Microframe $Y_0$, the control logic (260) within the Host generates a notification of output data followed by output data, addressed to a particular USB function. Said notification and output data are transmitted to the LEX subsystem as an OUT packet and a DATAX packet (OUT/DATAX packets). Said DATAX packet represents either a DATA0 packet or a DATA1 packet. On receipt of the OUT/DATAX packets, the control logic (261) within the LEX subsystem generates a synthetic negative acknowledgement packet and transmits the same to the Host as a NAK packet. Said NAK packet warns the Host that it will not receive a response to its request and enables said Host to progress to the next transaction. The control logic (261) within the LEX subsystem forwards said OUT/DATAX packets to the REX-FPGA subsystem. The control logic (262) within the REX-FPGA subsystem forwards said OUT/DATAX packets to the REX-Hub. The control logic (263) within the REX-Hub forwards said OUT/DATAX packets to the Device. The information is received by the control logic within the device.

On receipt of the OUT/DATAX packets, the control logic (264) within the device generates an acknowledgement and transmits the same as a Result packet to the REX-Hub. The control logic (263) within the REX-Hub forwards said Result packet to the REX-FPGA subsystem. The control logic (262) within the REX-FPGA subsystem forwards said Result packet to the LEX subsystem. The control logic (261) within the LEX subsystem stores said Result packet in its buffer memory.

In Microframe $Y_1$, the control logic (265) within the Host recognizes that it has not received an acknowledgement from the device. Said control logic generates a second notification of output data and output data, addressed to the same USB function. Said notification and output data are transmitted to the LEX subsystem as OUT/DATAX packets. On receipt of said OUT/DATAX packets, the control logic (266) within the LEX subsystem recognizes that it has a Result packet stored in memory from the same function identified by the further OUT/DATAX packets. Said control logic retrieves said stored Result packet from memory and transmits the same to the Host. Said further OUT/DATAX packets are transmitted to the device in the same manner as the previous OUT/DATAX packets. The information is then received by the control logic (269) within the device.

On receipt of the OUT/DATAX packets, the control logic (269) within the device generates an acknowledgement and transmits the same as a Result packet to the REX-Hub. Said Result packet is then transmitted to and stored in the LEX subsystem in the same manner as the previous Result packet.

The above-described process is repeated for subsequent notifications of output data and output data from the Host by the distributed control logic (e.g. 265, 266, 267, 268, 269).

Figure 23:
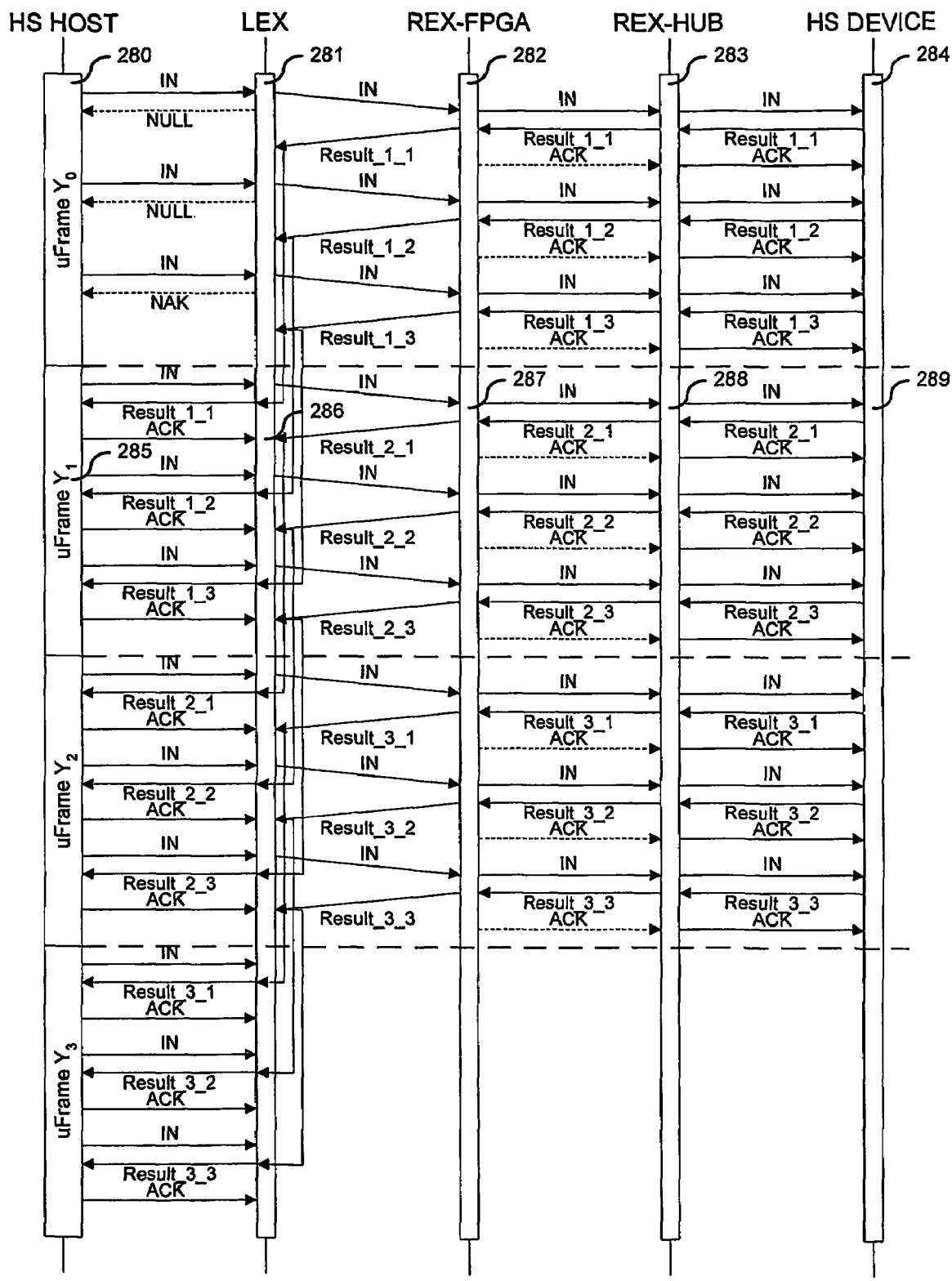
FIG. 23 is a sequence diagram showing a high bandwidth interrupt input transfer between a high-speed host and a high-speed device according to the invention.

FIG. 23 provides a sequence diagram showing a high bandwidth interrupt input transfer, between a high-speed host and a high-speed device, according to the invention. In Microframe $Y_0$, the control logic (280) within the Host generates a request for input data, addressed to a particular USB function. Said request is transmitted to the LEX subsystem as an IN packet. On receipt of said IN packet, the control logic (281) within the LEX subsystem recognizes the lack of data that corresponds to the input request in its buffer memory. Said control logic (281) then generates a synthetic data packet and transmits the same as a NULL packet to the Host. Said synthetic data packet is a data packet containing a zero length data payload and is used to satisfy the timing requirements of the USB protocol while causing no disturbance to the actual information being carried by the protocol. The control logic (281) within the LEX subsystem forwards the IN packet to the REX-FPGA subsystem. The control logic (282) within the REX-FPGA subsystem forwards said IN packet to the REX-Hub. The control logic (283) within the REX-Hub forwards said request for input data as an IN packet to the Device. The control logic (284) within the device assembles the requested interrupt data and transmits the same as a Result packet to the REX-Hub. The control logic (283) within the REX-Hub forwards the Result packet to the REX-FPGA subsystem. On receipt of said Result packet, the control logic (282) within the REX-FPGA subsystem generates a synthetic acknowledgement packet that is transmitted as an ACK packet to the REX-Hub. The control logic (283) within the REX-Hub forwards said ACK packet to the Device. The control logic (282) within the REX-FPGA subsystem forwards said Result packet to the LEX subsystem and the control logic (281) within the LEX subsystem stores said result packet in its buffer memory.

In the same microframe, Microframe $Y_0$, the control logic (280) within the Host generates a second request for input data, addressed to the same USB function. Said request is transmitted to the LEX subsystem as an IN packet. On receipt of said IN packet, the control logic (281) within the LEX subsystem recognizes the lack of data that corresponds to the input request in its buffer memory. Said control logic (281) then generates a synthetic data packet and transmits the same as a NULL packet to the Host. The second IN packet is then transmitted to the Device in the same manner as the previous IN packet.

On receipt of the second request for input data, the control logic (284) within the device assembles the requested interrupt data and transmits the same as a second Result packet to the REX-Hub. The control logic (283) within the REX-Hub forwards said Result packet to the REX-FPGA subsystem. On receipt of said Result packet, the control logic (282) within the REX-FPGA subsystem generates a synthetic acknowledgement packet that is transmitted as an ACK packet to the REX-Hub. The control logic (283) within the REX-Hub forwards said ACK packet to the device. The control logic (282) within the REX-FPGA subsystem forwards said Result packet to the LEX subsystem and the control logic (281) within the LEX subsystem stores said result packet in its buffer memory.

In the same microframe, Microframe $Y_0$, the control logic (280) within the Host generates a third request for input data, addressed to the same USB function. Said request is transmitted to the LEX subsystem as an IN packet. On receipt of said IN packet, the control logic (281) within the LEX subsystem recognizes the lack of data that corresponds to the input request in its buffer memory. Said control logic (281) then generates a synthetic negative acknowledgement packet and transmits the same as a NAK packet to the Host. Said NAK packet warns the Host that it will not receive a response to its request and enables said Host to progress to the next transaction. The third IN packet is then transmitted to the Device in the same manner as the first and second IN packets.

On receipt of the third request for input data, the control logic (284) within the device assembles the requested interrupt data and transmits the same as a third Result packet to the REX-Hub. The control logic (283) within the REX-Hub forwards said Result packet to the REX-FPGA subsystem. On receipt of said Result packet, the control logic (282) within the REX-FPGA subsystem generates a synthetic acknowledgement packet that is transmitted as an ACK packet to the REX-Hub. The control logic (283) within the REX-Hub forwards said ACK packet to the device. The control logic (282) within the REX-FPGA subsystem forwards said Result packet to the LEX subsystem and the control logic (281) within the LEX subsystem stores said Result packet in its buffer memory.

In the next microframe, Microframe $Y_1$, the control logic (285) within the Host recognizes that it has not received the requested data and automatically retries the transaction by generating a further request addressed to the same USB function as in Microframe $Y_0$. Said further request is transmitted to the LEX subsystem as an IN packet. On receipt of said IN packet, the control logic (286) within the LEX subsystem recognizes that it has a Result packet stored in memory from the same function identified by the further IN packet Said control logic retrieves said stored Result packet from memory and transmits the same packet to the Host. When the control logic (285) of the Host receives the requested Result packet from the LEX, said control logic generates an ACK packet to acknowledge a successful transmission. Upon receipt of the ACK packet from the host, the control logic (286) within the LEX subsystem absorbs said packet Said control logic (286) forwards the further IN packet to the REX-FPGA subsystem. The control logic (287) within the REX-FPGA forwards said IN packet to the REX-Hub. The control logic (288) within the REX-Hub forwards said request for input data as an IN packet to the Device.

On receipt of the request for input data, the control logic (289) within the device assembles the requested interrupt data and transmits the same as a Result packet to the REX-Hub. The control logic (288) within the REX-Hub forwards said Result packet to the REX-FPGA subsystem. On receipt of said Result packet, the control logic (287) within the REX-FPGA subsystem generates a synthetic acknowledgement packet that is transmitted as an ACK packet to the REX-Hub. The control logic (288) within the REX-Hub forwards said ACK packet to the device. The control logic (287) within the REX-FPGA subsystem forwards said Result packet to the LEX subsystem and the control logic (286) within the LEX subsystem stores said Result packet in its buffer memory.

Within the same microframe, Microframe $Y_1$, the control logic (285) within the Host generates a second request for input data. Said request is transmitted to the LEX subsystem as an IN packet. The control logic (286) within the LEX subsystem retrieves the second stored Result packet from the previous microframe and transmits the same packet to the Host. When the control logic (285) of the Host receives the requested Result packet from the LEX, said control logic generates an ACK packet to acknowledge a successful transmission. Upon receipt of the ACK packet from the host, the control logic (286) within the LEX subsystem absorbs said packet. Said second IN packet is forwarded to the device in the same manner as previous IN packets.

On receipt of the second request for input data, the control logic (289) within the device assembles the requested interrupt data and transmits the same as a Result packet. Said Result packet is transmitted to and stored in the LEX subsystem in the same manner as previous Result packets. On receipt of said result packet, the control logic (287) within the REX-FPGA subsystem generates a synthetic acknowledgement packet that is transmitted as an ACK packet to the device in the same manner as previous synthetic ACK packets.

Within the same microframe, Microframe $Y_1$, the control logic (285) within the host generates a third request for input data. Said request is transmitted to the LEX subsystem as an IN packet. The control logic (286) within the LEX subsystem retrieves the third stored Result packet from the previous microframe and transmits the same packet to the Host. When the control logic (285) of the Host receives the requested Result packet from the LEX, said control logic generates an ACK packet to acknowledge a successful transmission. Upon receipt of the ACK packet from the host, the control logic (286) within the LEX subsystem absorbs said packet. Said third IN packet is forwarded to the device in the same manner as previous IN packets.

On receipt of the third request for input data, the control logic (289) within the device assembles the requested interrupt data and transmits the same a Result packet. Said Result packet is transmitted to and stored in the LEX subsystem in the same manner as previous Result packets. On receipt of said result packet, the control logic (287) within the REX-FPGA subsystem generates a synthetic acknowledgement packet that is transmitted as an ACK packet to the device in the same manner as previous synthetic ACK packets.

The above-described process is repeated for subsequent input data requests from the Host by the distributed control logic (e.g. 285, 286, 287, 288 & 289).

Figure 24:
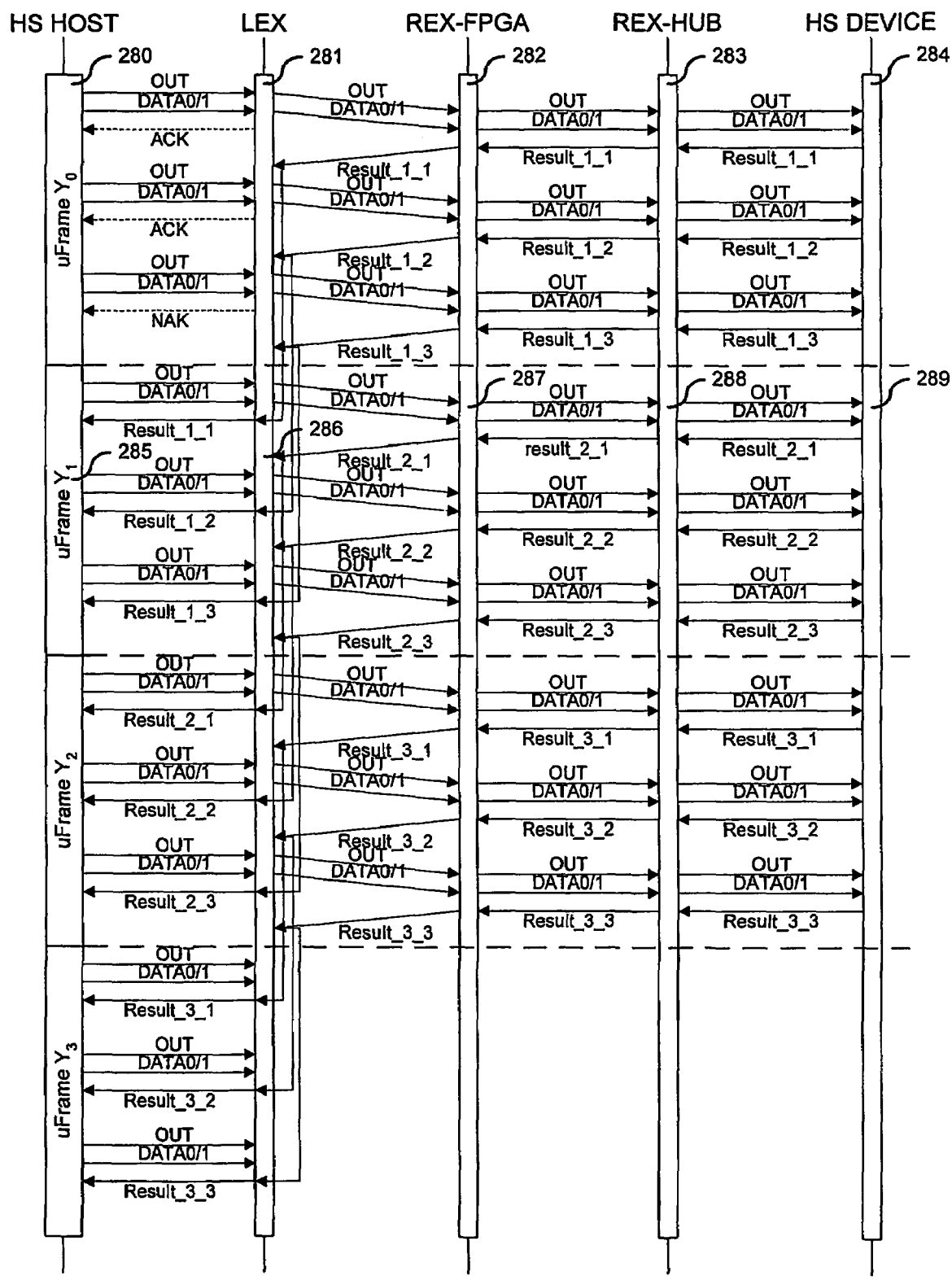
FIG. 24 is a sequence diagram showing a high bandwidth interrupt output transfer between a high-speed host and a high-speed device according to the invention.

FIG. 24 provides a sequence diagram showing a high bandwidth interrupt output transfer, between a high-speed host and a high-speed device. In Microframe $Y_0$, the control logic (280) within the Host generates a notification of output data followed by output data, addressed to a particular USB function. Said notification of output data and output data are transmitted to the LEX subsystem as an OUT packet and a DATAX packet (OUT/DATAX packets). Said DATAX packet represents either a DATA0 packet or DATA1 packet. On receipt of said OUT/DATAX packets, the control logic (281) within the LEX subsystem generates a synthetic acknowledgement packet and transmits the same as an ACK packet to the Host. Said synthetic acknowledgement packet tells the host that the data transmission is successful and enables said host to progress to the next transaction. The control logic (281) within the LEX subsystem forwards the OUT/DATAX packets to the REX-FPGA subsystem. The control logic (282) within the REX-FPGA subsystem forwards said OUT/DATAX packets to the REX-Hub. The control logic (283) within the REX-Hub forwards said OUT/DATAX packets to the Device.

The control logic (284) within the device generates a Result packet corresponding to the OUT/DATAX packets and transmits the same to the REX-Hub. The control logic (283) within the REX-Hub forwards said Result packet to the REX-FPGA subsystem. The control logic (282) within the REX-FPGA subsystem forwards said Result packet to the LEX subsystem and the control logic (281) within the LEX subsystem stores said Result packet in its buffer memory.

In the same microframe, Microframe $Y_0$, the control logic (280) within the Host generates a second notification of output data and output data, addressed to the same USB function. Said notification and output data are transmitted to the LEX subsystem as OUT/DATAX packets. On receipt of said OUT/DATAX packets, the control logic (281) within the LEX subsystem generates a synthetic acknowledgement packet and transmits the same as an ACK packet to the Host. The second OUT/DATAX packets are then transmitted to the Device in the same manner as the previous OUT/DATAX packets. On receipt of the second notification of output data and output data, the control logic (284) within the device generates a second Result packet and transmits the same to the REX-Hub. The control logic (283) within the REX-Hub forwards said Result packet to the REX-FPGA subsystem. The control logic (282) within the REX-FPGA subsystem forwards said Result packet to the LEX subsystem and the control logic (281) within the LEX subsystem stores said result packet in its buffer memory.

In the same microframe, Microframe $Y_0$, the control logic (280) within the Host generates a third notification of output data and output data, addressed to the same USB function. Said notification and output data are transmitted to the LEX subsystem as OUT/DATAX packets. On receipt of said OUT/DATAX packets, the control logic (281) within the LEX subsystem generates a synthetic negative acknowledgement packet and transmits the same as an NAK packet to the Host. Said NAK packet warns the Host that it will not receive a data transmission status to the notification of output data and enables said Host to progress to the next transaction. The third OUT/DATAX packets are then transmitted to the Device in the same manner as the first two OUT/DATAX packets.

On receipt of the third notification of output data and output data, the control logic (284) within the device generates a third Result packet and transmits the same to the REX-Hub. The control logic (283) within the REX-Hub forwards said Result packet to the REX-FPGA subsystem. The control logic (282) within the REX-FPGA subsystem forwards said Result packet to the LEX subsystem and the control logic (281) within the LEX subsystem stores said result packet in its buffer memory.

In Microframe $Y_1$, the control logic (285) within the Host generates a notification of output data followed by output data, addressed to the same USB function. Said notification and output data are transmitted to the LEX subsystem as OUT/DATAX packets. On receipt of said OUT/DATAX packets, the control logic (286) within the LEX subsystem recognizes that it has a Result packet stored in memory from the same function identified by the further OUT/DATAX packets. Said control logic retrieves said stored Result packet from memory and transmits the same to the Host. Said further OUT/DATAX packets are transmitted to the device in the same manner as the previous OUT/DATAX packets. The information is received by the control logic (289) within the device.

On receipt of the OUT/DATAX packets, the control logic (289) within the device generates a Result packet and transmits the same to the REX-Hub. Said Result packet is then transmitted to and stored in the LEX subsystem in the same manner as the previous Result packets.

In the same microframe, Microframe $Y_1$, the control logic (285) within the Host generates a second notification of output data and output data, addressed to the same USB function. Said notification and output data are transmitted to the LEX subsystem as OUT/DATAX packets. On receipt of said OUT/DATAX packets, the control logic (286) within the LEX subsystem recognizes that it has a Result packet stored in memory from the same function identified by the further OUT/DATAX packets. Said control logic retrieves said stored Result packet from memory and transmits the same as a Result packet to the Host. Said further OUT/DATAX packets are transmitted to the device in the same manner as the previous OUT/DATAX packets. The information is received by the control logic (289) within the device.

On receipt of the OUT/DATAX packets, the control logic (289) within the device generates a Result packet and transmits the same to the REX-Hub. Said Result packet is then transmitted to and stored in the LEX subsystem in the same manner as the previous Result packets.

In the same microframe, Microframe $Y_1$, the control logic (285) within the Host generates a third notification of output data and output data, addressed to the same USB function. Said notification and output data are transmitted to the LEX subsystem as OUT/DATAX packets. On receipt of said OUT/DATAX packets, the control logic (286) within the LEX subsystem recognizes that it has a Result packet stored in memory from the same function identified by the further OUT/DATAX packets. Said control logic retrieves said stored Result packet from memory and transmits the same as a Result packet to the Host. Said further OUT/DATAX packets are transmitted to the device in the same manner as the previous OUT/DATAX packets. The information is received by the control logic (289) within the device.

On receipt of the OUT/DATAX packets, the control logic (289) within the device generates a Result packet and transmits the same to the REX-Hub. Said Result packet is then transmitted to and stored in the LEX subsystem in the same manner as the previous Result packets.

The above-described process is repeated for subsequent notifications of output data and output data from the Host by the distributed control logic (e.g. 285, 286, 287, 288, & 289).

Figure 25:
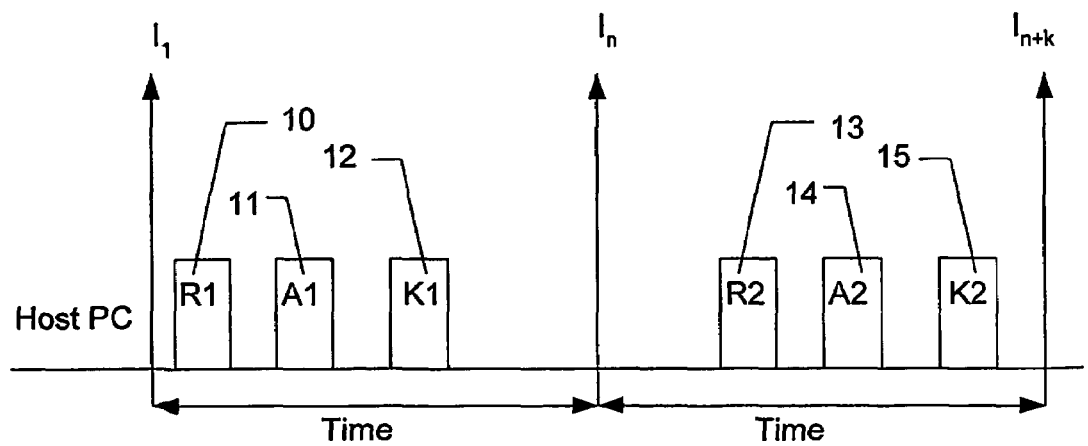
FIG. 25 is a timing diagram showing control and bulk data transfers according to the USB protocol.

FIG. 25 provides a simplified timing diagram showing control and bulk data transfers, which are two special cases of asynchronous transfers, according to the USB protocol. The diagram is constructed from the point of view of a USB Host Controller, normally included on a PC motherboard (Host PC). For a full-speed host, the USB protocol divides time allocation on the shared bus into regular Frames, each of 1 ms in duration. For a high-speed host, time allocation on the shared bus is divided into regular Microframes, each of 125 $\mu$s in duration. The start of each microframe is identified in the diagram as I1, I2, . . . , $I_n$, . . . , $I_{n+k}$, etc., where n and k are positive integers.

When a Host Controller is engaged upon a control or bulk data transfer with a device, the Host Controller issues requests for data transfer to said device on an as needed basis. These requests are identified in FIG. 25 as packets, R1 & R2 (10 & 13). Under the USB protocol, a USB device must respond to the request from a full speed host within 16 full-speed bit-times. In response to requests from a high-speed host, a USB device must respond within 736 high-speed bit-times. Control and bulk devices are not required to respond to a request within the same microframe where said request is generated. However, control and bulk devices must respond within the same frame where a request is generated because control and bulk transactions are not allowed to span a frame boundary. The responses generated by the device are shown in the diagram as packets A1 & A2 (11 & 14). On receipt of a response packet, the Host Controller also emits an acknowledgement and these acknowledgements are identified as packets K1 & K2 (12 & 15). It is commonly expected that transfer A1 (11) will be delivered in response to request R1 (10) and acknowledgement K1 (12) will be emitted on receipt of R1 (10) within the same frame, transfer A2 (14) will be delivered in response to request R2 (13) and acknowledgement K2 (15) will be emitted on receipt of R2 (13) within the same frame, and so on until the requests are terminated. For control and bulk transfers, data requests are not generated periodically and transfers can take place anytime when the shared bus has unoccupied bandwidth. Request R2 (13) may be generated immediately after acknowledgement K1 (12) is received or said request may be generated several microframes after K1 (12) is received. The time elapsed between K1 (12) and R2 (13) depends on the bandwidth availability on the shared bus at that particular time and the same is true for subsequent requests. The time span within which a transaction takes place is not fixed and is identified by "Time" in FIG. 25.

Figure 26:
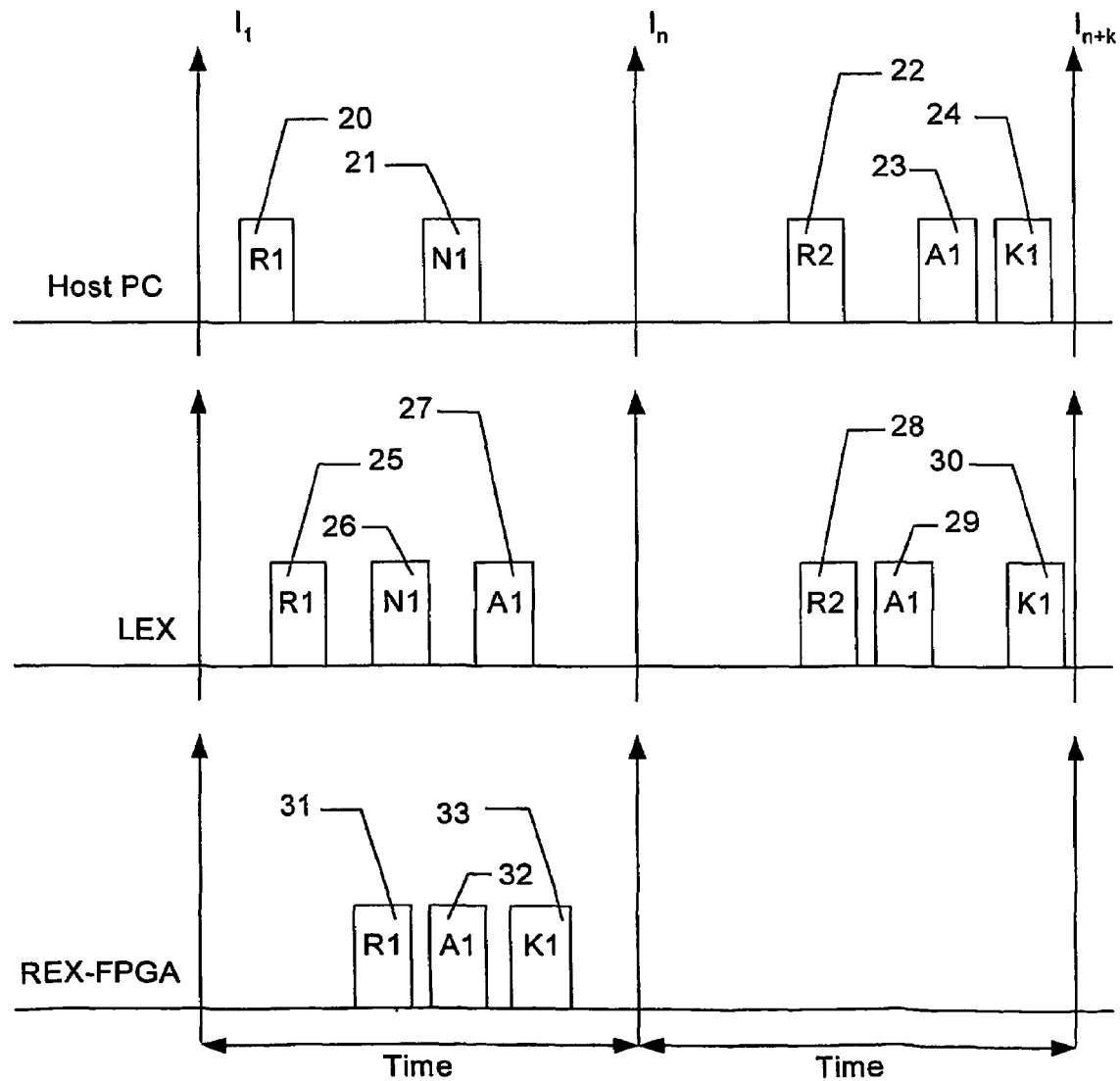
FIG. 26 is a timing diagram showing control and bulk data transfers according to the current invention.

FIG. 26 provides a simplified timing diagram showing control and bulk data transfers, two special cases of asynchronous transfers, according to the present invention. The diagram shows the progression of packets through the various subsystems comprising the invention. Timelines are presented for the Host PC (1), Local Expander (4) and Remote Expander FPGA (8) subsystems. Each transaction may take place in the span of one or more microframes but must be completed before the arrival of the subsequent frame boundary. The elapsed time between consecutive requests is not fixed and may be less than one microframe, one microframe, or more than one microframe. The time span within which each transaction takes place is identified by "Time" in FIG. 26.

An asynchronous transfer is initiated from a Host PC by emitting a request for input data R1 (20) to a particular USB address and end-point. Said request R1 (20) is received by the LEX and retransmitted as R1 (25) over the external cabling to the REX-FPGA. Said retransmitted packet R1 (25) is received by the REX-FGPA and forwarded as R1 (31) to the REX-Hub. A synthetic negative acknowledgement packet is generated by the LEX and transmitted as N1 (26) to the host.

The target device generates an input data packet A1 (32). According to the USB protocol for low-speed and full-speed isochronous transfers, a device with a detachable cable must generate a response within 6.5 full-speed bit-times of the end of the corresponding request. For high-speed isochronous transfers, a device must generate a response within 192 high-speed bit times. Said input data packet A1 (32) is received by the REX-Hub and the REX-FPGA subsystem and retransmitted as A1 (27) over the external wiring to the LEX. Said retransmitted response A1 (27) is not immediately forwarded to the Host PC, but is stored within the memory of the LEX subsystem. A synthetic acknowledgement packet K1 (33) is generated by the REX-FGPA subsystem and transmitted as K1 (33) to the REX-Hub.

The Host PC (1) notices that it did not receive data in response to its request R1 (20), and retries the transaction by generating a further request R2 (22) to the same USB address and end-point. Upon receiving request R2 (28), the LEX subsystem retrieves response A1 (27) from its memory buffers and forwards it to the Host PC as response A1 (29). Said response is received by the Host as response A1 (23) and said request R2 (28) is absorbed by the LEX subsystem. Upon receiving said response A1 (23), the Host generates an acknowledgement packet and transmits the packet as packet K1 (24) to the LEX subsystem. Said acknowledgement packet K1 (30) is received and absorbed by LEX.

The above-described protocol sequence is repeated for each initial input data request generated by the Host Controller.

Figure 27:
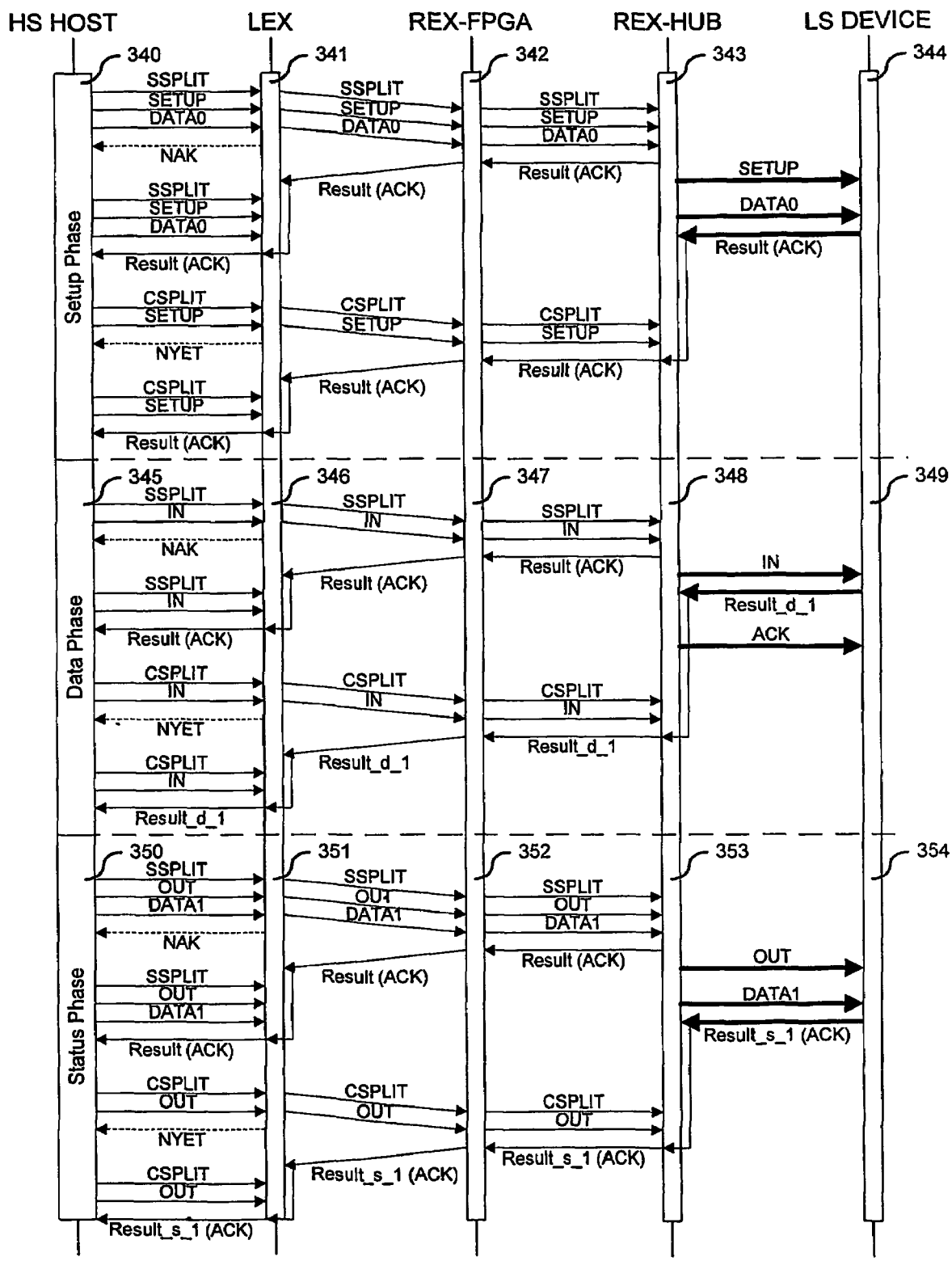
FIG. 27 is a sequence diagram showing a control input transfer between a high-speed host and a low-speed device according to the invention.

FIG. 27 is a sequence diagram showing a control input transfer, between a high-speed host and a low-speed device. In the Set-up Phase, the control logic (340) within the Host generates a start split-transaction, a notification of device set-up, and a data packet addressed to a particular USB function. Said split-transaction, notification, and data are transmitted to the LEX subsystem as a SSPLIT packet, a SETUP packet, and a DATA0 packet, respectively. On receipt of said SSPLIT/SETUP/DATA0 packets, the control logic (341) within the LEX subsystem recognizes it has not yet received an acknowledgement from the device so said control logic generates a synthetic negative acknowledgement and transmits the same to the host as a NAK packet. The control logic (341) within the LEX subsystem forwards said SSPLIT/SETUP/DATA0 packets to the REX-FPGA subsystem. The control logic (342) within the REX-FPGA subsystem forwards said SSPLIT/SETUP/DATA0 packets to the REX-Hub. On receipt of said SSPLIT/SETUP/DATA0 packets, the control logic (343) within the REX-Hub generates an acknowledgement and transmits the same as an ACK packet to the REX-FPGA subsystem. The control logic (342) within the REX-FPGA subsystem forwards said ACK packet to the LEX subsystem and the control logic (341) within the LEX subsystem stores said ACK packet in its buffer memory. The control logic (343) within the REX-Hub absorbs said SSPLIT packet and forwards said SETUP/DATA0 packets to the Device.

Upon successful receipt of the SETUP/DATA0 packets, the control logic (344) within the device generates an acknowledgement and transmits the same as a Result packet to the REX-Hub. The control logic (343) within the REX-Hub stores said Result packet in its buffer memory.

At a later time, the control logic (340) within the host recognizes that it has not received an acknowledgement from the device and automatically retries the transaction by issuing further SSPLIT/SETUP/DATA0 packets addressed to the same USB function. On receipt of said SSPLIT/SETUP/DATA0 packets, the control logic (341) within the LEX subsystem recognizes that it has a Result packet stored in memory from the same function identified by the further SSPLIT/SETUP/DATA0 packets. Said control logic retrieves said stored Result packet from memory and transmits the same packet to the Host. Said control logic (341) also recognizes that said SSPLIT/SETUP/DATA0 packets are merely a repetition of the previous SSPLIT/SETUP/DATA0 packets and absorbs said packets.

At a later time, the control logic (340) within the host generates a complete split-transaction and a notification of device set-up. Said complete split-transaction and notification of device set-up are transmitted to the LEX subsystem as a CSPLIT packet and a SETUP packet (CSPLIT/SETUP packets). On receipt of the CSPLIT/SETUP packets, the control logic (341) within the LEX subsystem recognizes that it has not received an acknowledgement from the device so said control logic (341) generates a NYET packet and transmits the same to the host. Said NYET packet warns the host that the LEX subsystem has not yet received a response from the device and enables said host to progress to the next transaction. Said control logic (341) forwards said CSPLIT/SETUP packets to the REX-FPGA subsystem. The control logic (342) within the REX-FPGA subsystem forwards said CSPLIT/SETUP packets to the REX-Hub.

On receipt of the CSPLIT/SETUP packets, the control logic (343) within the REX-Hub recognizes that it has an acknowledgement packet stored in memory. Said control logic retrieves said stored acknowledgement packet from memory and transmits the same packet as a Result packet to the REX-FPGA subsystem. The control logic (342) within the REX-FPGA subsystem forwards said Result packet to the LEX subsystem. The control logic (341) within the LEX subsystem stores said Result packet in Its buffer memory.

At a later time, the control logic (340) within the host recognizes that it has not received an acknowledgement from the device and automatically retries the transaction by issuing a further complete split-transaction and a notification of device set-up, addressed to the same USB function. Said complete split-transaction and notification of device set-up are transmitted to the LEX subsystem as further CSPLIT/SETUP packets. On receipt of said further CSPLIT/SETUP packets, the control logic (341) within the LEX subsystem recognizes that an acknowledgement packet stored in memory from the same function identified by the further CSPLIT/SETUP packets. Said control logic retrieves said stored acknowledgement packet from memory and transmits the same as a Result packet to the Host Said control logic (341) also recognizes that said CSPLIT/SETUP packets are merely a repetition of the previous CSPLIT/SETUP packets and absorbs said packets.

In the Data Phase, the control logic (345) within the host generates a start split-transaction and a request for input data addressed to the same USB function as the Set-up Phase. Said start split-transaction and request for input data are transmitted to the LEX subsystem as a SSPLIT packet and an IN packet (SSPLIT/IN packets). On receipt of the SSPLIT/IN packets, the control logic (346) within the LEX subsystem recognizes that it has not received an acknowledgement from the device so said control logic generates a synthetic negative acknowledgement and transmits the same to the host as a NAK packet. Said control logic (346) forwards said SSPLIT/IN packets to the REX-FPGA subsystem. The control logic (347) within the REX-FPGA subsystem forwards said SSPLIT/IN packets to the REX-Hub.

On receipt of the SSPLIT/IN packets, the control logic (348) within the REX-Hub generates an acknowledgement packet and transmits the same to the REX-FPGA subsystem as a Result packet. The control logic (347) within the REX-FPGA subsystem forwards said Result packet to the LEX subsystem and the control logic (346) within the LEX subsystem stores said Result packet in its buffer memory. The control logic (348) within the REX-Hub forwards the request for input data as an IN packet to the device. On receipt of said IN packet, the control logic (349) within the device assembles the requested data and transmits the same as a Result packet to the REX-Hub. The control logic (348) within the REX-Hub stores said Result packet in its buffer memory. On receipt of the Result packet, said control logic (348) generates an ACK packet to acknowledge a successful transmission.

At a later time, the control logic (345) within the host recognizes that it has not received the requested data from the device and automatically retries the transaction by issuing a further start split-transaction and a request for input data addressed to the same USB function. Said start split-transaction and request for input data are transmitted as a SSPLIT/IN packets to the LEX subsystem. On receipt of the SSPLIT/IN packets, the control logic (346) within the LEX subsystem recognizes that it has an acknowledgement packet stored in memory from the same function identified by the further SSPLIT/IN packets. Said control logic retrieves the stored acknowledgement packet from memory and transmits the same as a Result packet to the Host. Said control logic (346) also recognizes that said SSPLIT/IN packets are merely a repetition of the previous SSPLIT/IN packets and absorbs said packets.

At a yet later time, the control logic (345) within the host generates a complete split-transaction and a request for input data, addressed to the same USB function. Said complete split-transaction and request for input data are transmitted to the LEX subsystem as a CSPLIT packet and an IN packet (CSPLIT/IN PACKETS). On receipt of the CSPLIT/IN packets, the control logic (346) within the LEX subsystem recognizes that it has not received an acknowledgement packet from the device so said control logic generates a synthetic NYET packet and transmits the same to the host. Said NYET packet informs the host that the LEX subsystem has not yet received a response from the device and enables said host to progress to the next transaction. The control logic (346) within the LEX subsystem forwards said CSPLIT/IN packets to the REX-FPGA subsystem. The control logic (436) within the REX-FPGA subsystem forwards said CSPLIT/IN packets to the REX-Hub.

On receipt of the CSPLIT/IN packets, the control logic (348) within the REX-Hub recognizes that it has in its buffer memory a Result packet that corresponds to the input data request. Said control logic (348) retrieves said stored Result packet and transmits the same to the REX-FPGA subsystem. The control logic (347) within the REX-FPGA subsystem forwards said Result packet to the LEX subsystem and the control logic (346) within the LEX subsystem stores said Result packet in its buffer memory.

At a later time, the control logic (345) within the host recognizes that it has not received the requested data from the device and automatically retries the transaction by issuing a further complete split-transaction and a request for input data, addressed to the same USB function. Said complete split-transaction and request for input data are transmitted to the LEX subsystem as further CSPLIT/IN packets. On receipt of the further CSPLIT/IN packets, the control logic (346) within the LEX subsystem recognizes that it has a Result packet stored in memory from the same function identified by the further CSPLIT/IN packets. Said control logic retrieves said stored Result packet from memory and transmits the same packet to the Host. Said control logic (346) also recognizes that said CSPLIT/IN packets are merely a repetition of the previous CSPLIT/IN packets and absorbs said packets.

In the Status Phase, the control logic (350) within the host generates a start split-transaction, a notification of output data, and a data packet addressed to the same USB function as the Data Phase. Said start split-transaction, notification of output data, and data packet are transmitted as SSPLIT/OUT/DATA1 packets to the LEX subsystem. On receipt of the SSPLIT/OUT/DATA1 packets, the control logic (351) within the LEX subsystem recognizes that it has not received an acknowledgement from the device so said control logic generates a synthetic negative acknowledgement and transmits the same to the host as a NAK packet. Said control logic (351) forwards said SSPLIT/OUT/DATA1 packets to the REX-FPGA subsystem. The control logic (352) within the REX-FPGA subsystem forwards said SSPLIT/OUT/DATA1 packets to the REX-Hub.

Upon successful receipt of the SSPLIT/OUT/DATA1 packets, the control logic (353) within the REX-Hub generates an acknowledgement packet and transmits the same to the REX-FPGA subsystem as a Result packet. The control logic (352) within the REX-FPGA subsystem forwards said Result packet to the LEX subsystem and the control logic (351) within the LEX subsystem stores said Result packet in its buffer memory. The control logic (353) within the REX-Hub absorbs said SSPLIT packet and forwards said OUT/DATA1 packets to the device. On receipt of said OUT/DATA1 packets, the control logic (354) within the device generates an acknowledgement and transmits the same as a Result packet to the REX-Hub. The control logic (353) within the REX-Hub stores said Result packet in its buffer memory.

At a later time, the control logic (350) within the host recognizes that it has not received an acknowledgement from the device and automatically retries the transaction by issuing further SSPLIT/OUT/DATA1 packets to the LEX subsystem. On receipt of the SSPLIT/OUT/DATA1 packets, the control logic (351) within the LEX subsystem recognizes that it has an acknowledgement packet stored in memory from the same function identified by the further SSPLIT/OUT/DATA1 packets. Said control logic retrieves the stored acknowledgement packet from memory and transmits the same as a Result packet to the Host. Said control logic (351) also recognizes that said SSPLIT/OUT/DATA1 packets are merely a repetition of the previous SSPLIT/OUT/DATA1 packets and absorbs said packets.

At a yet later time, the control logic (350) within the host generates a complete split-transaction and a notification of output data, addressed to the same USB function. Said complete split-transaction and notification of output data are transmitted as CSPLIT/OUT packets to the LEX subsystem. On receipt of the CSPLIT/OUT packets, the control logic (351) within the LEX subsystem recognizes that it has not received an acknowledgement packet from the device so said control logic generates a synthetic NYET packet and transmits the same to the host. Said NYET packet informs the host that the LEX subsystem has not yet received a response from the device and enables said host to progress to the next transaction. The control logic (351) within the LEX subsystem forwards said CSPLIT/OUT packets to the REX-FPGA subsystem. The control logic (352) within the REX-FPGA subsystem forwards said CSPLIT/OUT packets to the REX-Hub.

On receipt of the CSPLIT/OUT packets, the control logic (353) within the REX-Hub recognizes that it has in its buffer memory a Result packet that corresponds to the further CSPLIT/OUT packets. Said control logic (353) retrieves said stored Result packet and transmits the same to the REX-FPGA subsystem. The control logic (352) within the REX-FPGA subsystem forwards said Result packet to the LEX subsystem and the control logic (351) within the LEX subsystem stores said Result packet in its buffer memory.

At a later time, the control logic (350) within the host recognizes that it has not received an acknowledgement from the device and automatically retries the transaction by issuing further CSPLIT/OUT packets to the LEX subsystem. On receipt of the CSPLIT/OUT packets, the control logic (351) within the LEX subsystem recognizes that it has an acknowledgement packet stored in memory from the same function Identified by the further CSPLIT/OUT packets. Said control logic retrieves said stored packet from memory and transmits the same as a Result packet to the Host. Said control logic (351) also recognizes that said CSPLIT/OUT packets are merely a repetition of the previous CSPLIT/OUT packets and absorbs said packets.

According to the invention, the protocol handling for control IN transfers between a high-speed host and a full-speed device is the same as the protocol handling for control IN transfers between a high-speed host and a low-speed device, as described in FIG. 27 by control logics (340) to (354).

Figure 28:
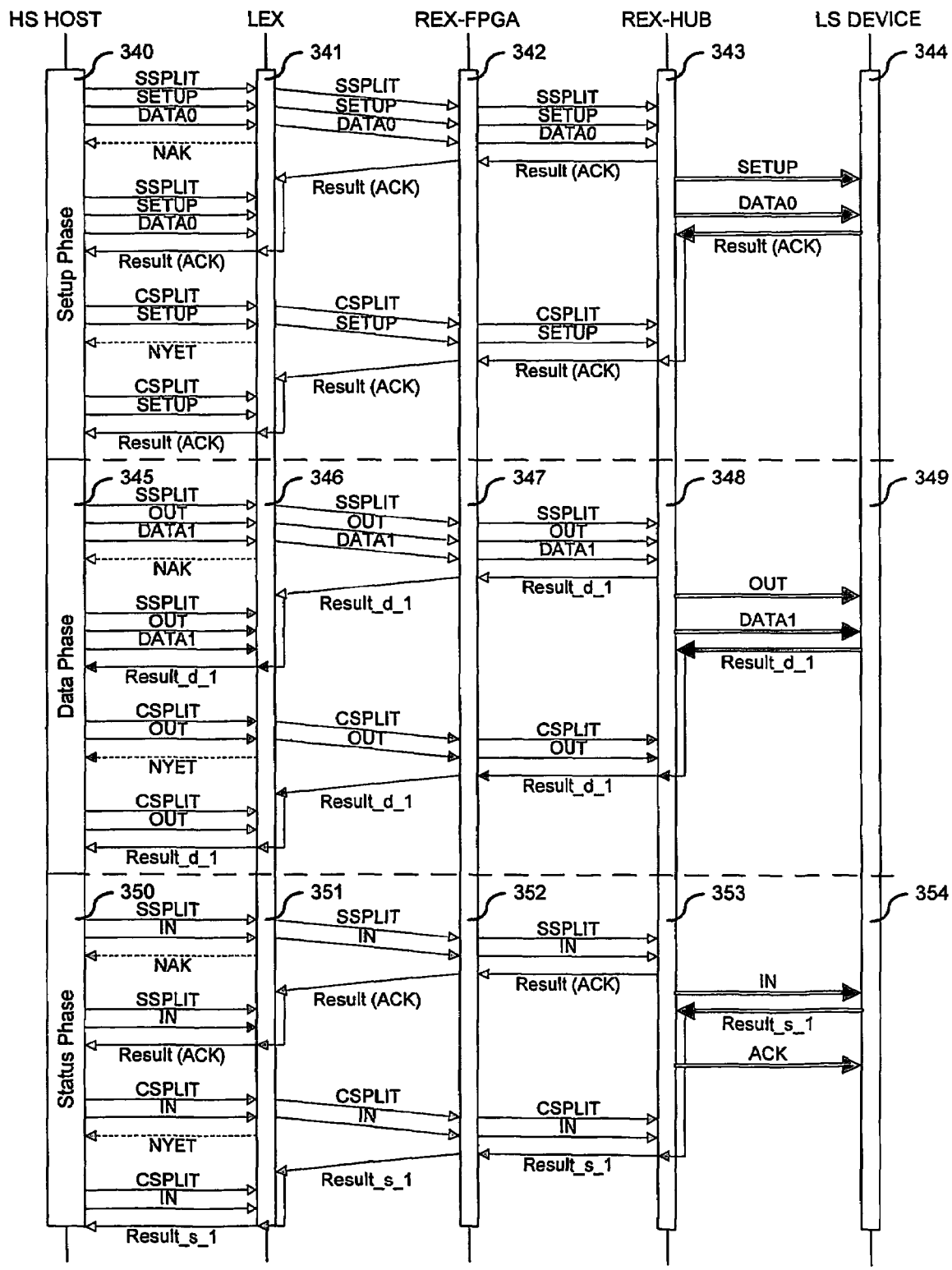
FIG. 28 is a sequence diagram showing a control output transfer between a high-speed host and a low-speed device according to the invention.

FIG. 28 is a sequence diagram showing a control output transfer, between a high-speed host and a low-speed device. In the Set-up Phase, the control logic (340) within the Host generates start split-transaction, a notification of device set-up, and a data packet addressed to a particular USB function. Said split-transaction, notification, and data are transmitted to the LEX subsystem as SSPLIT/SETUP/DATA0 packets. On receipt of the SSPLIT/SETUP/DATA0 packets, the control logic (341) within the LEX subsystem recognizes the lack of Result that corresponds to the notification of device set-up in its memory so said control logic generates a synthetic negative acknowledgement and transmits the same to the host as a NAK packet. The control logic (341) within the LEX subsystem forwards said SSPLIT/SETUP/DATA0 packets to the REX-FPGA subsystem. The control logic (342) within the REX-FPGA subsystem forwards said SSPLIT/SETUP/DATA0 packets to the REX- Hub. On receipt of said SSPLIT/SETUP/DATA0 packets, the control logic (343) within the REX-Hub generates an acknowledgement and transmits the same as an ACK packet to the REX-FPGA subsystem. The control logic (342) within the REX-FPGA subsystem forwards said ACK packet to the LEX subsystem and the control logic (341) within the LEX subsystem stores said ACK packet in its buffer memory. The control logic (343) within the REX-Hub forwards said SETUP/DATA0 packets to the Device.

On receipt of the SETUP/DATA0 packets, the control logic (344) within the device assembles the requested Result and transmits the same as a Result packet to the REX-Hub. The control logic (343) within the REX-Hub stores said Result packet in its buffer memory.

At a later time, the control logic (340) within the host recognizes that it has not received an acknowledgement from the device and automatically retries the transaction by issuing further SSPLIT/SETUP/DATA0 packets to the LEX subsystem. On receipt of the SSPLIT/SETUP/DATA0 packets, the control logic (341) within the LEX subsystem recognizes that it has an acknowledgement packet stored in memory from the same function identified by the further SSPLIT/SETUP/DATA0 packets. Said control logic retrieves said stored acknowledgement packet from memory and transmits the same as a Result packet to the Host. Said control logic (341) also recognizes that said SSPLIT/SETUP/DATA0 packets are a repetition of the previous SSPLIT/SETUP/DATA0 packets and absorbs said packets.

At a later time, the control logic (340) within the host generates a complete split-transaction and a notification of device set-up. Said complete split-transaction and notification of device set-up are transmitted to the LEX subsystem as a CSPLIT packet and a SETUP packet (CSPLIT/SETUP packets). On receipt of the CSPLIT/SETUP packets, the control logic (341) within the LEX subsystem recognizes the lack of Result that corresponds to the notification of data set-up in its memory so said control logic (341) generates a NYET packet and transmits the same to the host. Said NYET packet warns the host that the LEX subsystem has not yet received a response from the device and enables said host to progress to the next transaction. Said control logic (341) forwards said CSPLIT/SETUP packets to the REX-FPGA subsystem. The control logic (342) within the REX-FPGA subsystem forwards said CSPLIT/SETUP packets to the REX-Hub.

On receipt of the CSPLIT/SETUP packets, the control logic (343) within the REX-Hub recognizes that it has a Result packet stored in memory. Said control logic retrieves said stored Result packet from memory and transmits the same packet as a Result packet to the REX-FPGA subsystem. The control logic (342) within the REX-FPGA subsystem forwards said Result packet to the LEX subsystem. The control logic (341) within the LEX subsystem stores said Result packet in its buffer memory.

At a later time, the control logic (340) within the host recognizes that it has not received a Result from the device and automatically retries the transaction by Issuing further CSPLIT/SETUP packets to the LEX subsystem. On receipt of the further CSPLIT/SETUP packets, the control logic (341) within the LEX subsystem recognizes that it has a Result packet stored in memory from the same function identified by the further CSPLIT/SETUP packet. Said control logic (341) retrieves said stored Result packet from memory and transmits the same packet to the Host.

In the Data Phase, the control logic (345) within the host generates a start split-transaction, a notification of output data, and a data packet, addressed to the same USB function as the Set-up Phase. Said start split-transaction, notification of output data, and data packet are transmitted to the LEX subsystem as a SSPLIT packet, an OUT packet, and a DATA1 packet, respectively (SSPLIT/OUT/DATA1 packets). On receipt of the SSPLIT/OUT/DATA1 packets, the control logic (346) within the LEX subsystem recognizes the lack of Result that corresponds to the input request in its buffer memory so said control logic generates a synthetic negative acknowledgement and transmits the same to the host as a NAK packet. Said control logic (346) forwards said SSPLIT/OUT/DATA1 packets to the REX-FPGA subsystem. The control logic (347) within the REX-FPGA subsystem forwards said SSPLIT/OUT/DATA1 packets to the REX-Hub.

On receipt of the SSPLIT/OUT/DATA1 packets, the control logic (348) within the REX-Hub generates an acknowledgement packet and transmits the same to the REX-FPGA subsystem as a Result packet. The control logic (347) within the REX-FPGA subsystem forwards said Result packet to the LEX subsystem and the control logic (346) within the LEX subsystem stores said Result packet in its buffer memory. The control logic (348) within the REX-Hub absorbs said SSPLIT packet and forwards said OUT/DATA1 packets to the device. On receipt of said OUT/DATA1 packets, the control logic (349) within the device assembles the requested Result and transmits the same as a Result packet to the REX-Hub. The control logic (348) within the REX-Hub stores said Result packet in its buffer memory.

At a later time, the control logic (345) within the host recognizes that it has not received the requested Result and automatically retries the transaction by issuing further SSPLIT/OUT/DATA1 packets to the LEX subsystem. On receipt of the SSPLIT/OUT/DATA1 packets, the control logic (346) within the LEX subsystem recognizes that it has a Result packet stored in memory from the same function identified by the further SSPLIT/OUT/DATA1 packets. Said control logic retrieves said stored Result packet from memory and transmits the same packet to the Host Said control logic (346) also recognizes that said SSPLIT/OUT/DATA1 packets are a repetition of the previous SSPLIT/OUT/DATA1 packets and absorbs said packets.

At a yet later time, the control logic (345) within the host generates a complete split-transaction and a notification of output data. Said complete split-transaction and notification of output data are transmitted to the LEX subsystem as a CSPLIT packet and an OUT packet (CSPLIT/OUT packets). On receipt of the CSPLIT/OUT packets, the control logic (346) within the LEX subsystem recognizes the lack of Result that corresponds to the notification of output data in its memory so said control logic (346) generates a NYET packet and transmits the same to the host. Said NYET packet warns the host that the LEX subsystem has not yet received a response from the device and enables said host to progress to the next transaction. Said control logic (346) forwards said CSPLIT/SETUP packets to the REX-FPGA subsystem. The control logic (347) within the REX-FPGA subsystem forwards said CSPLIT/OUT packets to the REX-Hub.

On receipt of the CSPLIT/OUT packets, the control logic (348) within the REX-Hub recognizes that it has a Result packet stored in memory from the same function identified by the CSPLIT/OUT packets. Said control logic retrieves said stored Result packet from memory and transmits the same packet to the REX-FPGA subsystem. The control logic (347) within the REX-FPGA subsystem forwards said Result packet to the LEX subsystem and the control logic (346) within the LEX subsystem stores said Result packet in its buffer memory.

At a later time, the control logic (345) within the host recognizes that it has not received the requested Result and automatically retries the transaction by issuing a further CSPLIT packet and a further OUT packet to the LEX subsystem. On receipt of the CSPLIT/OUT packets, the control logic (346) within the LEX subsystem recognizes that it has a Result packet stored in memory from the same function identified by the further CSPLIT/OUT packets. Said control logic retrieves said stored Result packet from memory and transmits the same packet to the Host. Said control logic (346) also recognizes that said CSPLIT/OUT packets are a repetition of the previous CSPLIT/OUT packets and absorbs said packets.

In the Status Phase, the control logic (350) within the host generates a start split-transaction and a request for input data, addressed to the same USB function as the Data Phase. Said start split-transaction and request for input data are transmitted to the LEX subsystem as a SSPLIT packet and an IN packet (SSPLIT/IN packets). On receipt of said SSPLIT/IN packets, the control logic (351) within the LEX subsystem recognizes that the lack of Result in its memory so it generates a synthetic negative acknowledgement and transmits the same as a NAK packet to the host. Said control logic forwards the SSPLIT/IN packets to the REX-FPGA subsystem. The control logic (352) within the REX-FPGA subsystem forwards said SSPLIT/IN packets to the REX-Hub. On receipt of the SSPLIT/IN packets, the control logic (353) within the REX-Hub generates a Result and transmits the same as a Result packet to the REX-FPGA subsystem. The control logic (352) within the REX-FGPA subsystem forwards said Result packet to the LEX subsystem and the control logic (351) within the LEX subsystem stores said Result packet in its buffer memory. The control logic (353) within the REX-Hub absorbs said SSPLIT packet and forwards said IN packet to the device.

On receipt of the IN packet, the control logic (354) within the device assembles the requested data and transmits the same as a Result packet to the REX-Hub. Upon receipt of the Result packet, the control logic (353) within the REX-Hub generates an ACK packet to acknowledge a successful transmission and transmits the same to the device.

At a later time, the control logic (350) within the host recognizes that it has not received an acknowledgement from the device and automatically retries the transaction by issuing a further SSPLIT packet and a further IN packet to the LEX subsystem. On receipt of the further SSPLIT/IN packets, the control logic (351) within the LEX subsystem recognizes that it has an acknowledgement packet stored in memory from the same function identified by the further SSPLIT/IN packets. Said control logic retrieves said stored acknowledgement packet from memory and transmits the same as a Result packet to the Host. Said control logic also recognizes that said SSPLIT/IN packets are a repetition of the previous SSPLIT/IN packets and absorbs said packets.

At a yet later time, the control logic (350) within the host generates a complete split-transaction and a request for input data. Said complete split-transaction and request for input data are transmitted to the LEX subsystem as a CSPLIT packet and an IN packet (CSPLIT/IN packets). On receipt of the CSPLIT/IN packets, the control logic (351) within the LEX subsystem recognizes the lack of data that corresponds to the request in its memory so said control logic (351) generates a NYET packet and transmits the same to the host. Said NYET packet warns the host that the LEX subsystem has not yet received a response from the device and enables said host to progress to the next transaction. Said control logic (351) forwards said CSPLIT/IN packets to the REX-FPGA subsystem. The control logic (352) within the REX-FPGA subsystem forwards said CSPLIT/IN packets to the REX-Hub.

At a later time, the control logic (350) within the host recognizes that it has not received a data packet from the device and automatically retries the transaction by issuing a further CSPLIT packet and a further IN packet to the LEX subsystem. On receipt of the further CSPLIT/IN packets, the control logic (351) within the LEX subsystem recognizes that it has a data packet stored in memory from the same function identified by the further CSPLIT/IN packets. Said control logic retrieves said stored Result packet from memory and transmits the same packet to the Host. Said control logic also recognizes that said CSPLIT/IN packets are a repetition of the previous CSPLIT/IN packets and absorbs said packets.

According to the invention, the protocol handling for control output transfers between a high-speed host and a full-speed device is the same as the protocol handling for control output transfers between a high-speed host and a low-speed device, as described in FIG. 28 by control logics (340) to (354).

Figure 29:
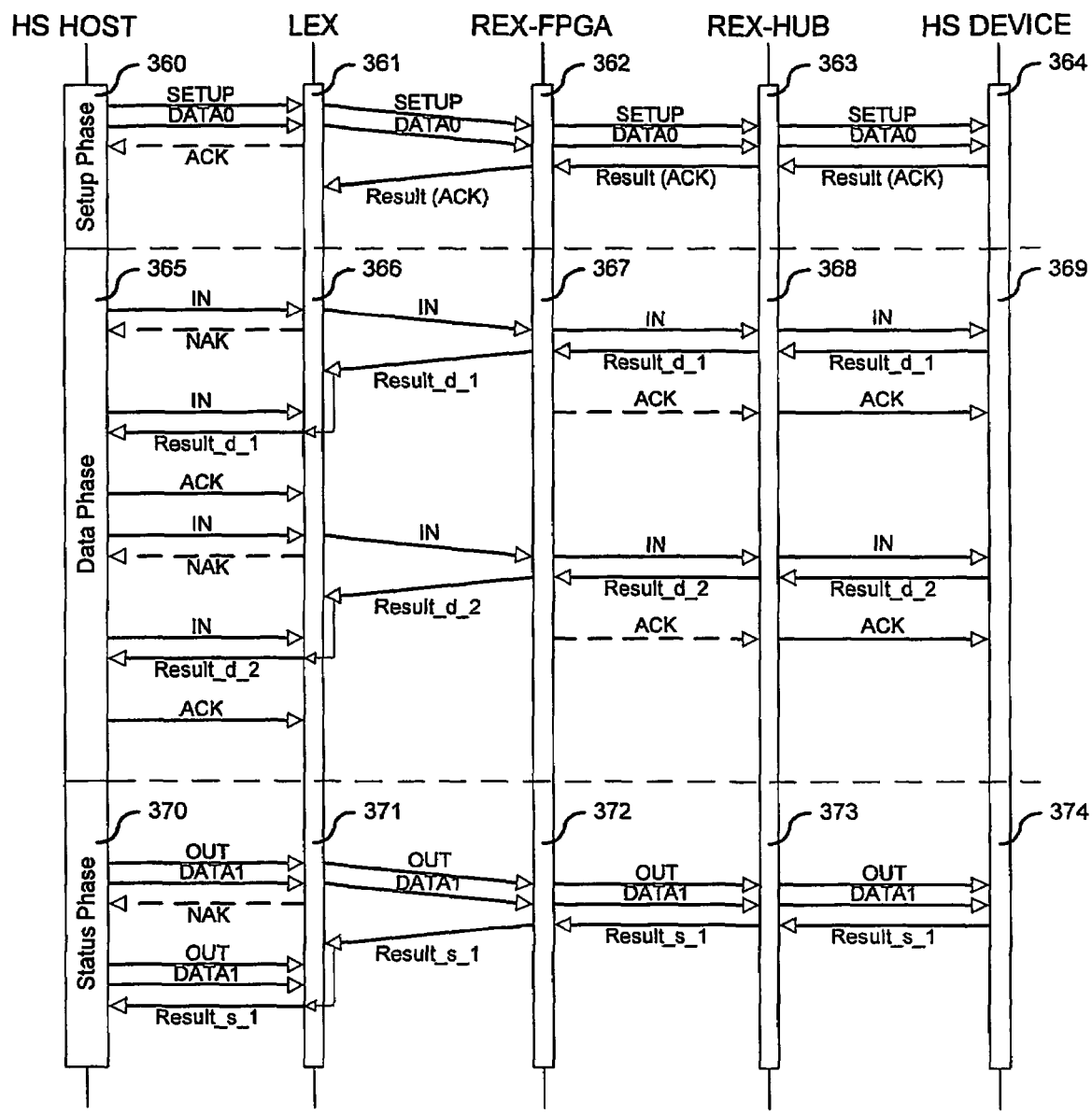
FIG. 29 is a sequence diagram showing a control input transfer between a high-speed host and a high-speed device according to the invention.

FIG. 29 is a sequence diagram showing a control input transfer, between a high-speed host and a high-speed device. In the Set-up Phase, the control logic (360) within the Host generates a notification of device set-up and a data packet, addressed to a particular USB function. Said notification and data are transmitted to the LEX subsystem as a SETUP packet and a DATA0 packet (SETUP/DATA0 packets). On receipt of said packets, the control logic (361) within the LEX subsystem recognizes that it has not yet received an acknowledgment from the device so said control logic generates a synthetic acknowledgement packet and transmits the same as an ACK packet to the host Said control logic (361) forwards the SETUP/DATA0 packets to the REX-FPGA subsystem. The control logic (362) within the REX-FPGA subsystem forwards said SETUP/DATA0 packets to the REX-Hub. The control logic (363) within the REX-Hub forwards said SETUP/DATA0 packets to the Device.

On receipt of said SETUP/DATA0 packets, the control logic (364) within the device assembles the required acknowledgement packet and transmits the same as a Result packet to the Host The control logic (363) within the REX-Hub receives said Result packet and forwards the same packet to the REX-FPGA subsystem. The control logic (362) within the REX-FPGA subsystem forwards said Result packet to the LEX subsystem. The control logic (361) within the LEX subsystem recognizes that it has already sent an acknowledgement to the host and absorbs said Result packet.

In the Data Phase, the control logic (365) within the host generates a request for input data addressed to the same USB function, after receiving the first Result packet. Said request for input data are transmitted to the LEX subsystem as an IN packet. On receipt of said IN packet, the control logic (366) within the LEX subsystem recognizes the lack of data that corresponds to the input request in its buffer memory so said control logic generates a synthetic negative acknowledgement packet and transmits the same as a NAK packet to the host. Said control logic (366) forwards the IN packet to the REX-FPGA subsystem. The control logic (367) within the REX-FPGA subsystem forwards said IN packet to the REX-Hub. The control logic (368) within the REX-Hub forwards the request for input data to the Device as an IN packet.

On receipt of the IN packet, the control logic (369) within the device assembles the requested control data and transmits the same to the REX-Hub as a Result packet. The control logic (368) within the REX-Hub forwards said Result packet to the REX-FPGA subsystem. On receipt of said Result packet, the control logic (367) within the REX-FPGA subsystem generates a synthetic acknowledgement packet. Said acknowledgement packet is transmitted to the REX-Hub as an ACK packet. The control logic (368) within the REX-Hub forwards said ACK packet to the device. The control logic (367) within the REX-FPGA subsystem forwards said Result packet to the LEX subsystem and the control logic (366) within the LEX subsystem stores said Result packet in its buffer memory.

At a later time, the control logic (365) within the host recognizes that it has not received the requested input data and automatically retries the transaction by issuing a further request addressed to the same USB function. Said request is transmitted to the LEX subsystem as an IN packet On receipt of the IN packet, the control logic (366) within the LEX subsystem recognizes that it has a Result packet stored in memory from the same function identified by the further IN packet. Said control logic retrieves said stored Result packet from memory and transmits the same packet to the Host Said control logic (366) also recognizes that said IN packet is a repetition of the previous IN packet and absorbs said packet Upon successful receipt of the Result packet, the control logic (365) within the host generates an ACK packet to acknowledge a successful transmission. When the control logic (366) within the LEX subsystem receives the ACK packet from the host, said control logic absorbs said packet.

The above-described process is repeated for subsequent input data requests from the Host by the distributed control logic (e.g. 365, 366, 367, 368, 369). The control logic within the host will continue to generate requests for input data until the last data packet is received.

In the Status Phase, the control logic (370) within the host generates a notification of output data and a data packet, addressed to the same USB function. Said notification and data are transmitted to the LEX subsystem as OUT/DATA1 packets. On receipt of said OUT/DATA1 packets, the control logic (371) within the LEX subsystem recognizes it has not received an acknowledgement from the device so said control logic generates a synthetic negative acknowledgement packet and transmits the same as a NAK packet to the host. Said control logic (371) forwards the OUT/DATA1 packets to the REX-FPGA subsystem. The control logic (372) within the REX-FPGA subsystem forwards said OUT/DATA1 packets to the REX-Hub. The control logic (373) within the REX-Hub forwards said OUT/DATA1 packets to the Device.

On receipt of the OUT/DATA1 packets, the control logic (374) within the device assembles the required acknowledgement packet and transmits the same as a Result packet to the REX-Hub. The control logic (373) within the REX-Hub receives said Result packet and forwards the same packet to the REX-FPGA subsystem. The control logic (372) within the REX-FPGA subsystem forwards said Result packet to the LEX subsystem. The control logic (371) within the LEX subsystem stores said Result packet in its buffer memory.

At a later time, the control logic (370) within the host recognizes that it has not received the requested Result and automatically retries the transaction by generating further OUT/DATA1 packets addressed to the same USB function and transmitting the same to the LEX subsystem. On receipt of the OUT/DATA1 packets, the control logic (371) within the LEX subsystem recognizes that it has a Result packet stored in memory from the same function identified by the further OUT/DATA1 packets. Said control logic retrieves said stored Result packet from memory and transmits the same packet to the Host. Said control logic (371) also recognizes that said OUT/DATA1 packets are a repetition of the previous OUT/DATA1 packets and absorbs said packets.

The sequence for the Data Phase described above by the distributed control logics 365–369 also serves to describe the operation of a bulk input transfer between a high-speed host and a high-speed device.

Figure 30:
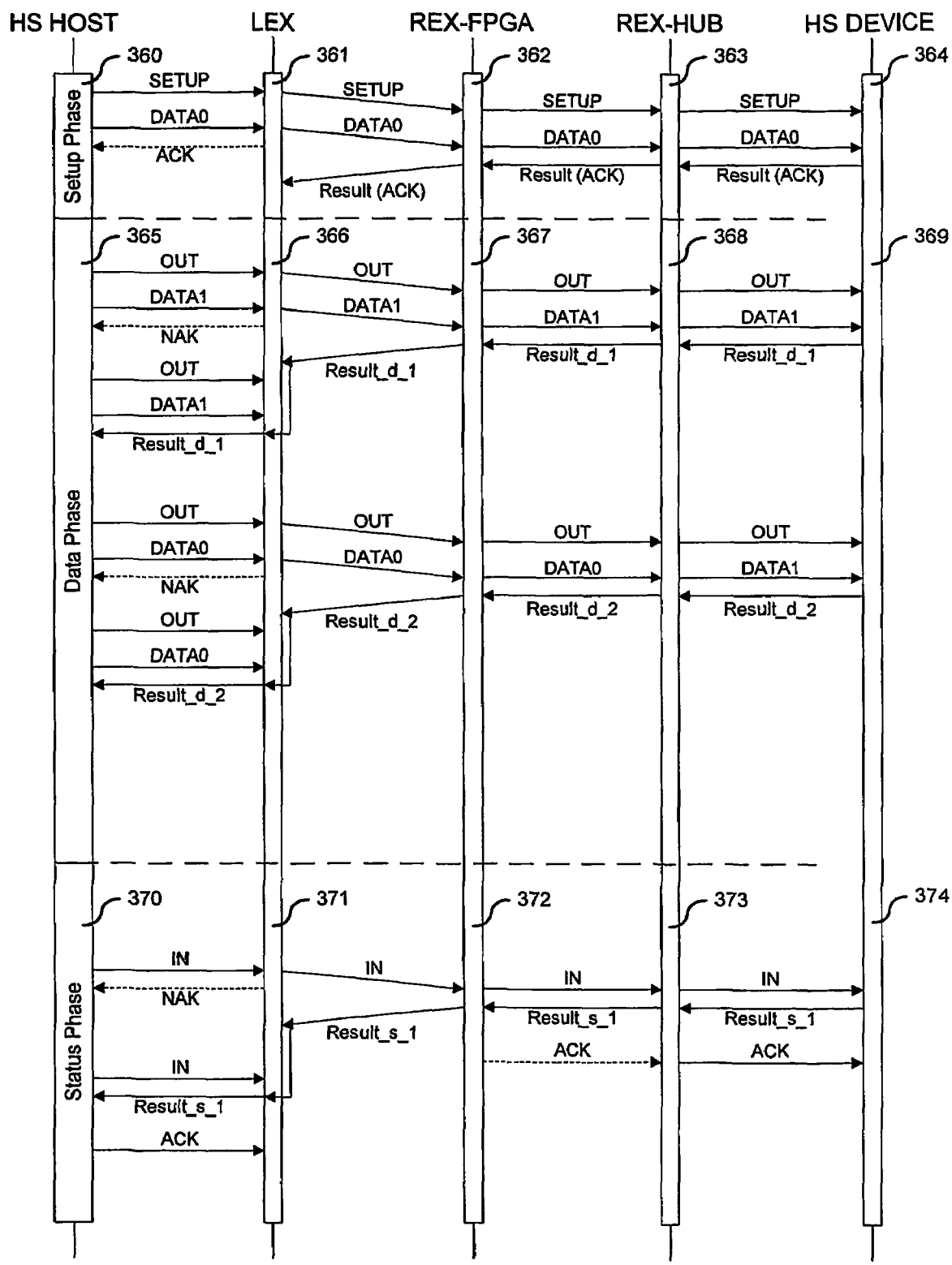
FIG. 30 is a sequence diagram showing a control output transfer between a high-speed host and a high-speed device according to the invention.

FIG. 30 is a sequence diagram showing a control output transfer, between a high-speed host and a high-speed device. In the Set-up Phase, the control logic (360) within the Host generates a notification of device set-up and a data packet addressed to a particular USB function. Said notification and data packet are transmitted to the LEX subsystem as a SETUP packet and a DATA0 packet (SETUP/DATA0 packets). On receipt of the SETUP/DATA0 packets, the control logic (361) within the LEX subsystem recognizes that it has not received an acknowledgement from the device so said control logic generates a synthetic acknowledgement packet and transmits the same as an ACK packet to the host. Said control logic (361) forwards the SETUP/DATA0 packets to the REX-FPGA subsystem. The control logic (362) within the REX-FPGA subsystem forwards said SETUP/DATA0 packets to the REX-Hub. The control logic (363) within the REX-Hub forwards said SETUP/DATA0 packets to the device.

On receipt of the SETUP/DATA0 packets, the control logic (364) within the device assembles the requested Result and transmits the same as a Result packet to the REX-Hub. The control logic (363) within the REX-Hub forwards said Result packet to the REX-FPGA subsystem. The control logic (362) within the REX-FPGA subsystem forwards said Result packet to the LEX subsystem. The control logic (361) within the LEX subsystem recognizes that it has already sent an acknowledgement to the host and absorbs said Result packet.

In the Data Phase, the control logic (365) within the host generates a notification of output data and a data packet, addressed to the same USB function as in the Set-up Phase. Said notification and data packet are transmitted as OUT/DATA1 packets to the LEX subsystem. On receipt of the OUT/DATA1 packets, the control logic (366) within the LEX subsystem recognizes that it has not received an acknowledgement packet from the device so said control logic generates a synthetic negative acknowledgement and transmits the same as a NAK packet to the host. Said control logic (366) forwards the OUT/DATA1 packets to the REX-FPGA subsystem. The control logic (367) within the REX-FPGA subsystem forwards said OUT/DATA1 packets to the REX-Hub. The control logic (368) within the REX-Hub forwards said OUT/DATA1 packets to the device.

On receipt of the OUT/DATA1 packets, the control logic (369) within the device assembles the requested Result and transmits the same to the REX-Hub as a Result packet. The control logic (368) within the REX-Hub forwards said Result packet to the REX-FPGA subsystem. The control logic (367) within the REX-FPGA subsystem forwards said Result packet to the LEX subsystem and the control logic (366) within the LEX subsystem stores said Result packet in its buffer memory.

At a later time, the control logic (365) within the host recognizes that it has not received an acknowledgement from the device and automatically retries the transaction by issuing a further OUT packet and a further DATA1 packet, addressed to the same USB function. Said notification and data are transmitted as OUT/DATA1 packets to the LEX subsystem. On receipt of the OUT/DATA1 packets, the control logic (366) within the LEX subsystem recognizes that it has in its buffer memory an acknowledgement packet that corresponds to the same function as the further OUT/DATA1 packets. Said control logic (366) retrieves said stored Result packet from its memory and transmits the same packet to the host. Said control logic also recognizes that said OUT/DATA1 packets are a repetition of the previous OUT/DATA1 packets and absorbs said packets.

The above-described process is repeated for subsequent output data notifications from the Host by the distributed control logic (e.g. 365, 366, 367, 368, 369). The control logic within the host will continue to generate notifications of output data until the last data packet is delivered.

In the Status Phase, the control logic (370) generates a request for input data and transmits the same as an IN packet to the LEX subsystem. On receipt of the IN packet, the control logic (371) within the LEX subsystem recognizes the lack of data that corresponds to the request in its buffer memory so it generates a synthetic negative acknowledgement and transmits the same as a NAK packet to the host. Said control logic (371) forwards said IN packet to the REX-FPGA subsystem. The control logic (372) within the REX-FPGA subsystem forwards said IN packet to he REX-Hub. The control logic (373) within the REX-Hub forwards said IN packet to the device.

On receipt of the IN packet, the control logic (374) within the device assembles the requested data and transmits the same as a Result packet to the REX-Hub. The control logic (373) within the REX-Hub forwards said Result packet to the REX-FPGA subsystem. On receipt of the Result packet, the control logic (372) within the REX-FPGA subsystem generates a synthetic acknowledgement packet and transmits the same as an ACK packet to the REX-Hub. The control logic (373) within the REX-Hub forwards said ACK packet to the device. The control logic (372) within the REX-FPGA subsystem forwards the Result packet to the LEX subsystem and the control logic (371) within the LEX subsystem stores said Result packet in its buffer memory.

At a later time, the control logic (370) within the host recognizes that it has not received the requested data packet and automatically retries the transaction by issuing a further request for input data, addressed to the same USB function. Said request for input data is transmitted as an IN packet to the LEX subsystem. On receipt of the IN packet, the control logic (371) within the LEX subsystem recognizes that it has in its buffer memory a Result packet that corresponds to the same function as the further input request. Said control logic (371) retrieves said stored Result packet from its memory and transmits the same packet to the host. Said control logic also recognizes that said IN packet is a repetition of the previous IN packet and absorbs said packet. Upon successful receipt of the Result packet, the control logic (370) within the host generates an ACK packet to acknowledge a successful transmission. When the control logic (371) within the LEX subsystem receives the ACK packet from the host, said control logic absorbs said packet.

The sequence for the Data Phase described above by the distributed control logics 365-369 also serves to describe the operation of a bulk output transfer between a high-speed host and a high-speed device.

Figure 31:
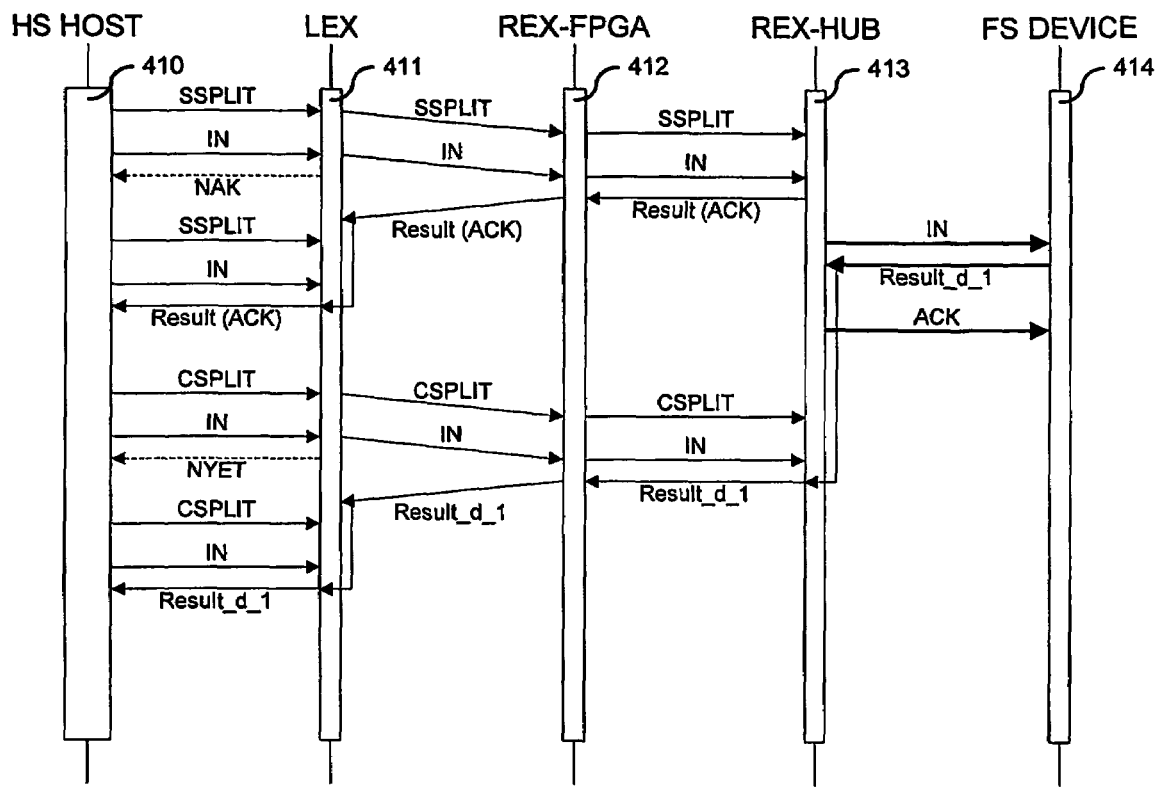
FIG. 31 is a sequence diagram showing a bulk input transfer between a high-speed host and a full-speed device according to the invention.

FIG. 31 is a sequence diagram showing a bulk input transfer, between a high-speed host and a full-speed device. The control logic (410) within the host generates a start split-transaction and a request for input data addressed to a particular USB function. Said start split-transaction and request for input data are transmitted to the LEX subsystem as a SSPLIT packet and an IN packet (SSPLIT/IN packets). On receipt of the SSPLIT/IN packets, the control logic (411) within the LEX subsystem recognizes that it has not yet received an acknowledgement from the device so said control logic generates a synthetic negative acknowledgement and transmits the same to the host as a NAK packet Said control logic (411) forwards said SSPLIT/IN packets to the REX-FPGA subsystem. The control logic (412) within the REX-FPGA subsystem forwards said SSPLIT/IN packets to the REX-Hub.

On receipt of the SSPLIT/IN packets, the control logic (413) within the REX-Hub generates an acknowledgement packet and transmits the same to the REX-FPGA subsystem as a Result packet. The control logic (412) within the REX-FPGA subsystem forwards said Result packet to the LEX subsystem and the control logic (411) within the LEX subsystem stores said Result packet in its buffer memory. The control logic (413) within the REX-Hub absorbs said SSPLIT packet and forwards said IN packet to the device. On receipt of said IN packet, the control logic (414) within the device assembles the requested data and transmits the same as a Result packet to the REX-Hub. The control logic (413) within the REX-Hub stores said Result packet in its buffer memory. On receipt of the Result packet, said control logic (413) generates an ACK packet to acknowledge a successful transmission.

At a later time, the control logic (410) within the host recognizes that it has not received the requested data from the device and automatically retries the transaction by issuing a further start split-transaction and a request for input data addressed to the same USB function. Said start split-transaction and request for input data are transmitted as SSPLIT/IN packets to the LEX subsystem. On receipt of the SSPLIT/IN packets, the control logic (411) within the LEX subsystem recognizes that it has an acknowledgement packet stored in memory from the same function identified by the further SSPLIT/IN packets. Said control logic retrieves the stored acknowledgement packet from memory and transmits the same as a Result packet to the Host. Said control logic (411) also recognizes that said SSPLIT/IN packets are merely a repetition of the previous SSPLIT/IN packets and absorbs said packets.

At a later time, the control logic (410) within the host generates a complete split-transaction and a request for input data, addressed to the same USB function. Said complete split-transaction and request for input data are transmitted as CSPLIT/IN packets to the LEX subsystem. On receipt of the CSPLIT/IN packets, the control logic (411) within the LEX subsystem recognizes that it has not received an acknowledgment packet from the device so said control logic generates a synthetic NYET packet and transmits the same to the host. Said NYET packet informs the host that the LEX subsystem has not yet received a response from the device and enables said host to progress to the next transaction. The control logic (411) within the LEX subsystem forwards said CSPLIT/IN packets to the REX-FPGA subsystem. The control logic (412) within the REX-FPGA subsystem forwards said CSPLIT/IN packets to the REX-Hub.

On receipt of the CSPLIT/IN packets, the control logic (413) within the REX-Hub recognizes that it has in its buffer memory a Result packet that corresponds to the input data request. Said control logic (413) retrieves said stored Result packet and transmits the same to the REX-FPGA subsystem. The control logic (412) within the REX-FPGA subsystem forwards said Result packet to the LEX subsystem and the control logic (411) within the LEX subsystem stores said Result packet in its buffer memory.

At a later time, the control logic (410) within the host recognizes that it has not received the requested data from the device and automatically retries the transaction by issuing a further complete split-transaction and a request for input data, addressed to the same USB function. Said complete split-transaction and request for input data are transmitted to the LEX subsystem as further CSPLIT/IN packets. On receipt of the further CSPLIT/IN packets, the control logic (411) within the LEX subsystem recognizes that it has a Result packet stored in memory from the same function identified by the further CSPLIT/IN packets. Said control logic retrieves said stored Result packet from memory and transmits the same packet to the Host. Said control logic (411) also recognizes that said CSPLIT/IN packets are merely a repetition of the previous CSPLIT/IN packets and absorbs said packets.

The above-described process is repeated for subsequent input data requests from the Host by the distributed control logic (e.g. 410, 411, 412, 413, 414).

Figure 32:
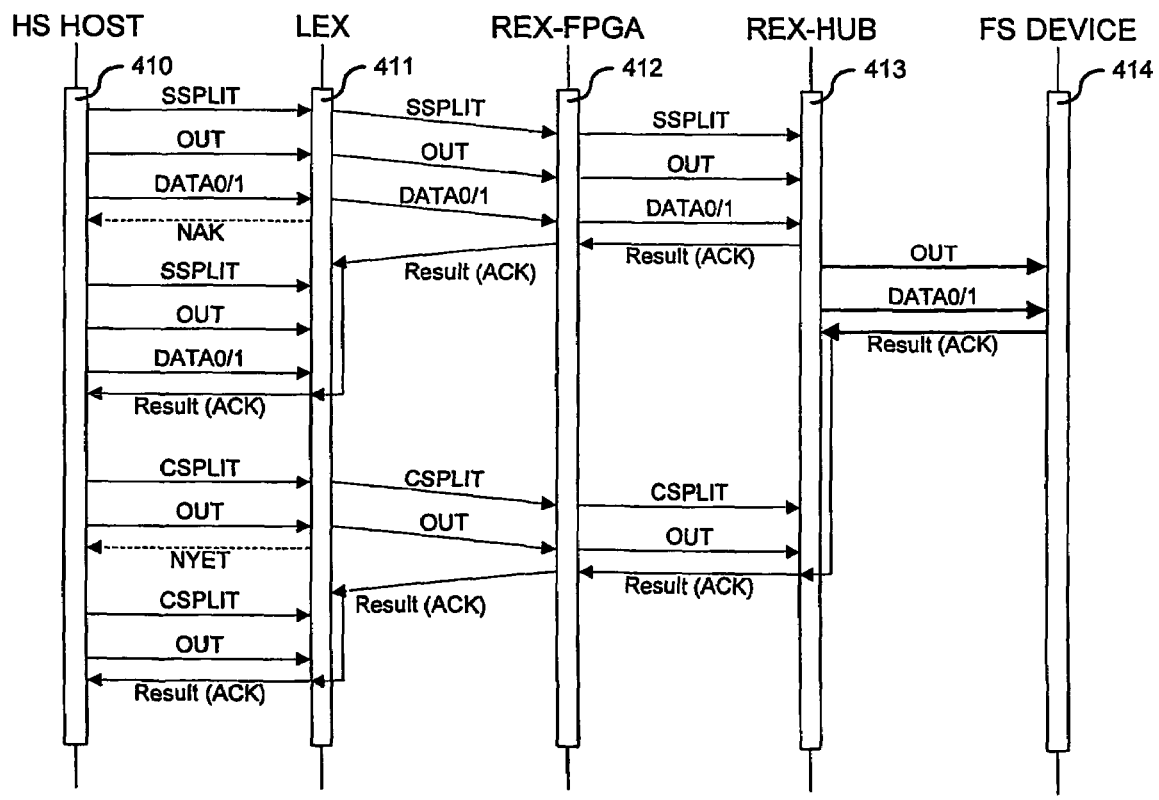
FIG. 32 is a sequence diagram showing a bulk output transfer between a high-speed host and a full-speed device according to the invention.

FIG. 32 is a sequence diagram showing a bulk output transfer, between a high-speed host and a full-speed device. The control logic (410) within the host generates a start split-transaction, a notification of output data, and a data packet, addressed to a particular USB function. Said start split-transaction, notification of output data, and data packet are transmitted to the LEX subsystem as a SSPLIT packet, an OUT packet and a DATAX packet, respectively. Said DATAX packet represents a DATA0 packet or a DATA1 packet. On receipt of the SSPLIT/OUT/DATAX packets, the control logic (411) within the LEX subsystem recognizes the lack of Result that corresponds to the input request in its buffer memory so said control logic generates a synthetic negative acknowledgement and transmits the same to the host as a NAK packet. Said control logic (411) forwards said SSPLIT/OUT/DATAX packets to the REX-FPGA subsystem. The control logic (412) within the REX-FPGA subsystem forwards said SSPLIT/OUT/DATA1 packets to the REX-Hub.

On receipt of the SSPLIT/OUT/DATAX packets, the control logic (413) within the REX-Hub generates an acknowledgement packet and transmits the same to the REX-FPGA subsystem as a Result packet. The control logic (412) within the REX-FPGA subsystem forwards said Result packet to the LEX subsystem and the control logic (411) within the LEX subsystem stores said Result packet in its buffer memory. The control logic (413) within the REX-Hub absorbs said SSPLIT packet and forwards said OUT/DATAX packets to the device. On receipt of said OUT/DATAX packets, the control logic (414) within the device assembles the requested Result and transmits the same as a Result packet to the REX-Hub.

The control logic (413) within the REX-Hub stores said Result packet in its buffer memory. At a later time, the control logic (410) within the host recognizes that it has not received the requested Result and automatically retries the transaction by issuing further SSPLIT/OUT/DATAX packets addressed to the same USB function and transmitting the same to the LEX subsystem. On receipt of the SSPLIT/OUT/DATAX packets, the control logic (411) within the LEX subsystem recognizes that it has a Result packet stored in memory from the same function identified by the further SSPLIT/OUT/DATAX packets. Said control logic retrieves said stored Result packet from memory and transmits the same packet to the Host. Said control logic (411) also recognizes that said SSPLIT/OUT/DATAX packets are a repetition of the previous SSPLIT/OUT/DATAX packets and absorbs said packets.

At a later time, the control logic (410) within the host generates a complete split-transaction and a notification of output data. Said complete split-transaction and notification of output data are transmitted to the LEX subsystem as a CSPLIT packet and an OUT packet. On receipt of the CSPLIT/OUT packets, the control logic (411) within the LEX subsystem recognizes the lack of Result that corresponds to the notification of output data in its memory so said control logic (411) generates a NYET packet and transmits the same to the host Said NYET packet warns the host that the LEX subsystem has not yet received a response from the device and enables said host to progress to the next transaction. Said control logic (411) forwards said CSPLIT/SETUP packets to the REX-FPGA subsystem. The control logic (412) within the REX-FPGA subsystem forwards said CSPLIT/OUT packets to the REX-Hub.

On receipt of the CSPLIT/OUT packets, the control logic (413) within the REX-Hub recognizes that it has a Result packet stored in memory from the same function identified by the further CSPLIT/OUT packets. Said control logic retrieves said stored Result packet from memory and transmits the same packet to the REX-FPGA subsystem. The control logic (412) within the REX-FPGA subsystem forwards said Result packet to the LEX subsystem and the control logic (411) within the LEX subsystem stores said Result packet in its buffer memory.

At a later time, the control logic (410) within the host recognizes that it has not received the requested Result and automatically retries the transaction by issuing a further CSPLIT packet and a further OUT packet to the LEX subsystem. On receipt of the CSPLIT/OUT packets, the control logic (411) within the LEX subsystem recognizes that it has a Result packet stored in memory from the same function identified by the further CSPLIT/OUT packets. Said control logic retrieves said stored Result packet from memory and transmits the same packet to the Host. Said control logic (411) also recognizes that said CSPLIT/OUT packets are a repetition of the previous CSPLIT/OUT packets and absorbs said packets.

Figure 33:
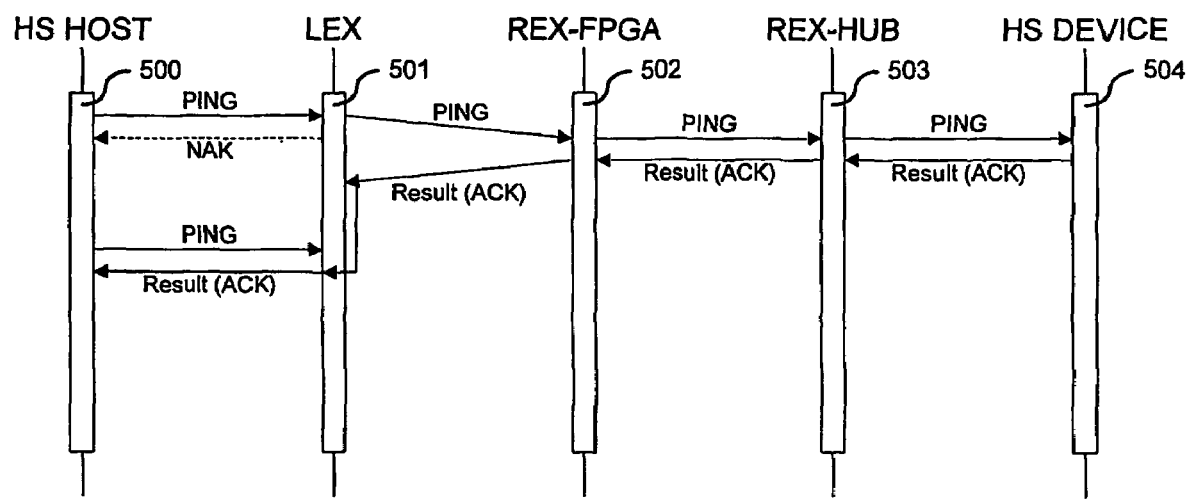
FIG. 33 is a sequence diagram showing a PING protocol according to the invention.

FIG. 33 provides a sequence diagram showing a PING protocol according to the invention.

The control logic (500) within the host generates a high-speed flow control probe for a bulk/control endpoint, addressed to a particular USB function, and transmits the same to the LEX subsystem as a PING packet. On receipt of said PING packet, the control logic (501) within the LEX subsystem recognizes that it has not yet received an acknowledgment from the device corresponding to said PING packet. Said control logic generates a synthetic negative acknowledgment packet and transmits the same as a NAK packet to the host. Said control logic (501) forwards said PING packet to the REX-FPGA subsystem. The control logic (502) within the REX-FPGA subsystem forwards said PING packet to the REX-Hub. The control logic (503) within the REX-Hub forwards said PING packet to the Device.

Upon successful receipt of said PING packet, the control logic (504) within the device generates an acknowledgment and transmits the same to the REX-Hub as a Result packet. The control logic (503) within the REX-Hub forwards said Result packet to the REX-FPGA subsystem. The control logic (502) within the REX-FPGA subsystem forwards said Result packet to the LEX subsystem and the control logic (501) within the LEX subsystem stores said Result packet in its buffer memory.

At a later time, the control logic (500) within the host realizes that it has not received an acknowledgment from the device and automatically retries the transaction by issuing a further high-speed flow control probe to the same USB function. Said flow control probe is transmitted to the LEX subsystem as a PING packet On receipt of said PING packet, the control logic (501) within the LEX subsystem recognizes that it has an acknowledgment packet stored in its memory from the same function identified by the further PING packet. Said control logic retrieves said acknowledgment packet from its buffer memory and transmits the same to the host as a Result packet Said control logic (501) also recognizes said further PING packet is merely a repetition of the previous PING packet and absorbs said packet.

The above-described process is repeated for subsequent high-speed flow control probes from the Host by the distributed control logic (e.g. 500, 501, 502, 503, 504).

Thus, it is apparent that there have been provided, in accordance with the present invention, USB devices which fully, or at least partially, satisfy the means, objects, and advantages over the prior art as set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or step.

I claim:

1. An enhanced high-speed method for transmitting a data stream between a high speed host controller and a full speed or low speed peripheral device over an extended distance, on a signal distribution system, wherein said transmission of said data stream is conducted using a USB-Extended Range Protocol (USB-ERP), wherein data flows from said peripheral device to said host controller, and said data stream being transmitted is encapsulated in split transactions, said method comprising:
   a. receiving, at a local expander, an original request to start the transfer of a data packet from said peripheral device to said host controller;
   b. optionally, generating a negative acknowledgement packet at said local expander and forwarding said negative acknowledgement packet to said host controller;
   c. forwarding said original request for the start of data transfer from said local expander to a Remote Expander-Field Programmable Gate Array (REX-FPGA) over a transmission system;
   d. receiving at said REX-FPGA said forwarded original request for the start of data transfer;
   e. delivering said forwarded original request for the start of data transfer from said REX-FPGA to a USB hub;
   f. receiving at said REX-FPGA an acknowledgement of the start of data transfer from said USB hub;
   g. forwarding said acknowledgement of the start of data transfer from said REX-FPGA to said local expander;
   h. receiving at said local expander said forwarded acknowledgement of the start of data transfer;
   i. storing in a packet buffer at said local expander, said forwarded acknowledgement of the start of data transfer;
   j. optionally receiving, at said local expander, a subsequent request to start the transfer of a data packet from said peripheral device to said host controller; and
      i. retrieving from said packet buffer said stored acknowledgement of the start of data transfer;
      ii. delivering said retrieved acknowledgement to said host controller;
   k. receiving, at a local expander, an original request to complete the transfer of a data packet from said peripheral device to said host controller;
   l. generating a synthetic not-yet packet at said local expander and forwarding said synthetic not-yet packet to said host controller;
   m. forwarding said original request for the completion of data transfer from said local expander to said REX-FPGA over a transmission system;
   n. receiving at said REX-FPGA said forwarded original request for the completion of data transfer;
   o. delivering said forwarded original request for the completion of data transfer from said REX-FPGA to a USB hub;
   p. receiving at said REX-FPGA a completed data packet from said USB hub:
   q. forwarding said completed data packet from said REX-FPGA to said local expander;
   r. receiving at said local expander said forwarded completed data packet;
   s. storing in a packet buffer at said local expander, said forwarded completed data packet;
   t. receiving, at said local expander. a subsequent request to complete the transfer of a data packet from said peripheral device to said host controller; and
      i. retrieving, from said packet buffer, said stored completed data packet; and
      ii. delivering said retrieved completed data packet to said host controller.

2. An apparatus as claimed in claim 1 wherein said extended distance exceeds 5 meters.

3. A method as claimed in claim 1 wherein said transmission of said data stream is in compliance with Revision 2.0 of the USB specification, with the exception of the distance between said host controller and said peripheral device.

4. An enhanced high-speed method for transmitting a data stream between a high speed host controller and a full speed or low speed peripheral device aver an extended distance, on a signal distribution system, wherein said transmission o:F said data stream is conducted using a USB-Extended Range Protocol, wherein data flows from said host controller to said peripheral device, and said data stream being transmitted is encapsulated in split transactions, said method comprising:
   a. receiving, at a local expander, an original notification of the start of data transfer from said host controller to said peripheral device;
   b. optionally, generating a negative acknowledgment packet at said local expander and forwarding said negative acknowledgment packet to said host controller;
   c. forwarding said original notification of the start of data transfer from said local expander to a Remote Expander—Field Programmable Gate Array (REX-FPGA) over a transmission system;
   d. receiving at said REX-FPGA said forwarded original notification of the start of data transfer;

e. delivering said forwarded original notification of the start of data transfer from said REX-FPGA to a USB hub;
f. receiving at said REX-FPGA an acknowledgement of the start of data transfer from said USB hub;
g. forwarding said acknowledgement of the start of data transfer from said REX-FPGA to said local expander;
h. receiving at said local expander said forwarded acknowledgement of the start of data transfer;
i. storing in a packet buffer at said local expander, said forwarded acknowledgement of the start of data transfer;
j. receiving, at said local expander, a subsequent notification of the start of data transfer from said host controller to said peripheral device; and
  i. retrieving from said packet buffer said stored acknowledgement of the start of data transfer; and
  ii. delivering said retrieved acknowledgement to said host controller;
k. optionally receiving, at a local expander, an original request to complete the transfer of a data packet from said host controller to said peripheral device;
l. generating a synthetic not-yet packet at said local expander and forwarding said synthetic not-yet packet to said host controller;
m. forwarding said original request for the completion of data transfer from said local expander to said REX-FPGA over a transmission system;
n. receiving at said REX-FPGA said forwarded original request for the completion of data transfer;
o. delivering said forwarded original request for the completion of data transfer from said REX-FPGA to a USB hub;
p. receiving at said REX-FPGA an acknowledgement of the completion of data transfer from said USB hub;
q. forwarding said acknowledgement of the completion of data transfer from said REX-FPGA to said local expander;
r. receiving at said local expander said forwarded acknowledgement of the completion of data transfer;
s. storing in a packet buffer at said local expander, said forwarded acknowledgement of the completion of data transfer;
t. receiving, at said local expander, a subsequent request to complete the transfer of a data packet from said host controller to said peripheral device; and
  i. retrieving, from said packet buffer, said stored acknowledgement of the completion of data transfer; and
  ii. delivering said retrieved acknowledgement of the completion of data transfer to said host controller.

5. An apparatus as claimed in claim 4 wherein said extended distance exceeds 5 meters.

6. A method as claimed in claim 4 wherein said transmission of said data stream is in compliance with Revision 2.0 of the USB specification, wit the exception of the distance between said host controller and said peripheral device.

7. An enhanced high-speed method for transmitting a data stream between a high speed host controller and a peripheral device over an extended distance, on a signal distribution system, wherein said transmission of said data stream is conducted using a USB-Extended Range Protocol (USB-ERP), and wherein data flows from said peripheral device to said host controller, said peripheral device operates at high speed and in high bandwidth mode, and wherein multiple data packets are transmitted in a single micro-frame, said method comprising:
a. receiving at a local expander a first request for data transfer from said peripheral device to said host controller;
b. optionally, generating a null data packet or a negative acknowledgement packet at said local expander and forwarding said null data packet or said negative acknowledgement packet to said host controller;
c. forwarding said first request for data transfer from said local expander to a Remote Expander—Field Programmable Gate Array (REX-FPGA) over a transmission system;
d. receiving at said REX-FPGA said forwarded first request for data transfer;
e. delivering said forwarded first request for data transfer from said REX-FPGA to a USB hub;
f. receiving at said REX-FPGA a first data packet from said USB hub;
g. forwarding said first data packet from said REX-FPGA to said local expander;
h. receiving at said local expander said first data packet;
i. storing in a packet buffer at said local expander, said first data packet;
j. repeating steps (b) through (i) in response to a second request for data transfer from said peripheral device to said host controller;
k. repeating steps (b) through (i) in response to a third request for data transfer from said peripheral device to said host controller;
l. receiving, at a local expander, a start of frame packet;
m. receiving at a local expander a fourth request for data transfer from said peripheral device to said host controller; and
  i. retrieving from said packet buffer said stored first data packet;
  ii. delivering said retrieved first data packet to said host controller;
n. repeating steps (c) through (i) for said fourth request for data transfer;
o. receiving at a local expander a fifth request for data transfer from said peripheral device to said host controller; and
i. retrieving from said packet buffer said stored second data packet;
ii. delivering said retrieved second data packet to said host controller;
p. repeating steps (c) through (i) for said fifth request for data transfer;
q. receiving at a local expander a sixth request for data transfer from said peripheral device to said host controller; and
  i. retrieving from said packet buffer said stored third data packet;
  ii. delivering said retrieved third data packet to said host controller;
r. repeating steps (c) through (i) for said sixth request for data transfer; and
s. repeating steps (l) through (r) for as long as said host controller continues to issue requests for data transfer.

8. An apparatus as claimed in claim 7 wherein said extended distance exceeds 5 meters.

9. A method as claimed in claim 7 wherein said transmission of said data stream is in compliance with Revision 2.0 of the USB specification, with the exception of the distance between said host controller and said peripheral device.

10. An enhanced high-speed method for transmitting a data stream between a high speed host controller and a peripheral device over an extended distance, on a signal distribution system, wherein said transmission of said data stream is conducted using a USB-Extended Range Protocol, and wherein data flows from said host controller to said peripheral device, said peripheral device operates at high speed and in high bandwidth mode, and wherein multiple data packets are transmitted in a single micro-frame, said method comprising:

a. receiving, at a local expander, a first notification of data transfer from said host controller to said peripheral device;

b. optionally, generating a positive acknowledgement packet or a negative acknowledgement packet at said local expander and forwarding said positive acknowledgement packet or said negative acknowledgement packet to said host controller;

c. forwarding said first notification of data transfer from said local expander to a Remote Expander—Field Programmable Gate Array (REX-FPGA) over a transmission system;

d. receiving at said REX-FPGA said forwarded first notification of data transfer;

e. delivering said forwarded first notification of data transfer from said REX-FPGA to a USB hub;

f. receiving at said REX-FPGA a first acknowledgement of data transfer from said USB hub;

g. forwarding said first acknowledgement of data transfer from said REX-FPGA to said local expander;

h. receiving at said local expander said forwarded first acknowledgement of data transfer;

i. storing in a packet buffer at said local expander, said forwarded first acknowledgement of data transfer;

j. repeating steps (a) through (i) in response to a second notification of data transfer from said host controller to said peripheral device;

k. repeating steps (a) through (i) in response to a third notification of data transfer from said host controller to said peripheral device;

l. receiving, at a local expander a start of frame packet;

m. receiving at a local expander a fourth notification of data transfer from said host controller to said peripheral device; and i. retrieving from said packet buffer said stored first acknowledgement packet;

ii. delivering said retrieved first acknowledgement packet to said host controller;

n. repeating steps (c) through (i) for said fourth notification of data transfer;

o. receiving at a local expander a fifth notification of data transfer from said host controller to said peripheral device; and i. retrieving from said packet buffer said stored second acknowledgement packet;

ii. delivering said retrieved second acknowledgement packet to said host controller;

p. repeating steps (c) through (i) for said fifth notification of data transfer;

q. receiving at a local expander a sixth notification of data transfer from said host controller to said peripheral device; and i. retrieving from said packet buffer said stored third acknowledgement packet;

ii. delivering said retrieved third acknowledgement packet to said host controller;

r. repeating steps (c) through (i) for said sixth request for data transfer;

s. repeating steps (l) through (r) for as long as said host controller continues to issue notifications of data transfer.

11. An apparatus as claimed in claim 10 wherein said extended distance exceeds 5 meters.

12. A method as claimed in claim 10 wherein said transmission of said data stream is in compliance with Revision 2.0 of the USB specification, with the exception of the distance between said host controller and said peripheral device.

* * * * *